(12) United States Patent
Hirano

(10) Patent No.: US 11,493,735 B2
(45) Date of Patent: Nov. 8, 2022

(54) INCLUDING NINE LENSES OF +-+-+-++-, +-+-+-+--, +-+-+--+-, +-+-+---, +-+-+++-, +-+-++-+-, +-+--++--, +-+-+--+++-, +-+---++--, +-+--+-+-, +-+--+---, +-+---++-, +-+---+--, OR +-+----+- REFRACTIVE POWERS

(71) Applicant: TOKYO VISIONARY OPTICS CO., LTD., Tokyo (JP)

(72) Inventor: Hitoshi Hirano, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 398 days.

(21) Appl. No.: 16/722,103

(22) Filed: Dec. 20, 2019

(65) Prior Publication Data

US 2020/0209594 A1    Jul. 2, 2020

(30) Foreign Application Priority Data

Dec. 29, 2018    (JP) .............................. JP2018-248774

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2015/0309293 A1 | 10/2015 | Yamada |
| 2017/0010441 A1 | 1/2017 | Kondo et al. |
| 2018/0275380 A1 | 9/2018 | Sudoh |

FOREIGN PATENT DOCUMENTS

| JP | S63-139314 A | 6/1988 |
| JP | 2002-287019 A | 10/2002 |
| JP | 2015-210413 A | 11/2015 |
| JP | 2015-225246 A | 12/2015 |
| JP | 2017-21185 A | 1/2017 |
| JP | 2018-97289 A | 6/2018 |
| JP | 2018-156011 A | 10/2018 |

*Primary Examiner* — Wen Huang
(74) *Attorney, Agent, or Firm* — Hamre, Schumann, Mueller & Larson, P.C.

(57) ABSTRACT

An imaging lens includes a first lens having positive refractive power; a second lens having negative refractive power; a third lens having positive refractive power; a fourth lens having negative refractive power; a fifth lens; a sixth lens; a seventh lens; an eighth lens; and a ninth lens having negative refractive power, arranged in this order from an object side to an image plane side. The ninth lens is formed in a shape so that a surface thereof on the image plane side has an aspherical shape having an inflection point.

5 Claims, 45 Drawing Sheets

INCLUDING NINE LENSES OF +-+-+-+-, +-+-+-+--, +-+-+--+-, +-+-+----, +-+-++++-, +-+-++-+-, +-+-++--, +-+-+--+++-, +-+--++--, +-+--+-+-, +-+-+---, +-+---++-, +-+---+--, OR +-+----+- REFRACTIVE POWERS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a portable device, e.g., a cellular phone and a portable information terminal, a digital still camera, a security camera, an onboard camera, and a network camera.

In case of a lens configuration comprised of nine lenses, since the number of lenses that compose the imaging lens is large, it has higher flexibility in designing and can satisfactorily correct aberrations that are required for an imaging lens with high resolution. For example, as the conventional imaging lens having a nine-lens configuration, an imaging lens described in Patent Reference has been known.

PATENT REFERENCE

Patent Reference: Japanese Patent Application Publication No. 2018-156011

According to the conventional imaging lens of Patent Reference, it is achievable to relatively satisfactorily correct aberrations. In case of the conventional imaging lens, however, a total track length is long relative to a focal length of the whole lens system, so that it is not suitable to mount in a smartphone, etc. According to the conventional imaging lens of Patent Reference, it is difficult to correct aberrations more satisfactorily, while downsizing the imaging lens.

In view of the above-described problems in the conventional techniques, an object of the present invention is to provide an imaging lens that can attain both a small size and satisfactorily corrected aberrations in a balanced manner.

Further objects and advantages of the present invention will be apparent from the following description of the invention.

SUMMARY OF THE INVENTION

In order to attain the objects described above, an imaging lens of the invention is configured to form an image of an object on an imaging element. According to a first aspect of the invention, an imaging lens of the invention includes a first lens having positive refractive power, a second lens having negative refractive power, a third lens having positive refractive power, a fourth lens, a fifth lens, a sixth lens, a seventh lens, an eighth lens, and a ninth lens having negative refractive power, arranged in the order from an object side to an image plane side. A surface of the ninth lens on the image plane side is formed in an aspheric shape having an inflection point.

According to the imaging lens of the invention, the arrangement of refractive power of the three lenses disposed on the object side is in the order of "positive-negative-positive", so that it is suitably achieved to downsize the imaging lens. In addition, the image plane-side surface of the ninth lens, is formed in an aspheric shape having an inflexion point. Therefore, it is achievable to satisfactorily correct paraxial aberrations and aberrations at the periphery thereof, while suitably restraining an incident angle of a light beam emitted from the imaging lens to the image plane of an imaging element within the range of chief ray angle (CRA).

Here, in the invention, "lens" refers to an optical element having refractive power. Accordingly, the "lens" of the invention does not include an optical element such as a prism and a flat plate filter. Those optical elements may be disposed before or after the imaging lens or between lenses as necessary.

The imaging lens having the above-described configuration preferably satisfy the following conditional expression (1):

$$0.5 < f123/f < 2.5 \tag{1}$$

When the imaging lens satisfies the conditional expression (1), it is achievable to satisfactorily correct aberrations including a spherical aberration.

The imaging lens having the above-described configuration preferably satisfy the following conditional expression (2):

$$f789 < 0 \tag{2}$$

When the imaging lens satisfies the conditional expression (2), it is more suitably achievable to downsize the imaging lens.

The imaging lens having the above-described configuration preferably satisfy the following conditional expression (3):

$$-6 < f3/f2 < -0.2 \tag{3}$$

When the imaging lens satisfies the conditional expression (3), it is achievable to satisfactorily correct a chromatic aberration, astigmatism and a distortion in a well-balanced manner, while securing the back focal length.

The imaging lens having the above-described configuration preferably satisfy the following conditional expression (4):

$$0.003 < D34/f < 0.04 \tag{4}$$

When the imaging lens satisfies the conditional expression (4), it is achievable to satisfactorily correct the astigmatism and the distortion, while securing a distance between the third lens and the fourth lens and the back focal length.

According to a second aspect of the invention, when the thickness of the seventh lens on the optical axis is T7 and the thickness of the eighth lens on the optical axis is T8, the imaging lens having the above-described configuration preferably satisfies the following conditional expression (5):

$$0.5 < T8/T7 < 4 \tag{5}$$

When the imaging lens satisfies the conditional expression (5), it is achievable to satisfactorily keep the thicknesses of the seventh lens and the eighth lens. Therefore, it is achievable to satisfactorily correct aberrations, while downsizing the imaging lens. In addition, it is also achievable to secure the back focal length.

According to a third aspect of the invention, when the whole lens system has the focal length f and a distance on the optical axis between the eighth lens and the ninth lens is D89, the imaging lens having the above-described configuration preferably satisfies the following conditional expression (6):

$$0.05 < D89/f < 0.15 \tag{6}$$

When the imaging lens satisfies the conditional expression (6), it is achievable to satisfactorily correct a field curvature, the astigmatism and the distortion, while securing the back focal length.

According to a fourth aspect of the invention, when the whole lens system has the focal length f and a paraxial curvature radius of an image plane-side surface of the ninth lens is R9r, the imaging lens having the above-described configuration preferably satisfies the following conditional expression (7):

$$0.2<R9r/f<0.6 \quad (7)$$

When the imaging lens satisfies the conditional expression (7), it is achievable to satisfactorily correct the astigmatism, the coma aberration and the distortion, while downsizing the imaging lens. When the imaging lens satisfies the conditional expression (7), it is achievable to effectively secure the back focal length.

According to a fifth aspect of the invention, when the whole lens system has the focal length f and the ninth lens has a focal length f9, the imaging lens having the above-described configuration preferably satisfies the following conditional expression (8):

$$-2<f9/f<-0.2 \quad (8)$$

When the imaging lens satisfies the conditional expression (8), it is achievable to secure the back focal length and satisfactorily correct the field curvature, while restraining the incident angle of a light beam emitted from the imaging lens to the image plane within the range of CRA.

When the whole lens system has the focal length f and the fourth lens has a focal length f4, the imaging lens having the above-described configuration preferably satisfies the following conditional expression (9):

$$10<|f4/f|<60 \quad (9)$$

When the value satisfies the conditional expression (9), it is achievable to satisfactorily restrain the chromatic aberration, the astigmatism, the field curvature and the distortion within satisfactory ranges.

When the first lens has Abbe's number vd1, the second lens has Abbe's number vd2, and the third lens has Abbe's number vd3, the imaging lens having the above-described configuration preferably satisfies the following conditional expressions (10) through (12):

$$35<vd1<80 \quad (10)$$

$$10<vd2<30 \quad (11)$$

$$35<vd3<80 \quad (12)$$

When the imaging lens satisfies the conditional expressions (10) through (12), it is achievable to satisfactorily correct the chromatic aberration.

When the whole lens system has the focal length f and a distance on the optical axis from an object-side surface of the first lens to the image plane is TL, the imaging lens having the above-described configuration preferably satisfies the following conditional expression (13): When the imaging lens satisfies the conditional expression (13), it is achievable to suitably downsize the imaging lens.

$$1.0<TL/f<1.5 \quad (13)$$

Here, between the imaging lens and the image plane, typically, there is disposed an insert such as an infrared cut-off filter and cover glass. In this specification, for the distance on the optical axis of those inserts, a distance in the air is employed.

When the distance on the optical axis from the object-side surface of the first lens to the image plane is TL and the maximum image height is Hmax, the imaging lens of the present invention preferably satisfies the following conditional expression (14):

$$1.0<TL/H\max<1.8 \quad (14)$$

When the sixth lens has positive refractive power and the seventh lens has positive refractive power, and the whole lens system has the focal length f and the sixth lens has a focal length f6, the imaging lens having the above-described configuration preferably satisfies the following conditional expression (15):

$$1.5<f6/f<6 \quad (15)$$

When the imaging lens satisfies the conditional expressions (15), it is achievable to satisfactorily correct the coma aberration and the astigmatism.

When the seventh lens has negative refractive power and the eighth lens has positive refractive power, and the whole lens system has the focal length f and the eighth lens has a focal length f8, the imaging lens having the above-described configuration preferably satisfies the following conditional expression (16):

$$1<f8/f<6 \quad (16)$$

When the imaging lens satisfies the conditional expression (16), it is achievable to satisfactorily correct the spherical aberration and the distortion, while downsizing the imaging lens.

According to the invention, the respective lenses from the first lens to the ninth lens are preferably arranged with certain air intervals. When the respective lenses are arranged at certain air intervals, it is achievable to suitably restrain the manufacturing cost of the imaging lens.

According to the imaging lens of the invention, it is preferred to form both surfaces each of the first through the ninth lenses in aspheric shapes. Forming the both surfaces of each lens in aspheric surfaces, it is achievable to more satisfactorily correct aberrations from proximity of the optical axis of the lens to the periphery thereof.

According to the imaging lens having the above-described configuration, the first lens is preferably formed in a shape directing a convex surface thereof to the object side. When the first lens is formed in such a shape, it is achievable to suitably downsize the imaging lens.

According to the imaging lens having the above-described configuration, in the eighth lens and the ninth lens, at least two surfaces thereof are preferably formed in an aspheric shape having an inflection point. When one more surface is formed in an aspheric shape having an inflection point, it is achievable to more satisfactorily correct aberrations at periphery of an image, while suitably restraining an incident angle of a light beam emitted from the imaging lens to the image plane within the range of CRA.

According to the invention, when the imaging lens has an angle of view 2ω, the imaging lens preferably satisfies 65°≤2ω.

In order to obtain fully bright image, when the whole lens system has the focal length f and the imaging lens has a diameter of entrance pupil Dep, the imaging lens having the above-described configuration preferably satisfies the following conditional expression (17):

$$f/Dep<2.4 \quad (17)$$

Here, according to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Here, a curvature radius used herein refers to a paraxial curvature radius, and may not fit to general shapes of the lenses in their sectional views all the time.

According to the imaging lens of the invention, it is achievable to provide an imaging lens having a small size, which is especially suitable for mounting in a small-sized camera, while having high resolution with satisfactory correction of aberrations.

DETAILED DESCRIPTION OF PREFERRED EMBODIMENTS

Hereunder, referring to the accompanying drawings, embodiments of the present invention will be fully described.

Figure 1:
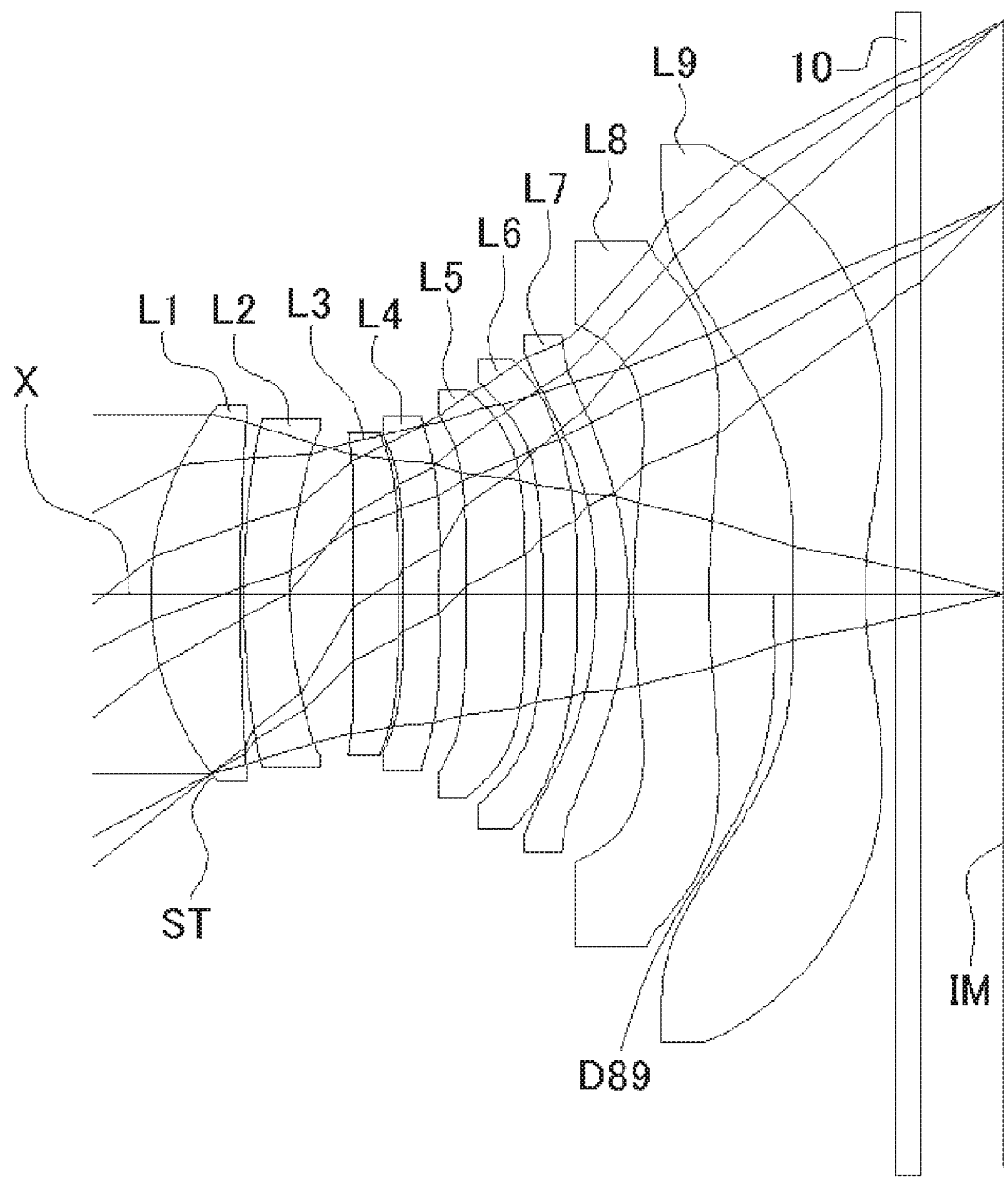
FIG. 1 shows a sectional view of a schematic configuration of an imaging lens in Numerical Data Example 1 of the present invention.

FIGS. 1, 4, 7, 10, 13, 16, 19, 22, 25, 28, 31, 34, 37, 40 and 43 are schematic sectional views of the imaging lenses in Numerical Data Examples 1 to 15 according to the embodiments, respectively. Since the imaging lenses in those Numerical Data Examples have the same basic configuration, the lens configuration of the embodiment will be described with reference to the sectional view of Numerical Data Example 1. As shown in FIG. 1, the imaging lens of the embodiment includes a first lens 1 having positive refractive power; a second lens 2 having negative refractive power; a third lens L3 having positive refractive power; a fourth lens L4; a fifth lens L5; a sixth lens L6; a seventh lens L7; an eighth lens L8; and a ninth lens L9 having negative refractive power, arranged in the order from an object side to an image plane side. In addition, between the ninth lens L9 and an image plane IM of an imaging element, there is provided a filter 10. Here, the filter 10 is omissible.

The first lens L1 is formed in a shape such that a curvature radius r1 of a surface thereof on the object-side and a curvature radius r2 of a surface thereof on the image plane side are both positive. The first lens L1 has a shape of a meniscus lens directing a convex surface thereof to the object side near the optical axis. The shape of the first lens L1 may not be limited to the one in Numerical Data Example 1. The first lens L1 can be formed in any shape as long as the refractive power thereof is positive. In addition to the shape in Numerical Data Example 1, the first lens L1 can be formed in a shape such that the curvature radius r1 and the curvature radius r2 are both negative, or such that the curvature radius r1 is positive and the curvature radius r2 is negative. The first of the above-described shapes is a shape of a meniscus lens directing a concave surface thereof to the object side near the optical axis, and the latter one is a shape of a biconvex lens near the optical axis. In view of downsizing the imaging lens, the first lens L1 may be preferably formed in a shape such that the curvature radius r1 is positive.

According to Numerical Data Example 1, there is provided an aperture stop ST on the object-side surface of the first lens L1. Here, the position of the aperture stop ST may not be limited to the one in Numerical Data Example 1. The aperture stop ST can be provided closer to the object-side than the first lens L1. Alternatively, the aperture stop ST can be provided between the first lens L1 and the second lens L2; between the second lens L2 and the third lens L3; between the third lens L3 and the fourth lens L4; or the like.

The second lens L2 is formed in a shape such that a curvature radius r3 of a surface thereof on the object-side and a curvature radius r4 of a surface thereof on the image plane side are both positive. The second lens L2 has a shape of a meniscus lens directing a convex surface thereof to the object side near the optical axis. The shape of the second lens L2 may not be limited to the one in Numerical Data Example 1. The second lens L2 can be formed in any shape as long as the refractive power thereof is negative. In addition to the shape in Numerical Data Example 1, the second lens L2 can be formed in a shape such that the curvature radius r3 and the curvature radius r4 are both negative, or such that the curvature radius r3 is negative and the curvature radius r4 is positive. The first of the above-described shapes is a shape of a meniscus lens directing a concave surface thereof to the object side near the optical axis, and the latter one is a shape of a biconcave lens near the optical axis. In view of downsizing the imaging lens, the first lens L1 may be preferably formed in a shape such that the curvature radius r3 is positive.

The third lens L3 is formed in a shape such that a curvature radius r5 of a surface thereof on the object-side is positive and a curvature radius r6 of a surface thereof on the image plane side is negative. The third lens L3 has a shape of a biconcave lens near the optical axis. The shape of the third lens L3 may not be limited to the one in Numerical Data Example 1. Numerical Data Examples 3 is an example of a shape of a meniscus lens directing a convex surface thereof to the object side near the optical axis. Numerical Data Examples 9 and 11 are examples of a shape of a meniscus lens directing a concave surface thereof to the object side near the optical axis. The third lens L3 can be formed in any shape as long as the refractive power thereof is positive.

The fourth lens L4 has negative refractive power.

The fourth lens L4 is formed in a shape such that a curvature radius r7 of a surface thereof on the object-side and a curvature radius r8 of a surface thereof on the image plane side are both positive. The fourth lens L4 has a shape of a meniscus lens directing a convex surface thereof to the object side near the optical axis. The shape of the fourth lens L4 may not be limited to the one in Numerical Data Example 1. Numerical Data Examples 2, 4, 6 through 12, 14 and 15 are examples of a shape of a meniscus lens directing a concave surface thereof to the object side near the optical axis. The Numerical Data Example 5 is an example of a shape of a biconcave lens near the optical axis.

According to the embodiment, the imaging lens satisfies the following conditional expression:

$$0 < f34.$$

In the above formula, f34 is a composite focal length of the third lens L3 and the fourth lens L4.

The fifth lens L5 has positive refractive power. The refractive power of the fifth lens L5 is not limited to positive refractive power. Numerical Data Examples 9 through 15 are examples of lens configurations, in which the fifth lens L5 has negative refractive power.

The fifth lens L5 is formed in a shape such that a curvature radius r9 of a surface thereof on the object-side and a curvature radius r10 of a surface thereof on the image plane side are both negative. The fifth lens L5 has a shape of a meniscus lens directing a concave surface thereof to the object side near the optical axis. The shape of the fifth lens L5 may not be limited to the one in Numerical Data Example 1. Numerical Data Example 3 is an example of a shape of a meniscus lens directing a convex surface thereof to the object side near the optical axis. Numerical Data Example 5 is an example of a shape of a biconvex lens near the optical axis. The Numerical Data Examples 9 and 11 are examples of a shape of a biconcave lens near the optical axis.

The sixth lens L6 has negative refractive power. The refractive power of the sixth lens L6 is not limited to negative refractive power. Numerical Data Examples 5 through 12 are examples of lens configurations, in which the sixth lens L6 has positive refractive power.

The sixth lens L6 is formed in a shape such that a curvature radius r11 of a surface thereof on the object-side and a curvature radius r12 of a surface thereof on the image plane side are both negative. The sixth lens L6 has a shape of a meniscus lens directing a concave surface thereof to the object side near the optical axis. The shape of the sixth lens L6 may not be limited to the one in Numerical Data Example 1. Numerical Data Example 7 is an example of a shape of a meniscus lens directing a convex surface thereof to the object side near the optical axis. The Numerical Data Examples 9 and 11 are examples of a shape of a biconvex lens near the optical axis. The Numerical Data Examples 3 is an example of a shape of a biconcave lens near the optical axis.

The seventh lens L7 has positive refractive power. The refractive power of the seventh lens L7 is not limited to positive refractive power. Numerical Data Examples 3, 4, 7, 8, 11, 12 and 15 are examples of lens configurations, in which the seventh lens L7 has negative refractive power.

The seventh lens L7 is formed in a shape, such that a curvature radius r13 of a surface thereof on the object-side and a curvature radius r14 of a surface thereof on the image plane side are both negative. The seventh lens L7 has a shape of a meniscus lens directing a concave surface thereof to the object side near the optical axis. The shape of the seventh lens L7 may not be limited to the one in Numerical Data Example 1. Numerical Data Examples 5 is an example of a shape of a meniscus lens directing a convex surface thereof to the object side near the optical axis. In addition to the shapes described above, the seventh lens L7 can be formed in a shape such that the curvature radius r13 is positive and the curvature radius r14 is negative, or such that the curvature radius r13 is negative and the curvature radius r14 is positive.

The eighth lens L8 has positive refractive power. The refractive power of the eighth lens L8 is not limited to positive refractive power. Numerical Data Examples 2, 4, 6, 8, 10, 12 and 14 are examples of lens configurations, in which the eighth lens L8 has negative refractive power.

The eighth lens L8 is formed in a shape such that a curvature radius r15 of a surface thereof on the object-side and a curvature radius r16 of a surface thereof on the image plane side are both positive. The eighth lens L8 has a shape of a meniscus lens directing a convex surface thereof to the object side near the optical axis. The shape of the eighth lens L8 may not be limited to the one in Numerical Data Example 1. Numerical Data Examples 2, 4, 6, 8, 10, 12 and 14 are examples of a shape of a meniscus lens directing a concave surface thereof to the object side near the optical axis. The Numerical Data Examples 15 is an example of a shape of a biconvex lens near the optical axis. In addition to the shapes described above, the eighth lens L8 can be formed in a shape such that the curvature radius r15 is negative and the curvature radius r16 is positive.

The ninth lens L9 is formed in a shape such that a curvature radius r17 of a surface thereof on the object-side and a curvature radius r18 (=R9r) of a surface thereof on the image plane side are both positive. The ninth lens L9 has a shape of a meniscus lens directing a convex surface thereof to the object side near the optical axis. The shape of the ninth lens L9 may not be limited to the one in Numerical Data Example 1. The Numerical Data Examples 5, 9, 11 and 13 are examples of a shape of a biconcave lens near the optical axis. In addition to the shapes described above, the ninth lens L9 can be formed in a shape such that the curvature radius r17 and the curvature radius r18 are both negative. The ninth lens L9 can be formed in any shape as long as the refractive power thereof is negative.

The ninth lens L9 is formed in a shape such that a surface thereof on the image plane side has an aspheric shape having an inflection point. Here, the "inflection point" means a point where the positive/negative sign of a curvature changes on the curve, i.e., a point where a direction of curving of the curve on the lens surface changes. According to the imaging lens of the embodiment, the image plane-side surface of the ninth lens L9 is formed as an aspheric shape having a pole. According to the imaging lens of Numerical Data Example 1, both surfaces of the eighth lens L8 and the ninth lens L9 are formed as aspheric shapes having an inflection point. Here, depending on the required optical performance and downsizing of the imaging lens, among lens surfaces of the eighth lens L8 and the ninth lens L9, lens surfaces other than the image plane-side surface of the ninth lens L9 can be formed as an aspheric shape without an inflection point.

According to the embodiment, the imaging lens satisfied the following conditional expressions (1) through (14):

$$0.5 < f123/f < 2.5 \tag{1}$$

$$f789 < 0 \tag{2}$$

$$-6 < f3/f2 < -0.2 \tag{3}$$

$$0.003 < D34/f < 0.04 \tag{4}$$

$$0.5 < T8/T7 < 4 \tag{5}$$

$$0.05 < D89/f < 0.15 \tag{6}$$

$$0.2 < R9r/f < 0.6 \tag{7}$$

$$-2 < f9/f < -0.2 \tag{8}$$

$$10 < |f4/f| < 60 \tag{9}$$

$$35 < vd1 < 80 \tag{10}$$

$$10 < vd2 < 30 \tag{11}$$

$$35 < vd3 < 80 \tag{12}$$

$$1.0 < TL/f < 1.5 \tag{13}$$

$$1.0 < TL/Hmax < 1.8 \tag{14}$$

In the above conditional expressions,
f: Focal length of the whole lens system
f2: Focal length of the second lens L2
f3: Focal length of the third lens L3
f4: Focal length of the fourth lens L4
f9: Focal length of the ninth lens L9
f123: Composite focal length of the first lens L1, the second lens L2 and the third lens L3
f789: Composite focal length of the seventh lens L7, the eighth lens L8 and the ninth lens L9
T7: Thickness of the seventh lens L7 on an optical axis
T8: Thickness of the eighth lens L8 on an optical axis
vd1: Abbe's number of the first lens L1
vd2: Abbe's number of the second lens L2
vd3: Abbe's number of the third lens L3
R9r: Paraxial curvature radius of an image plane-side surface of the ninth lens L9
D34: Distance on the optical axis X between the third lens L3 and the fourth lens L4

D89: Distance on the optical axis X between the eighth lens L8 and the ninth lens L9

Hmax: Maximum image height

TL: Distance on an optical axis X from the object-side surface of the first lens L1 to the image plane IM (the filter 10 is a distance in the air)

When the sixth lens L6 has positive refractive power and the seventh lens L7 has positive refractive power as in the lens configurations in Numerical Data Examples 5, 6, 9 and 10, the imaging lens further satisfies the following conditional expression (15):

$$1.5 < f6/f < 6 \qquad (15)$$

In the above conditional expressions, f6 is a focal length of the sixth lens L6.

When the seventh lens L7 has negative refractive power and the eighth lens L8 has positive refractive power as in the lens configurations in Numerical Data Examples 3, 7, 11 and 15, the imaging lens further satisfies the following conditional expression (16):

$$1 < f8/f < 6 \qquad (16)$$

In the above conditional expression, f8 is a focal length of the eighth lens L8.

According to the embodiment, the imaging lens satisfies the following conditional expression (17):

$$f/Dep < 2.4 \qquad (17)$$

In the above conditional expression, Dep is a diameter of entrance pupil of the imaging lens.

Here, it is not necessary to satisfy all of the conditional expressions, and it is achievable to obtain an effect corresponding to the respective conditional expression when any single one of the conditional expressions is individually satisfied.

According to the embodiment, lens surfaces of the respective lenses are formed as aspheric surfaces. An equation that expresses those aspheric surfaces is shown below:

$$Z = \frac{C \cdot H^2}{1 + \sqrt{1 - (1+k) \cdot C^2 \cdot H^2}} + \sum (An \cdot H^n) \qquad \text{[Equation 1]}$$

In the above conditional expression,

Z: Distance in a direction of the optical axis

H: Distance from the optical axis in a direction perpendicular to the optical axis C: Paraxial curvature (=1/r, r: paraxial curvature radius)

k: Conic constant

An: The nth aspheric coefficient

Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index at a reference wavelength of 588 nm, and νd represents an Abbe's number at the reference wavelength, respectively. Here, surfaces indicated with surface numbers i affixed with * (asterisk) are aspheric surfaces.

Numerical Data Example 1

Basic Lens Data

TABLE 1

| | | f = 5.93 mm Fno = 2.0 ω = 38.1° | | | | |
|---|---|---|---|---|---|---|
| | i | r | d | n d | ν d | [mm] |
| | | ∞ | ∞ | | | |
| L1 | 1* | 2.433 | 0.739 | 1.5443 | 55.9 | f1 = 4.968 |
| | 2*(ST) | 21.721 | 0.024 | | | |
| L2 | 3* | 6.011 | 0.384 | 1.6707 | 19.2 | f2 = −13.390 |
| | 4* | 3.509 | 0.513 | | | |
| L3 | 5* | 32.482 | 0.381 | 1.5443 | 55.9 | f3 = 33.868 |
| | 6* | −42.448 | 0.040 | | | |
| L4 | 7* | 61.356 | 0.296 | 1.5443 | 55.9 | f4 = −98.577 |
| | 8* | 31.762 | 0.224 | | | |
| L5 | 9* | −42.249 | 0.488 | 1.5443 | 55.9 | f5 = 156.289 |
| | 10* | −28.344 | 0.142 | | | |
| L6 | 11* | −12.959 | 0.284 | 1.6707 | 19.2 | f6 = −100.191 |
| | 12* | −17.129 | 0.161 | | | |
| L7 | 13* | −4.162 | 0.262 | 1.5443 | 55.9 | f7 = 12.387 |
| | 14* | −2.843 | 0.046 | | | |
| L8 | 15* | 6.365 | 0.620 | 1.5443 | 55.9 | f8 = 97.295 |
| | 16* | 6.987 | 0.698 | | | |
| L9 | 17* | 342.766 | 0.589 | 1.5443 | 55.9 | f9 = −5.393 |
| | 18* | 2.909 | 0.250 | | | |
| | 19 | ∞ | 0.210 | 1.5168 | 64.2 | |
| | 20 | ∞ | 0.684 | | | |
| (IM) | | ∞ | | | | | f123=6.047 mm
f789=−15.540 mm
f34=51.160 mm
f89=−5.998 mm
T7=0.262 mm
T8=0.620 mm
D34=0.040 mm
D89=0.698 mm
TL=6.962 mm
Hmax=4.65 mm
Dep=2.964 mm

TABLE 2

| | | | | Aspherical surface data | | | | |
|---|---|---|---|---|---|---|---|---|
| i | k | A4 | A6 | A8 | A10 | A12 | A14 | A16 |
| 1 | 4.803E−01 | −2.484E−03 | −3.339E−03 | 1.755E−03 | −8.007E−04 | 1.378E−04 | 7.009E−06 | −1.463E−05 |
| 2 | 0.000E+00 | −1.511E−02 | 2.402E−02 | −1.561E−02 | 5.086E−03 | −7.207E−04 | −2.771E−05 | 1.351E−05 |
| 3 | −8.935E+00 | −1.832E−02 | 2.046E−02 | −1.300E−02 | 8.061E−03 | −5.456E−03 | 2.361E−03 | −3.793E−04 |
| 4 | −1.058E+01 | 1.813E−02 | −1.337E−02 | 1.203E−02 | −7.376E−03 | 1.485E−03 | 5.800E−03 | −6.247E−05 |
| 5 | 0.000E+00 | −5.229E−03 | −1.772E−02 | 1.735E−02 | −1.115E−02 | −2.550E−03 | 4.914E−03 | −1.123E−03 |
| 6 | 0.000E+00 | −1.235E−02 | −1.070E−01 | 1.338E−01 | −5.586E−02 | 1.495E−04 | 1.120E−04 | 1.459E−03 |
| 7 | 0.000E+00 | −5.527E−02 | −6.674E−02 | 8.073E−02 | −1.253E−02 | −1.457E−02 | 1.095E−03 | 1.811E−03 |
| 8 | 0.000E+00 | −4.956E−02 | −3.567E−03 | 4.606E−03 | 2.679E−04 | −1.039E−03 | −1.724E−05 | 1.707E−04 |
| 9 | 0.000E+00 | −3.011E−02 | 5.294E−03 | −2.812E−03 | −4.723E−03 | 2.099E−03 | 1.367E−04 | −1.652E−04 |
| 10 | 0.000E+00 | −3.316E−02 | 4.497E−04 | −3.650E−03 | −1.873E−03 | 1.335E−03 | −2.405E−04 | 1.253E−05 |
| 11 | 0.000E+00 | −1.987E−02 | −1.129E−03 | −7.865E−03 | 1.727E−03 | −6.324E−05 | 7.694E−05 | −1.499E−05 |
| 12 | 0.000E+00 | −6.429E−02 | 2.253E−02 | −3.273E−03 | −1.459E−03 | 1.024E−03 | −2.807E−04 | 2.803E−05 |
| 13 | 2.938E+00 | −3.826E−02 | 2.717E−02 | −1.196E−02 | 3.876E−03 | −7.530E−04 | 8.264E−05 | −2.419E−06 |

TABLE 2-continued

Aspherical surface data

| i | k | A4 | A6 | A8 | A10 | A12 | A14 | A16 |
|---|---|---|---|---|---|---|---|---|
| 14 | −6.779E+00 | −1.053E−02 | 7.189E−03 | −7.391E−03 | 2.671E−03 | −3.403E−04 | 1.247E−05 | −4.985E−08 |
| 15 | 0.000E+00 | −2.050E−03 | −1.555E−02 | 4.790E−03 | −8.168E−04 | −1.748E−05 | 2.608E−05 | −2.921E−06 |
| 16 | 0.000E+00 | −1.598E−02 | 1.336E−03 | −7.055E−04 | 1.110E−04 | −3.618E−06 | −8.289E−07 | 7.208E−08 |
| 17 | 0.000E+00 | −7.061E−02 | 1.483E−02 | −1.762E−03 | 1.462E−04 | −8.385E−06 | 3.120E−07 | −5.954E−09 |
| 18 | −8.233E+00 | −4.358E−02 | 1.038E−02 | −1.960E−03 | 2.367E−04 | −1.704E−05 | 6.671E−07 | −1.112E−08 |

Figure 2:
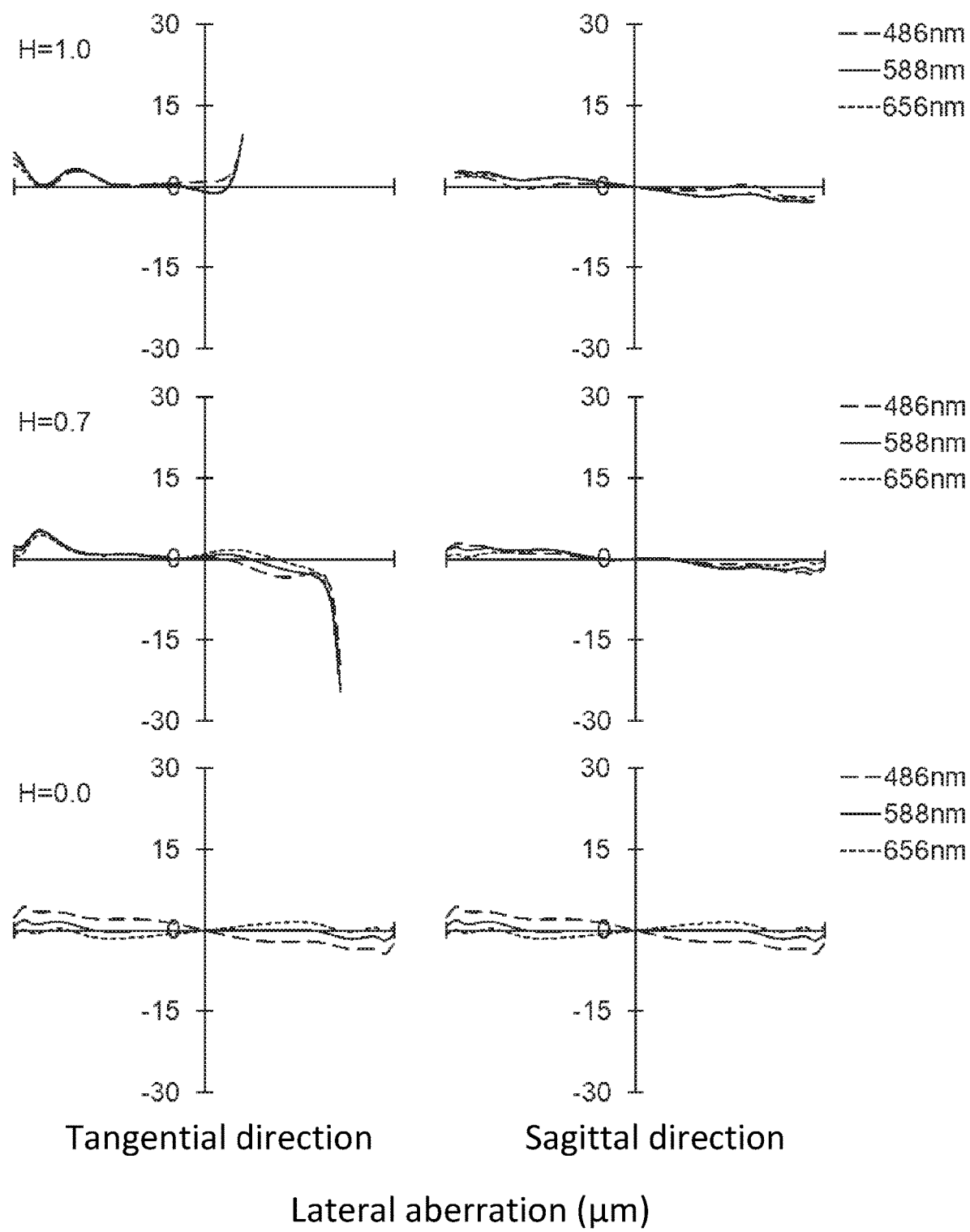
FIG. 2 is an aberration diagram showing a lateral aberration of the imaging lens of FIG. 1.
Figure 3:
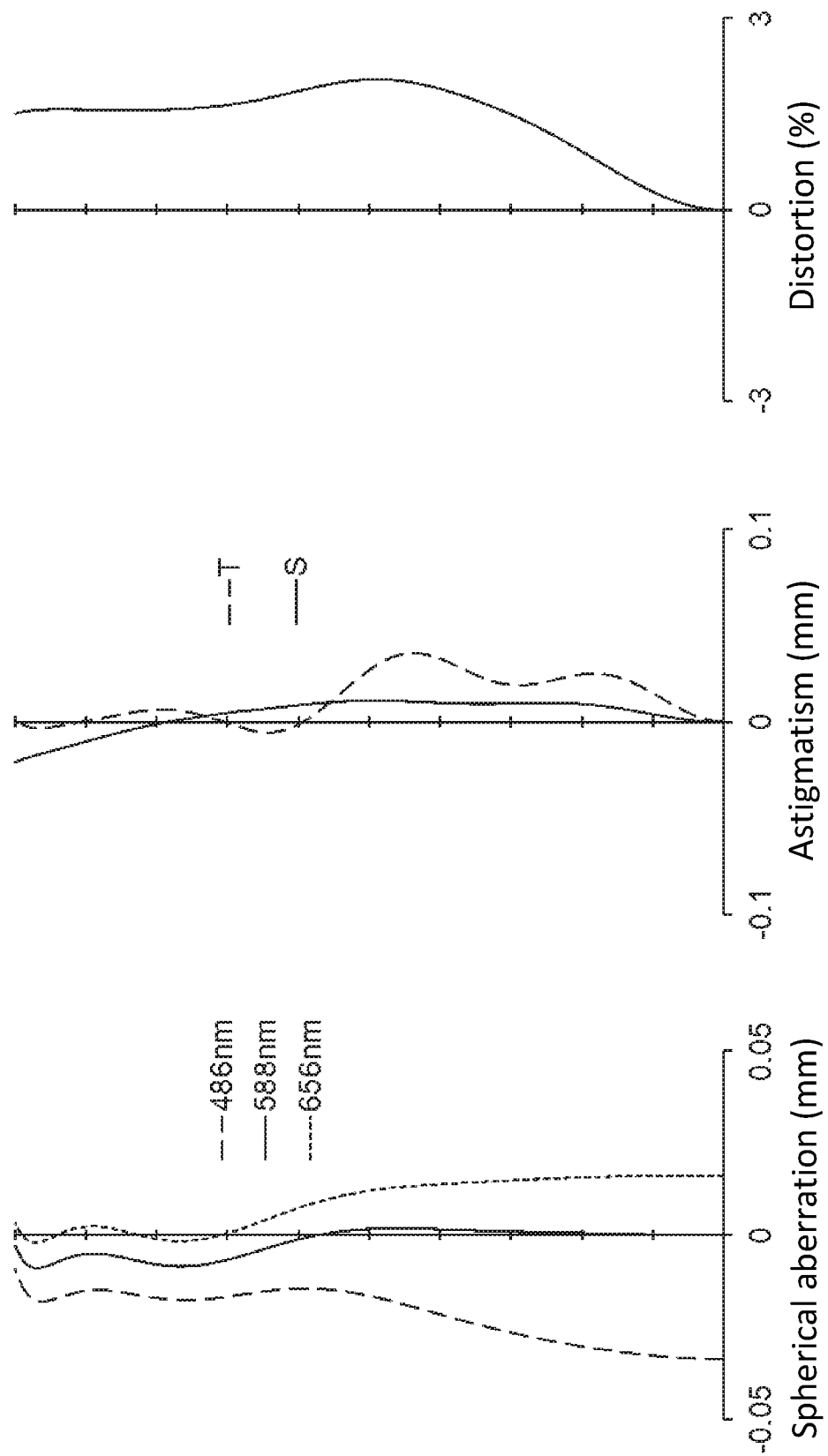
FIG. 3 is an aberration diagram showing a spherical aberration, astigmatism, and a distortion of the imaging lens of FIG. 1.
Figure 4:
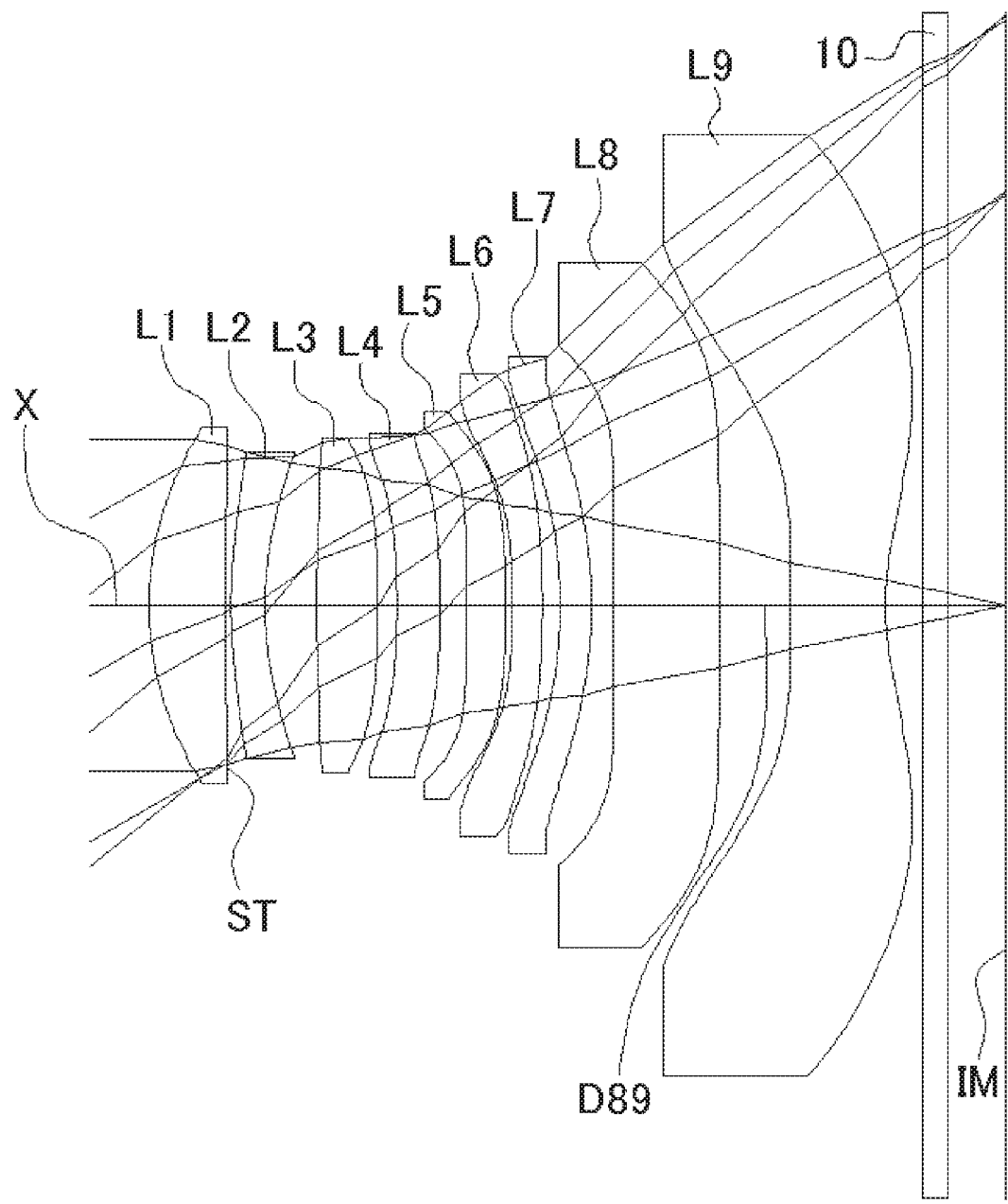
FIG. 4 shows a sectional view of a schematic configuration of an imaging lens in Numerical Data Example 2 of the present invention.

The values of the respective conditional expressions are as follows:

$f123/f=1.020$ $f3/f2=-2.529$ $D34/f=0.007$ $T8/T7=2.366$ $D89/f=0.118$ $R9r/f=0.491$ $f9/f=-0.909$ $f4/f1=16.623$ $TL/f=1.174$ $TL/H\text{max}=1.497$ $f/Dep=2.00$ FIG. 2 shows a lateral aberration that corresponds to a ratio H of each image height to the maximum image height Hmax(hereinafter referred to as "image height ratio H"), which is divided into a tangential direction and a sagittal direction (The same is true for FIGS. 5, 8, 11, 14, 17, 20, 23, 26, 29, 32, 35, 38, 41 and 44). FIG. 3 shows a spherical aberration (mm), astigmatism (mm), and a distortion (%), respectively. The aberration diagrams of the astigmatism and the distortion show aberrations at a reference wavelength (588 nm). Furthermore, in the aberration diagrams of the astigmatism shows sagittal image surfaces (S) and tangential image surface (T), respectively (The same is true for FIGS. 6, 9, 12, 15, 18, 21, 24, 27, 30, 33, 36, 39, 42 and 45).

Numerical Data Example 2
Basic Lens Data

TABLE 3 f = 5.88 mm Fno = 2.2 ω = 38.5°

| | i | r | d | n d | ν d [mm] |
|---|---|---|---|---|---|
| | | ∞ | ∞ | | |
| L1 | 1* | 2.513 | 0.619 | 1.5443 | 55.9  f1 = 5.011 |
| | 2*(ST) | 29.210 | 0.044 | | |
| L2 | 3* | 4.266 | 0.275 | 1.6707 | 19.2  f2 = −12.079 |
| | 4* | 2.722 | 0.419 | | |
| L3 | 5* | 12.239 | 0.496 | 1.5443 | 55.9  f3 = 11.023 |
| | 6* | −11.601 | 0.154 | | |
| L4 | 7* | −7.710 | 0.350 | 1.5443 | 55.9  f4 = −101.260 |
| | 8* | −9.107 | 0.218 | | |
| L5 | 9* | −29.188 | 0.312 | 1.5443 | 55.9  f5 = 39.730 |
| | 10* | −12.469 | 0.056 | | |
| L6 | 11* | −7.614 | 0.241 | 1.5443 | 55.9  f6 = −100.579 |
| | 12* | −8.943 | 0.144 | | |
| L7 | 13* | −4.147 | 0.255 | 1.6707 | 19.2  f7 = 45.531 |
| | 14* | −3.742 | 0.180 | | |
| L8 | 15* | −16.107 | 0.862 | 1.5443 | 55.9  f8 = −101.005 |
| | 16* | −23.211 | 0.563 | | |
| L9 | 17* | 19.553 | 0.773 | 1.5443 | 55.9  f9 = −5.046 |
| | 18* | 2.375 | 0.300 | | |
| | 19 | ∞ | 0.210 | 1.5168 | 64.2 |
| | 20 | ∞ | 0.465 | | |
| (IM) | | ∞ | | | | f123=4.934 mm
f789=−5.278 mm
f34=12.516 mm
f89=−4.672 mm
T7=0.255 mm
T8=0.862 mm
D34=0.154 mm
D89=0.563 mm
TL=6.864 mm
Hmax=4.68 mm
Dep=2.673 mm

TABLE 4

Aspherical surface data

| i | k | A4 | A6 | A8 | A10 | A12 | A14 | A16 |
|---|---|---|---|---|---|---|---|---|
| 1 | 1.631E−02 | −2.364E−03 | −1.415E−03 | 1.062E−03 | −1.128E−03 | 2.608E−04 | 9.542E−05 | −4.863E−05 |
| 2 | 0.000E+00 | −1.069E−02 | 2.715E−02 | −1.929E−02 | 6.524E−03 | −7.281E−04 | 1.095E−04 | −8.911E−05 |
| 3 | −7.488E−00 | −3.539E−02 | 3.109E−02 | −2.186E−02 | 6.941E−03 | 2.487E−03 | −2.214E−03 | 3.777E−04 |
| 4 | −9.585E+00 | 2.655E−02 | −2.773E−02 | 2.033E−02 | −1.017E−02 | 4.821E−03 | −7.752E−04 | 9.624E−05 |
| 5 | 0.000E+00 | −7.234E−03 | −1.203E−02 | 9.726E−03 | −1.003E−02 | 4.559E−03 | 6.359E−04 | −2.913E−04 |
| 6 | 0.000E+00 | −3.215E−02 | −2.012E−02 | 4.627E−04 | 2.745E−03 | −8.980E−05 | 3.225E−04 | −6.325E−05 |
| 7 | 0.000E+00 | −4.199E−02 | −1.491E−02 | 2.441E−03 | 8.018E−04 | 2.668E−04 | 1.049E−03 | −7.288E−04 |
| 8 | 0.000E+00 | −2.929E−02 | −1.905E−02 | 2.606E−03 | 4.192E−03 | 5.328E−04 | −5.243E−04 | 9.389E−05 |
| 9 | 0.000E+00 | −9.184E−03 | −3.522E−02 | 7.558E−04 | −1.519E−03 | 2.233E−04 | 5.373E−04 | −1.248E−04 |
| 10 | 0.000E−00 | −4.797E−02 | −1.589E−02 | −4.475E−04 | 1.924E−03 | −8.456E−05 | −2.345E−04 | 1.217E−06 |
| 11 | 0.000E+00 | −7.415E−02 | −4.906E−03 | 7.712E−03 | 5.772E−04 | 2.104E−05 | 4.597E−05 | −5.227E−05 |
| 12 | 0.000E+00 | −2.248E−02 | 2.266E−03 | −1.538E−03 | 6.086E−04 | 1.507E−04 | 3.434E−06 | −1.726E−05 |
| 13 | 1.604E+00 | −3.127E−02 | 3.136E−02 | −1.587E−02 | 5.387E−03 | −1.066E−03 | 1.054E−04 | −2.079E−06 |
| 14 | −1.531E+01 | −3.468E−02 | 2.163E−02 | −1.079E−02 | 3.503E−03 | −5.416E−04 | 2.462E−05 | 1.884E−06 |
| 15 | −1.651E+03 | 2.505E−02 | −1.450E−02 | 4.049E−05 | 3.833E−04 | −1.315E−04 | 3.692E−05 | −3.682E−06 |

TABLE 4-continued

| | | | Aspherical surface data | | | | | |
|---|---|---|---|---|---|---|---|---|
| i | k | A4 | A6 | A8 | A10 | A12 | A14 | A16 |
| 16 | 0.000E+00 | 1.271E−02 | −3.050E−03 | −7.631E−04 | 1.969E−04 | −1.289E−05 | −4.316E−08 | 2.196E−08 |
| 17 | −9.710E+02 | −7.822E−02 | 1.718E−02 | −2.254E−03 | 2.201E−04 | −1.473E−05 | 5.953E−07 | −1.263E−08 |
| 18 | −5.698E+00 | −4.926E−02 | 1.403E−02 | −2.852E−03 | 3.569E−04 | −2.592E−05 | 1.003E−06 | −1.603E−08 |

The values of the respective conditional expressions are as follows:

$f123/f$=0.839

$f3/f2$=−0.913

$D34/f$=0.026

$T8/T7$=3.380

$D89/f$=0.096

$R9r/f$=0.404

$f9/f$=−0.858

$|f4/f|$=17.221

$TL/f$=1.167

$TL/H$max=1.467

$f/D$ep=2.20

Figure 5:
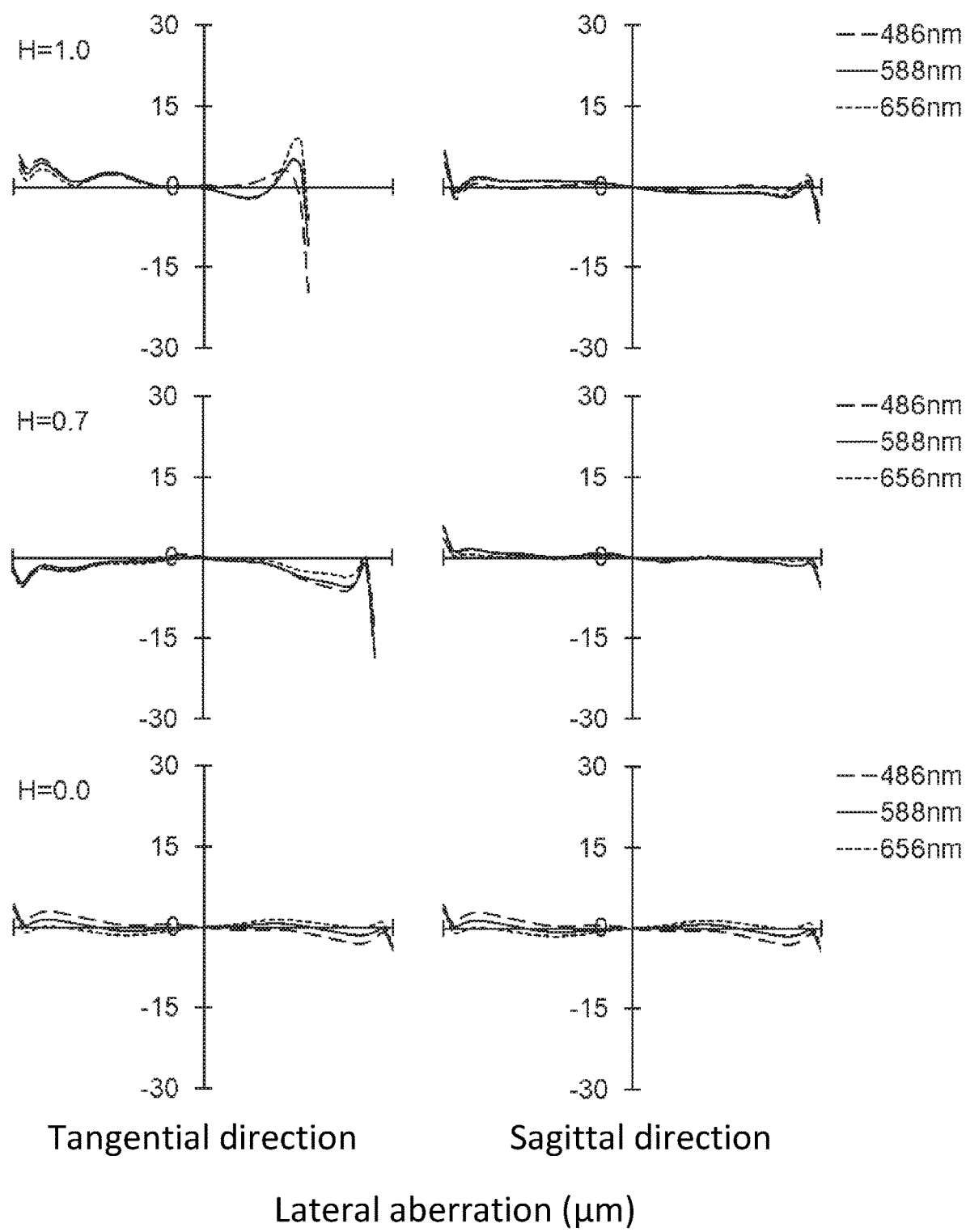
FIG. 5 is an aberration diagram showing a lateral aberration of the imaging lens of FIG. 4.
Figure 6:
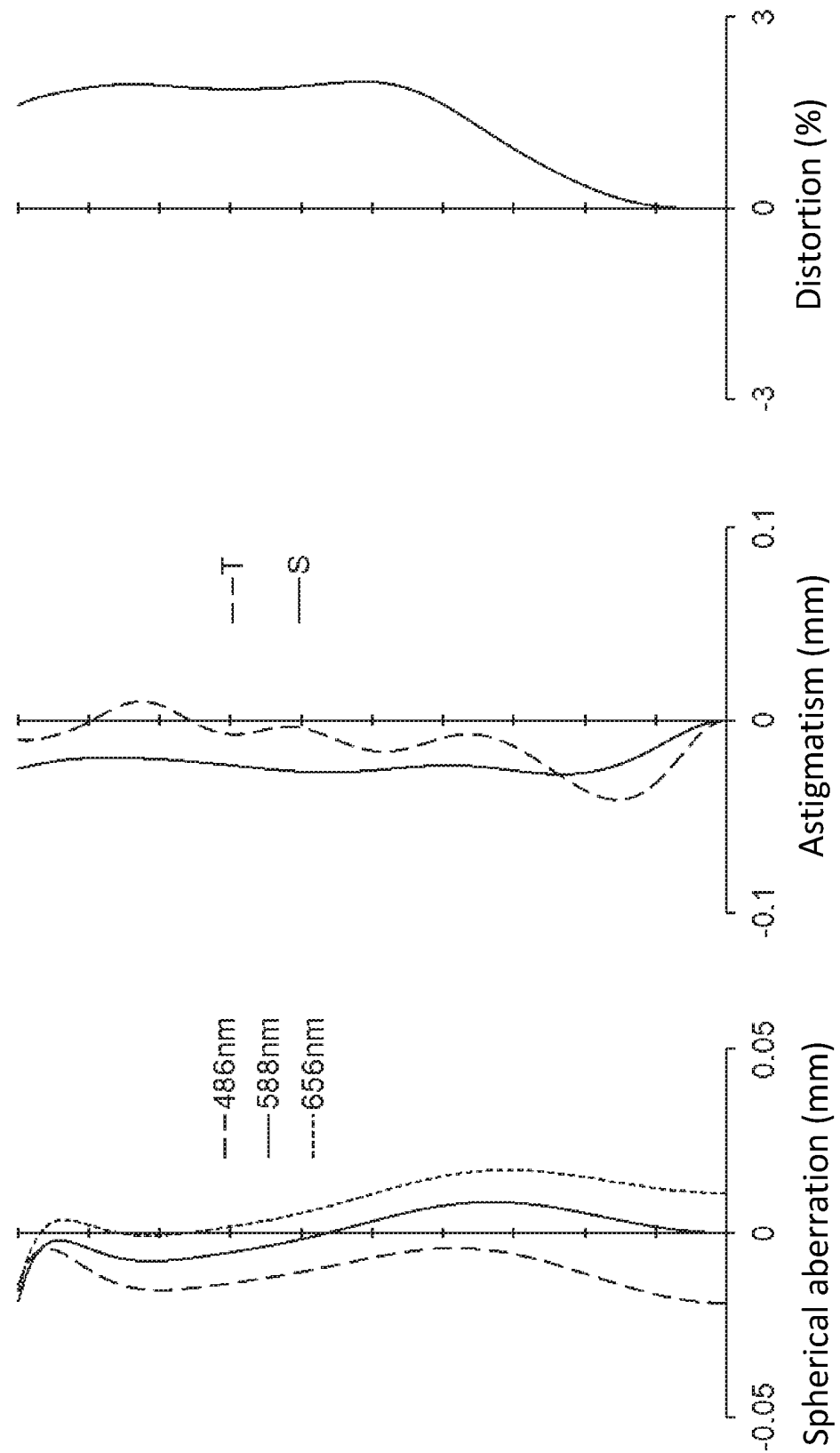
FIG. 6 is an aberration diagram showing a spherical aberration, astigmatism, and a distortion of the imaging lens of FIG. 4.
Figure 7:
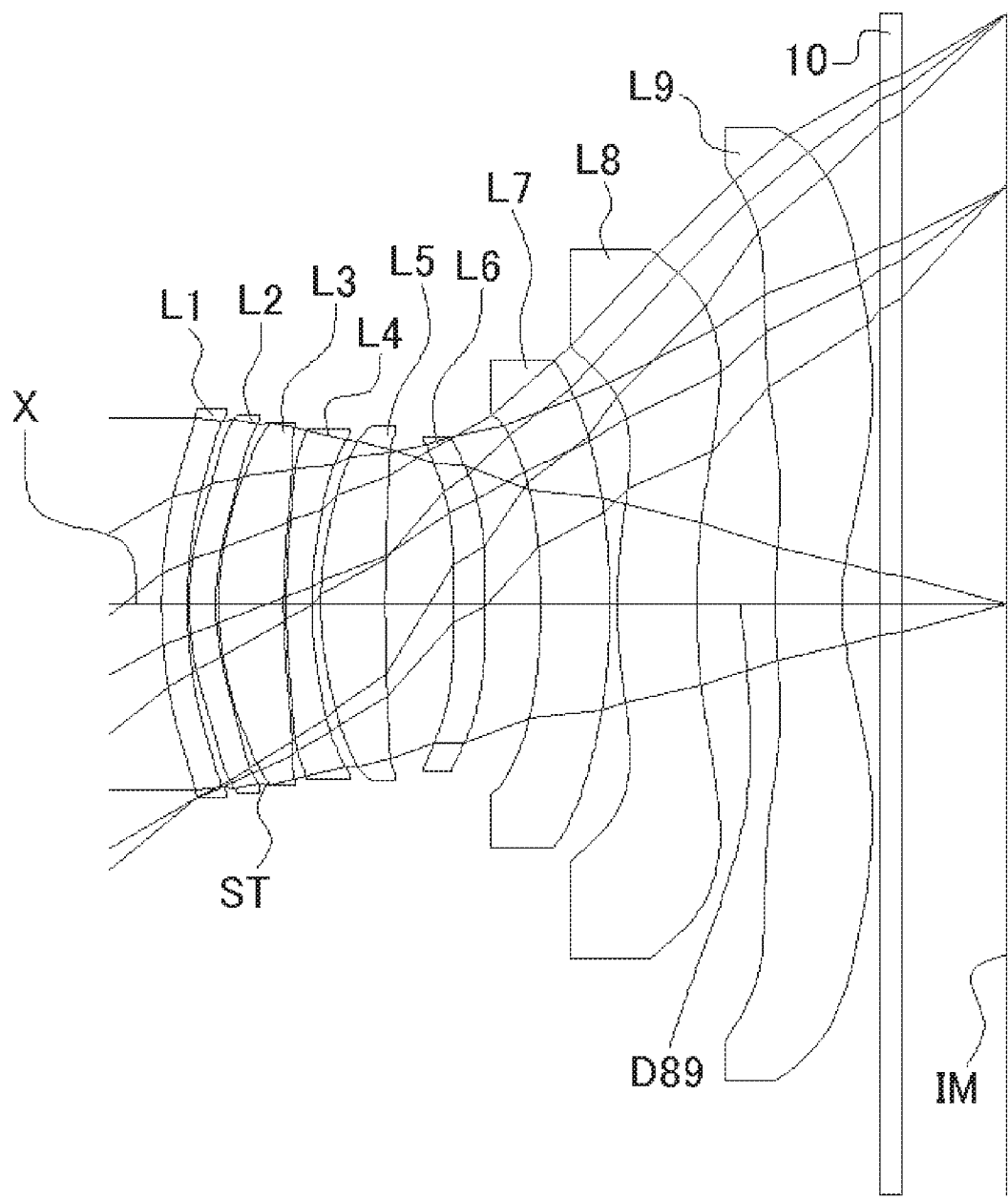
FIG. 7 shows a sectional view of a schematic configuration of an imaging lens in Numerical Data Example 3 of the present invention.

FIG. 5 shows a lateral aberration that corresponds to an image height H and FIG. 6 shows a spherical aberration (mm), astigmatism (mm), and a distortion (%), respectively.

Numerical Data Example 3
Basic Lens Data

TABLE 5

| | | f = 6.69 mm Fno = 1.9 ω = 39.4° | | | | |
|---|---|---|---|---|---|---|
| | i | r | d | n d | ν d | [mm] |
| L1 | 1* | ∞ | ∞ | | | |
| | | 4.554 | 0.241 | 1.5443 | 55.9 | f1 = 168.573 |
| | 2* | 4.703 | 0.013 | | | |

TABLE 5-continued

| | | f = 6.69 mm Fno = 1.9 ω = 39.4° | | | | |
|---|---|---|---|---|---|---|
| | i | r | d | n d | ν d | [mm] |
| L2 | 3* | 2.674 | 0.250 | 1.6707 | 19.2 | f2 = −37.585 |
| | 4* | 2.327 | 0.026 | | | |
| L3 | 5*(ST) | 2.673 | 0.604 | 1.5443 | 55.9 | f3 = 10.436 |
| | 6* | 4.646 | 0.024 | | | |
| L4 | 7* | 4.325 | 0.240 | 1.6707 | 19.2 | f4 = −20.451 |
| | 8* | 3.215 | 0.082 | | | |
| L5 | 9* | 3.006 | 0.600 | 1.5348 | 55.7 | f5 = 6.644 |
| | 10* | 18.173 | 0.636 | | | |
| L6 | 11* | −114.999 | 0.290 | 1.6707 | 19.2 | f6 = −165.852 |
| | 12* | 3403.533 | 0.520 | | | |
| L7 | 13* | −6.983 | 0.643 | 1.6707 | 19.2 | f7 = −1106.716 |
| | 14* | −7.311 | 0.072 | | | |
| L8 | 15* | 4.960 | 0.738 | 1.5443 | 55.9 | f8 = 30.845 |
| | 16* | 6.671 | 0.728 | | | |
| L9 | 17* | 4.554 | 0.622 | 1.5348 | 55.7 | f9 = −8.205 |
| | 18* | 2.128 | 0.350 | | | |
| | 19 | ∞ | 0.210 | 1.5168 | 64.2 | |
| | 20 | ∞ | 0.967 | | | |
| (IM) | | ∞ | | | | | f123=14.363 mm
f789=−12.361 mm
f34=18.586 mm
f89=−13.008 mm
T7=0.643 mm
T8=0.738 mm
D34=0.024 mm
D89=0.728 mm
TL=7.786 mm
Hmax=5.5 mm
Dep=3.580 mm

TABLE 6

| | Aspherical surface data | | | | |
|---|---|---|---|---|---|
| i | k | A4 | A6 | A8 | A10 |
| 1 | −2.903E+00 | −2.840E−03 | 3.666E−03 | 2.653E−03 | −1.781E−03 |
| 2 | 0.000E+00 | −6.759E−03 | 1.393E−02 | −1.753E−03 | −1.208E−03 |
| 3 | −8.279E−01 | −9.632E−03 | −3.446E−03 | −2.973E−03 | 2.428E−04 |
| 4 | −2.643E+00 | −2.679E−02 | −2.696E−03 | 1.240E−03 | −2.133E−04 |
| 5 | −7.377E+00 | 3.144E−03 | 3.691E−04 | 1.023E−02 | −2.341E−03 |
| 6 | 0.000E+00 | −1.960E−01 | 3.624E−01 | −2.982E−01 | 6.091E−02 |
| 7 | −5.934E+01 | −1.276E−01 | 3.174E−01 | −3.087E−01 | 8.547E−02 |
| 8 | −2.787E+01 | −9.518E−03 | 1.197E−01 | −1.802E−01 | 8.390E−02 |
| 9 | 9.769E−01 | −6.405E−02 | 1.196E−01 | −1.641E−01 | 1.246E−01 |
| 10 | 0.000E+00 | −1.669E−02 | 5.408E−02 | −9.812E−02 | 1.015E−01 |
| 11 | 0.000E+00 | −1.005E−01 | 6.471E−02 | −7.631E−02 | 6.640E−02 |
| 12 | 0.000E+00 | −9.707E−02 | 3.009E−02 | −2.233E−02 | 1.977E−02 |
| 13 | 0.000E+00 | −6.975E−03 | −1.472E−02 | 5.360E−03 | 1.906E−03 |
| 14 | 0.000E+00 | 6.942E−03 | −2.099E−02 | 1.364E−02 | −4.130E−03 |
| 15 | 2.500E+00 | −3.122E−03 | −2.657E−02 | 1.472E−02 | −5.084E−03 |
| 16 | 0.000E+00 | 4.283E−03 | −4.816E−03 | 8.185E−04 | −4.823E−05 |
| 17 | −5.014E−02 | −8.151E−02 | 1.987E−02 | −2.407E−03 | 1.408E−04 |
| 18 | −6.160E+00 | −3.496E−02 | 7.216E−03 | −9.870E−04 | 8.630E−05 |

TABLE 6-continued

Aspherical surface data

| i | A12 | A14 | A16 | A18 | A20 |
|---|---|---|---|---|---|
| 1 | 1.135E−04 | −1.965E−05 | 3.271E−06 | 1.197E−05 | −2.515E−06 |
| 2 | 1.404E−04 | −6.020E−04 | 2.544E−04 | 1.825E−05 | −1.149E−05 |
| 3 | 1.212E−04 | 9.894E−05 | 4.977E−06 | −7.271E−07 | −1.768E−06 |
| 4 | 8.330E−05 | 1.389E−04 | −1.127E−05 | −1.365E−07 | −2.249E−06 |
| 5 | −1.371E−03 | −2.302E−04 | 7.811E−05 | 1.529E−04 | −3.684E−05 |
| 6 | 3.934E−02 | −9.929E−03 | −1.012E−02 | 5.050E−03 | −6.591E−04 |
| 7 | 3.807E−02 | −1.492E−02 | −8.918E−03 | 5.197E−03 | −7.151E−04 |
| 8 | 2.271E−02 | −2.982E−02 | 7.377E−03 | −6.482E−05 | −1.238E−04 |
| 9 | −6.858E−02 | 3.558E−02 | −1.444E−02 | 3.298E−03 | −2.982E−04 |
| 10 | −5.206E−02 | 1.342E−04 | 1.343E−02 | −5.859E−03 | 8.071E−04 |
| 11 | −3.244E−02 | 4.504E−03 | 3.860E−03 | −1.962E−03 | 2.722E−04 |
| 12 | −9.813E−03 | 9.466E−04 | 1.608E−03 | −7.279E−04 | 9.396E−05 |
| 13 | −1.820E−03 | 6.100E−04 | −2.487E−04 | 8.746E−05 | −1.243E−05 |
| 14 | 5.352E−04 | 3.464E−06 | −8.061E−06 | 7.327E−07 | −2.295E−08 |
| 15 | 9.070E−04 | −2.577E−05 | −2.376E−05 | 4.595E−06 | −2.746E−07 |
| 16 | −7.959E−06 | 1.477E−06 | −5.821E−08 | −3.399E−09 | 2.368E−10 |
| 17 | −2.391E−06 | −7.095E−08 | −4.873E−09 | 6.089E−10 | −1.362E−11 |
| 18 | −4.353E−06 | 9.605E−08 | 8.336E−10 | −7.853E−11 | 9.971E−13 |

Figure 8:
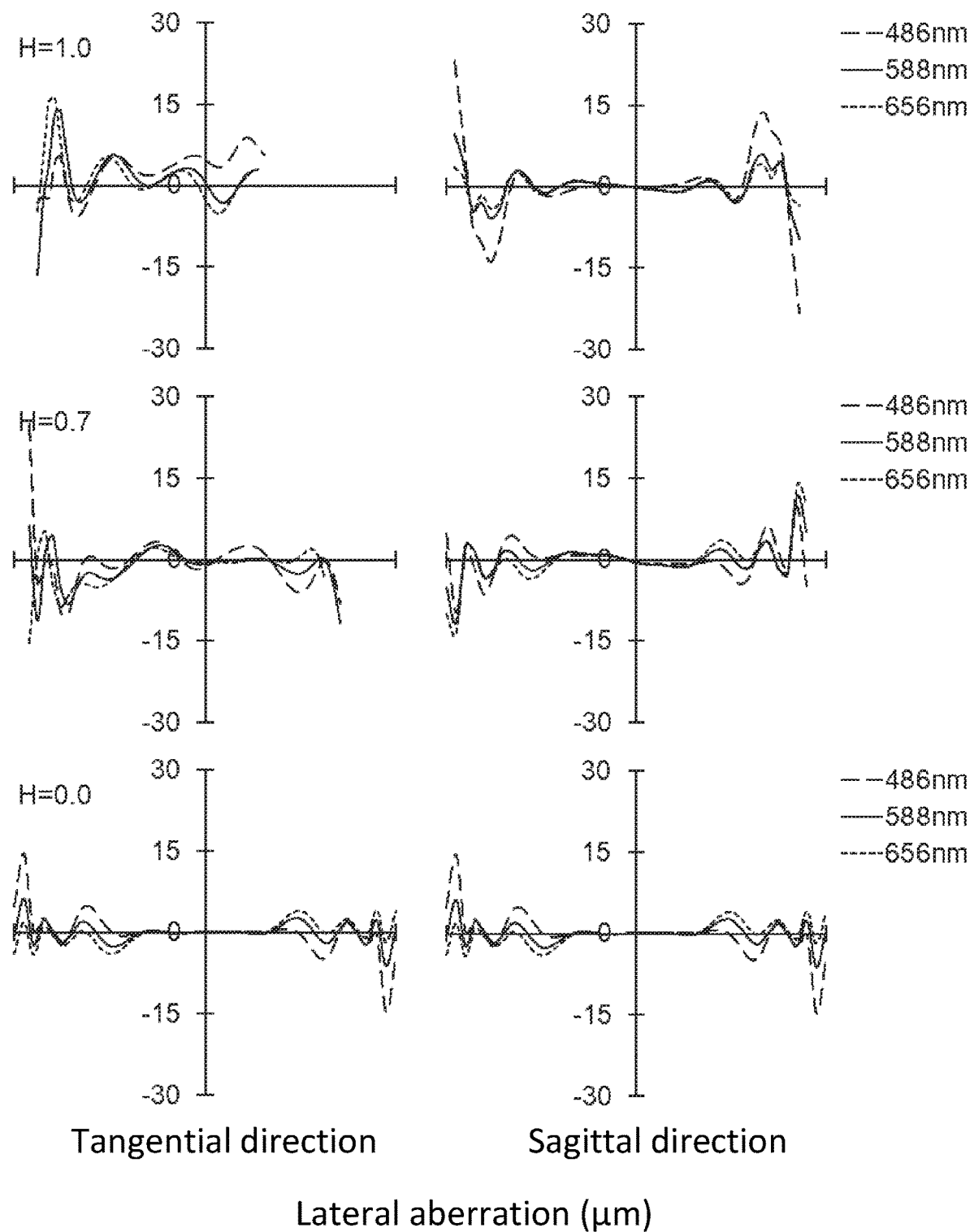
FIG. 8 is an aberration diagram showing a lateral aberration of the imaging lens of FIG. 7.
Figure 9:
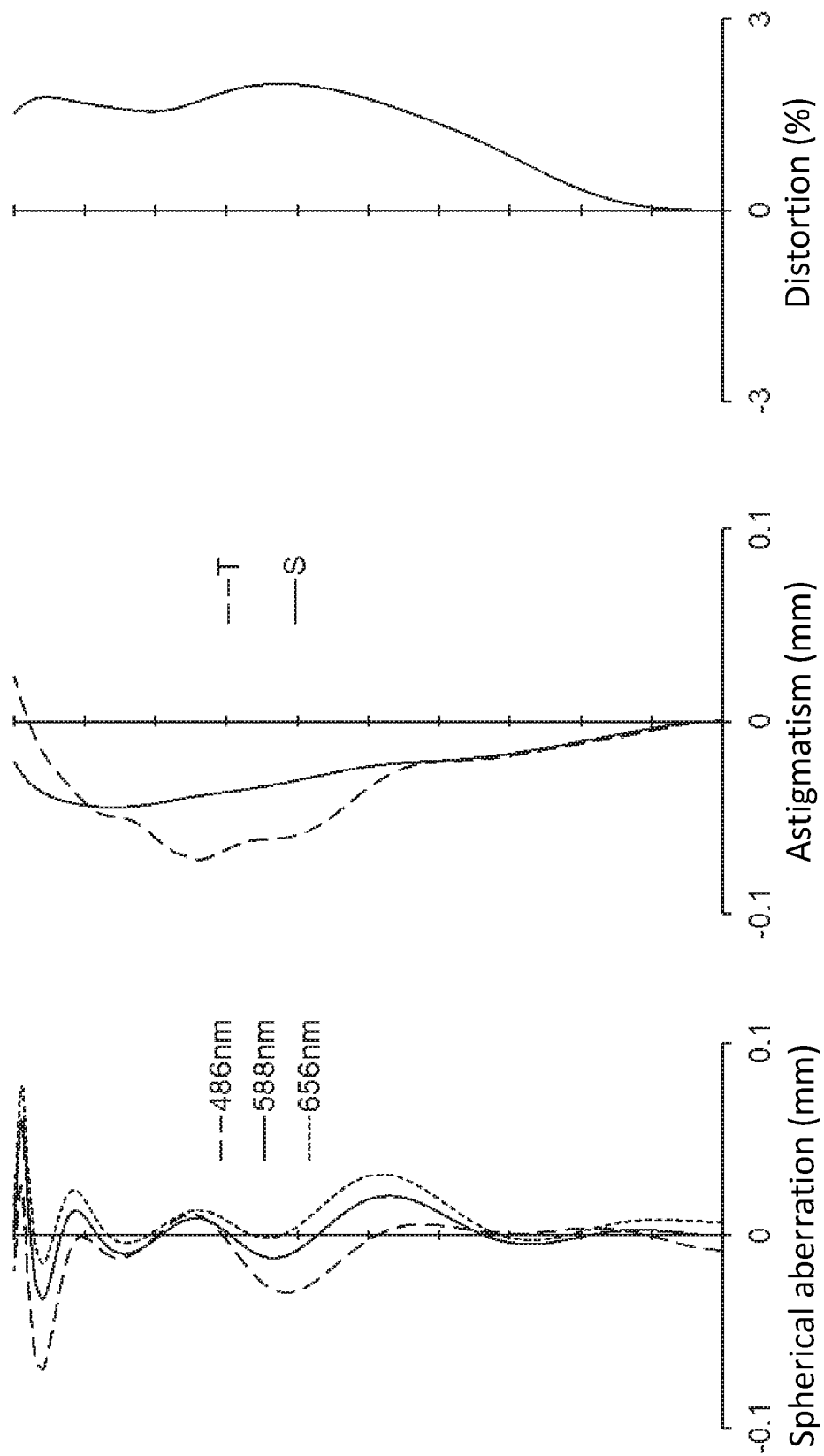
FIG. 9 is an aberration diagram showing a spherical aberration, astigmatism, and a distortion of the imaging lens of FIG. 7.
Figure 10:
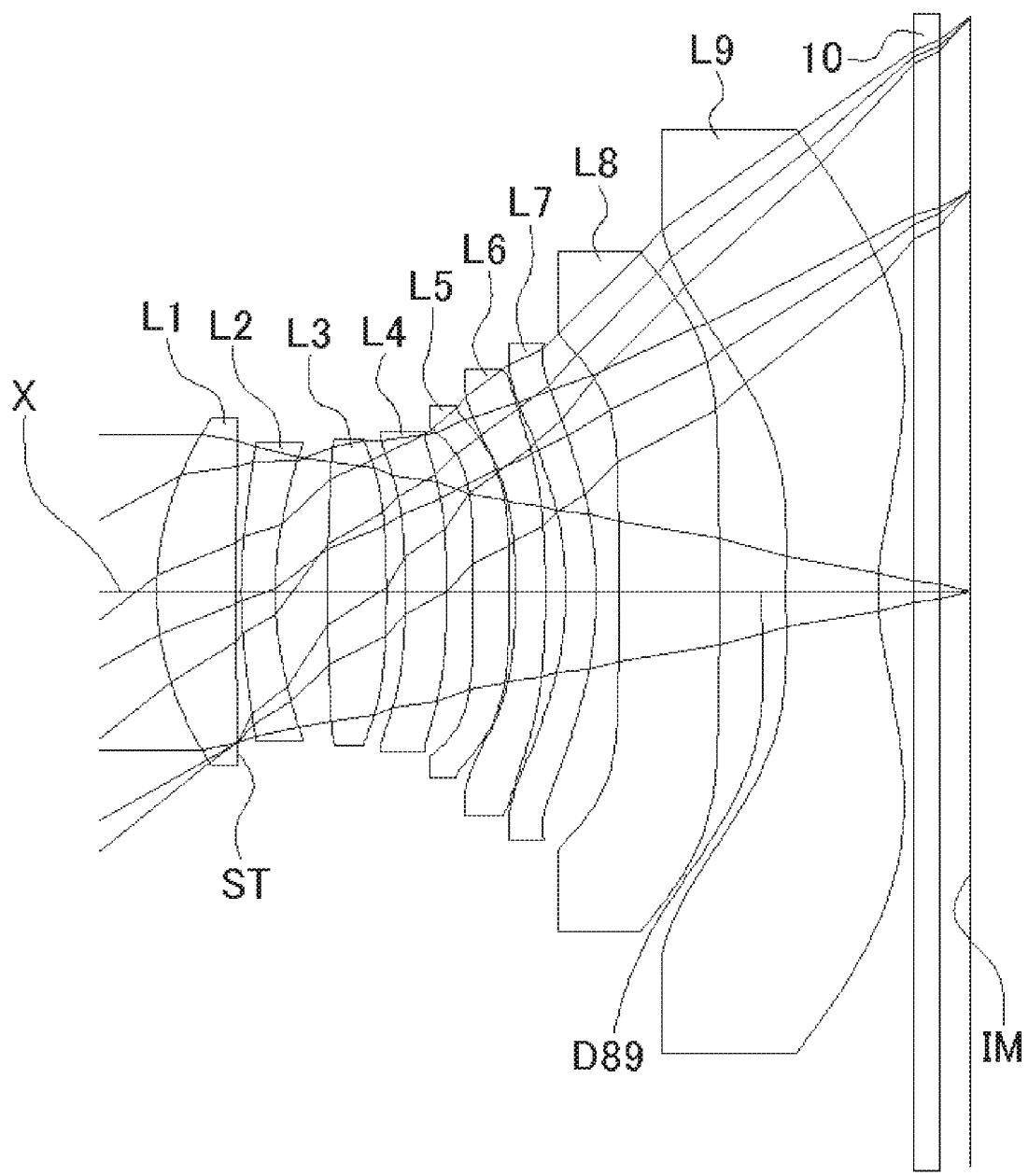
FIG. 10 shows a sectional view of a schematic configuration of an imaging lens in Numerical Data Example 4 of the present invention.

The values of the respective conditional expressions are as follows:

$f123/f=2.147$ $f3/f2=-0.278$ $D34/f=0.004$ $T8/T7=1.148$ $D89/f=0.109$ $R9r/f=0.318$ $f9/f=-1.226$ $|f4/f|=3.057$ $TL/f=1.164$ $TL/Hmax=1.416$ $f/Dep=1.87$ $f8/f=4.611$ FIG. 8 shows a lateral aberration that corresponds to an image height H and FIG. 9 shows a spherical aberration (mm), astigmatism (mm), and a distortion (%), respectively.

Numerical Data Example 4
Basic Lens Data

TABLE 7 f = 584 mm Fno = 2.2 ω = 38.8°

| | i | r | d | n d | v d | [mm] |
|---|---|---|---|---|---|---|
| L1 | 1* | ∞ | ∞ | | | |
| | 2*(ST) | 2.424 | 0.662 | 1.5443 | 55.9 | f1 = 4.901 |
| | | 23.995 | 0.047 | | | |
| L2 | 3* | 4.222 | 0.286 | 1.6707 | 19.2 | f2 = −12.746 |
| | 4* | 2.749 | 0.437 | | | |

TABLE 7-continued f = 584 mm Fno = 2.2 ω = 38.8°

| | i | r | d | n d | v d | [mm] |
|---|---|---|---|---|---|---|
| L3 | 5* | 12.112 | 0.497 | 1.5443 | 55.9 | f3 = 10.792 |
| | 6* | −11.240 | 0.160 | | | |
| L4 | 7* | −7.647 | 0.347 | 1.5443 | 55.9 | f4 = −150.078 |
| | 8* | −8.572 | 0.222 | | | |
| L5 | 9* | −34.831 | 0.306 | 1.5443 | 55.9 | f5 = 39.932 |
| | 10* | −14.440 | 0.049 | | | |
| L6 | 11* | −8.292 | 0.252 | 1.6707 | 19.2 | f6 = −86.375 |
| | 12* | −9.942 | 0.170 | | | |
| L7 | 13* | −3.297 | 0.258 | 1.5443 | 55.9 | f7 = −102.528 |
| | 14* | −3.600 | 0.193 | | | |
| L8 | 15* | −17.257 | 0.843 | 1.5443 | 55.9 | f8 = −120.547 |
| | 16* | −23.819 | 0.559 | | | |
| L9 | 17* | 20.378 | 0.775 | 1.5443 | 55.9 | f9 = −4.998 |
| | 18* | 2.368 | 0.300 | | | |
| | 19 | ∞ | 0.210 | 1.5168 | 64.2 | |
| | 20 | ∞ | 0.267 | | | |
| (IM) | | ∞ | | | | | f123=4.722 mm f789=−4.294 mm f34=11.783 mm f89=−4.679 mm

T7=0.258 mm

T8=0.843 mm

D34=0.160 mm

D89=0.559 mm

TL=6.767 mm

Hmax=4.70 mm

Dep=2.656 mm

TABLE 8

Aspherical surface data

| i | k | A4 | A6 | A8 | A10 | A12 | A14 | A16 |
|---|---|---|---|---|---|---|---|---|
| 1 | 1.817E−02 | −2.192E−03 | −1.581E−03 | 1.129E−03 | −1.136E−03 | 2.439E−04 | 1.040E−04 | −5.144E−05 |
| 2 | 0.000E+00 | −2.061E−02 | 2.718E−02 | −1.934E−02 | 6.466E−03 | −7.239E−04 | 1.096E−04 | −8.879E−05 |
| 3 | −8.390E+00 | −3.567E−02 | 3.100E−02 | −2.207E−02 | 6.813E−03 | 2.483E−03 | −2.219E−03 | 3.919E−04 |
| 4 | −1.058E+01 | 2.478E−02 | −2.782E−02 | 1.999E−02 | −1.064E−02 | 4.908E−03 | −5.231E−04 | −3.309E−05 |
| 5 | 0.000E+00 | −5.296E−03 | −1.135E−02 | 1.031E−02 | −9.561E−03 | 4.729E−03 | 6.920E−04 | −2.997E−04 |
| 6 | 0.000E+00 | −3.038E−02 | −1.774E−02 | 5.009E−04 | 2.297E−03 | 4.670E−05 | 4.765E−04 | −1.692E−05 |
| 7 | 0.000E+00 | −3.773E−02 | −1.516E−02 | 2.504E−03 | 1.140E−03 | 2.884E−03 | 1.057E−03 | −8.917E−04 |
| 8 | 0.000E+00 | −2.949E−02 | −1.918E−02 | 5.141E−03 | 4.867E−03 | 2.668E−03 | −7.507E−04 | 1.758E−04 |
| 9 | 0.000E+00 | −1.911E−02 | −3.592E−02 | 6.090E−04 | −1.766E−03 | 7.873E−05 | 5.682E−04 | −1.688E−04 |
| 10 | 0.000E+00 | −4.657E−02 | −1.825E−02 | −3.303E−04 | 2.117E−03 | −7.221E−05 | −2.667E−04 | 1.217E−04 |
| 11 | 0.000E+00 | −7.819E−02 | −4.271E−03 | 7.805E−03 | 5.618E−04 | 1.869E−05 | 4.700E−05 | −5.167E−05 |
| 12 | 0.000E+00 | −2.599E−02 | 1.782E−03 | −1.392E−03 | 5.853E−04 | 1.345E−04 | 5.129E−06 | −1.390E−05 |
| 13 | 1.371E+00 | −2.627E−02 | 3.276E−02 | −1.567E−02 | 5.411E−03 | −1.074E−03 | 1.065E−04 | −1.955E−06 |
| 14 | −9.170E+00 | −3.643E−02 | 2.215E−02 | −1.078E−02 | 3.474E−03 | −5.480E−04 | 2.498E−05 | 2.040E−06 |
| 15 | 0.000E+00 | 2.802E−02 | −1.445E−02 | −4.490E−06 | 3.776E−04 | −1.317E−04 | 3.770E−05 | −3.547E−06 |
| 16 | 0.000E+00 | 1.145E−02 | −2.804E−03 | −7.466E−04 | 1.948E−04 | −1.297E−05 | −5.217E−08 | 2.463E−08 |
| 17 | 0.000E+00 | −8.016E−02 | 1.719E−02 | −2.262E−03 | 2.206E−04 | −1.467E−05 | 5.987E−07 | −1.251E−08 |
| 18 | −6.343E+00 | −4.668E−02 | 1.369E−02 | −2.841E−03 | 3.570E−04 | −2.595E−05 | 1.004E−06 | −1.597E−08 |

Figure 11:
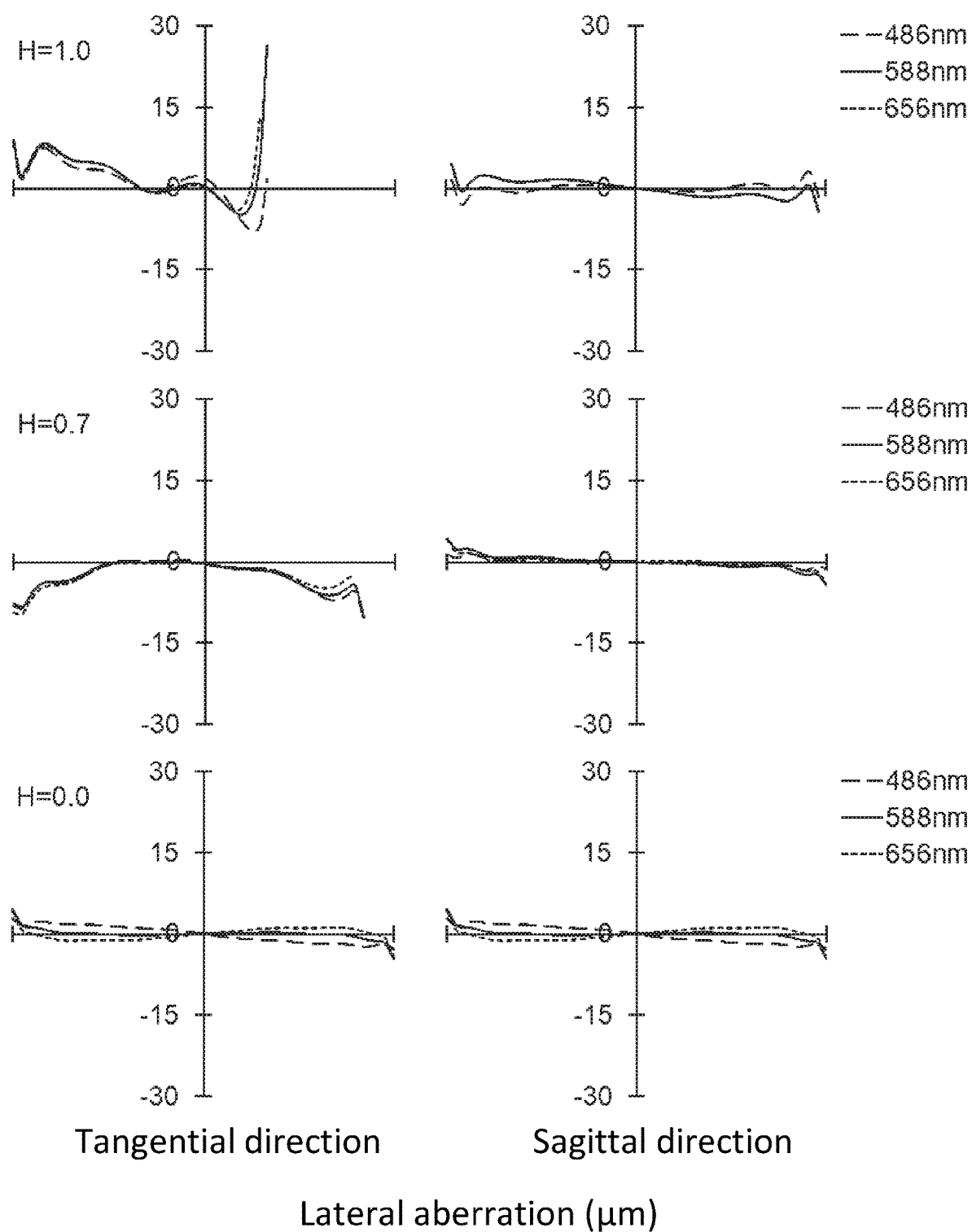
FIG. 11 is an aberration diagram showing a lateral aberration of the imaging lens of FIG. 10.
Figure 12:
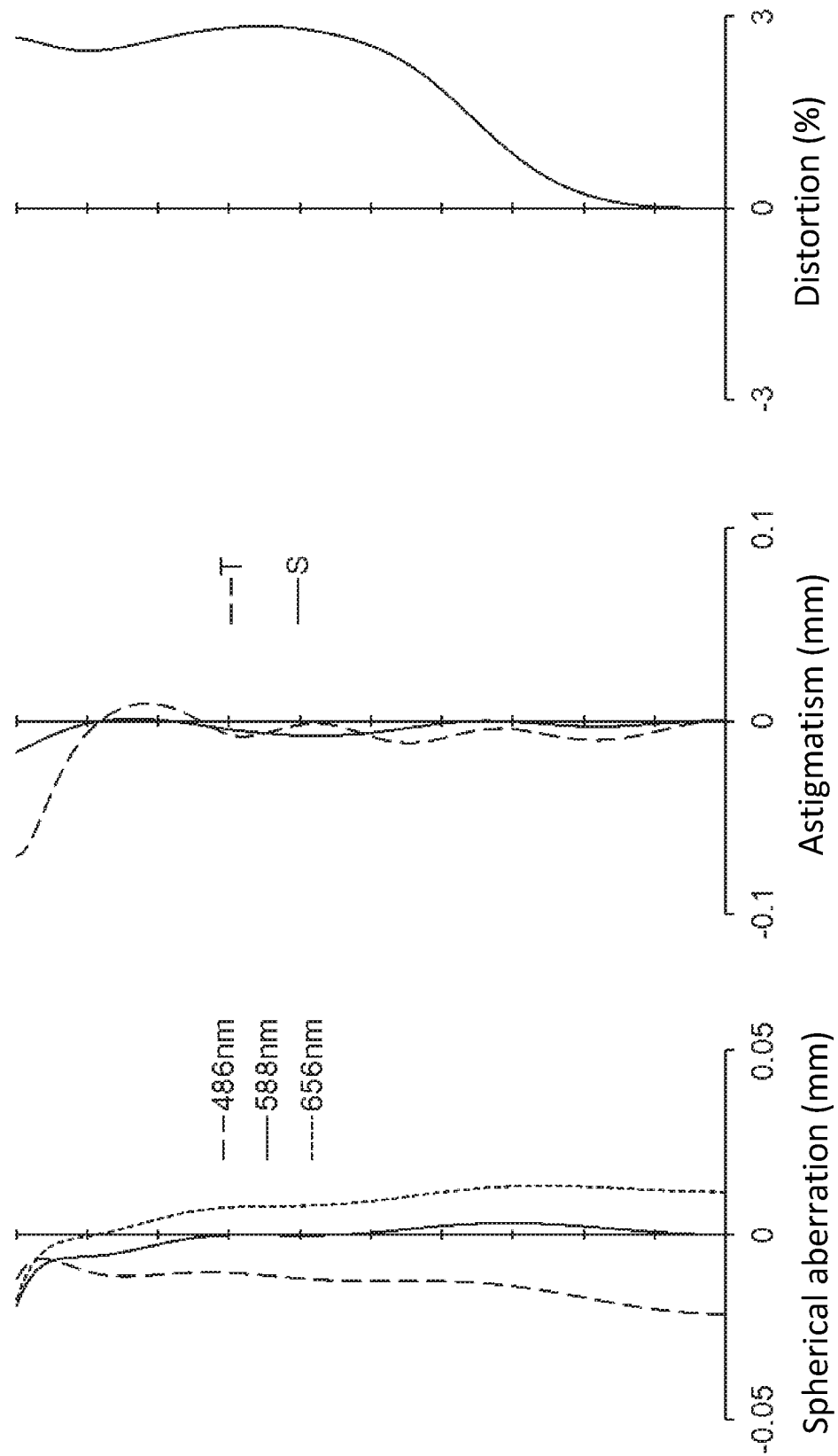
FIG. 12 is an aberration diagram showing a spherical aberration, astigmatism, and a distortion of the imaging lens of FIG. 10.
Figure 13:
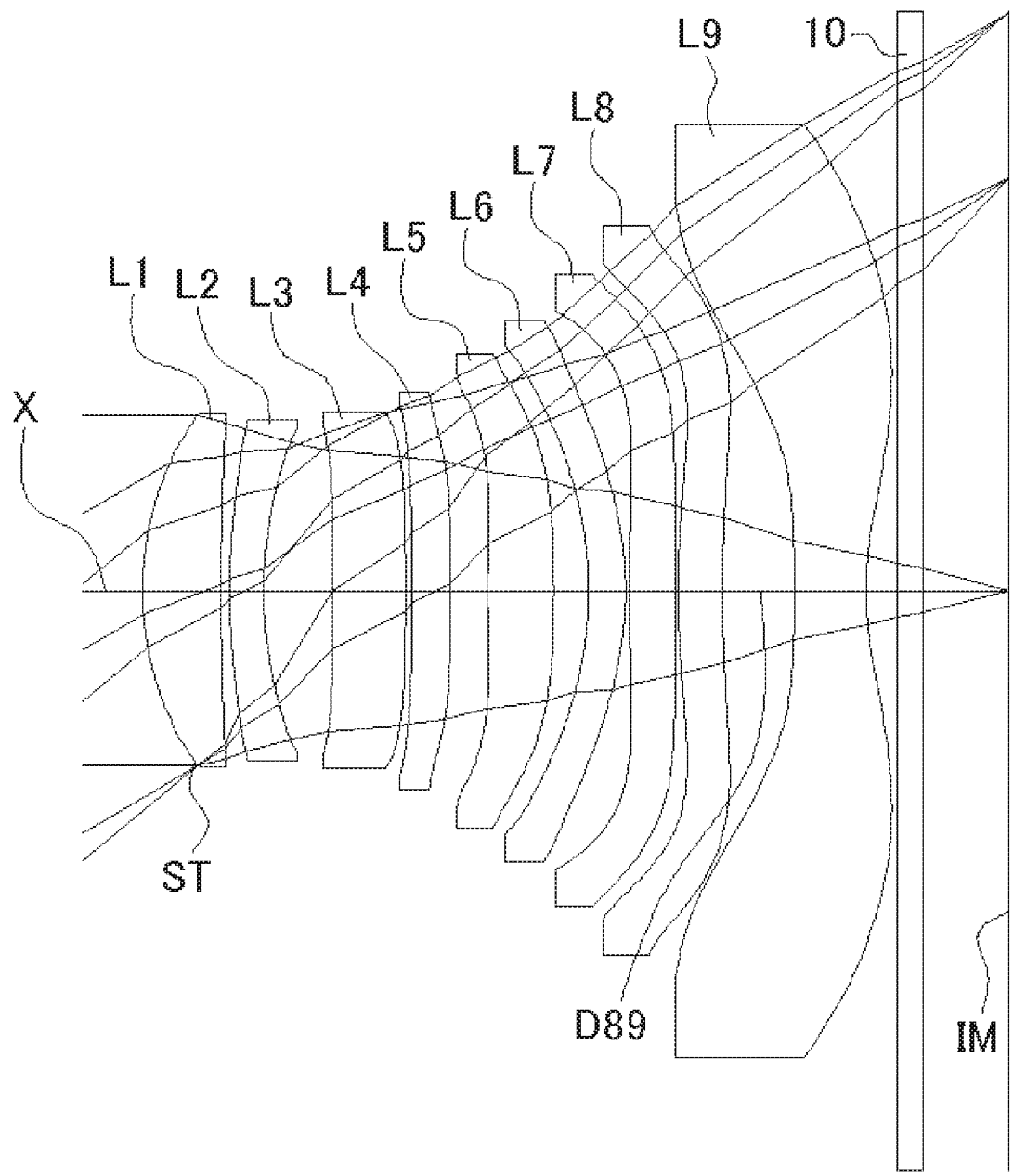
FIG. 13 shows a sectional view of a schematic configuration of an imaging lens in Numerical Data Example 5 of the present invention.

The values of the respective conditional expressions are as follows:

$f123/f=0.809$ $f3/f2=-0.847$ $D34/f=0.027$ $T8/T7=3.267$ $D89/f=0.096$ $R9r/f=0.405$ $f9/f=-0.856$ $|f4/f|=25.698$ $TL/f=1.159$ $TL/Hmax=1.440$ $f/Dep=2.20$ FIG. 11 shows a lateral aberration that corresponds to an image height H and FIG. 12 shows a spherical aberration (mm), astigmatism (mm), and a distortion (%), respectively.

Numerical Data Example 5
Basic Lens Data

TABLE 9

$f = 5.62$ mm Fno = 2.0 ω = 39.3°

| | i | r | d | n d | ν d | [m] |
|---|---|---|---|---|---|---|
| L1 | 1*(ST) | ∞ | ∞ | | | |
| | | 2.544 | 0.635 | 1.5443 | 55.9 | f1 = 5.274 |
| | 2* | 20.429 | 0.069 | | | |

TABLE 9-continued $f = 5.62$ mm Fno = 2.0 ω = 39.3°

| | i | r | d | n d | ν d | [m] |
|---|---|---|---|---|---|---|
| L2 | 3* | 4.796 | 0.277 | 1.6707 | 19.2 | f2 = −13.843 |
| | 4* | 3.089 | 0.553 | | | |
| L3 | 5* | 59.609 | 0.594 | 1.5443 | 55.9 | f3 = 43.579 |
| | 6* | −39.258 | 0.054 | | | |
| L4 | 7* | −182.047 | 0.307 | 1.5443 | 55.9 | f4 = −86.699 |
| | 8* | 63.741 | 0.306 | | | |
| L5 | 9* | 17.595 | 0.533 | 1.5443 | 55.9 | f5 = 15.427 |
| | 10* | −15.891 | 0.282 | | | |
| L6 | 11* | −3.338 | 0.302 | 1.6707 | 19.2 | f6 = 26.229 |
| | 12* | −2.908 | 0.030 | | | |
| L7 | 13* | 15.306 | 0.367 | 1.5443 | 55.9 | f7 = 39.640 |
| | 14* | 52.223 | 0.030 | | | |
| L8 | 15* | 7.573 | 0.361 | 1.5443 | 55.9 | f8 = 37.296 |
| | 16* | 11.876 | 0.578 | | | |
| L9 | 17* | −83.364 | 0.581 | 1.5443 | 55.9 | f9 = −4.485 |
| | 18* | 2.521 | 0.250 | | | |
| | 19 | ∞ | 0.210 | 1.5168 | 64.2 | |
| | 20 | ∞ | 0.694 | | | |
| (IM) | | ∞ | | | | | f123=6.731 mm
f789=−6.541 mm
f34=86.905 mm
f89=−5.354 mm
T7=0.367 mm
T8=0.361 mm
D34=0.055 mm
D89=0.578 mm
TL=6.940 mm
Hmax=4.60 mm
Dep=2.839 mm

TABLE 10

Aspherical surface data

| i | k | A4 | A6 | A8 | A10 | A12 | A14 | A16 |
|---|---|---|---|---|---|---|---|---|
| 1 | 2.844E−01 | 1.341E−04 | −2.190E−04 | 7.270E−04 | −6.359E−04 | 2.432E−04 | −4.460E−06 | −1.698E−05 |
| 2 | 0.000E+00 | −1.782E−02 | 2.215E−02 | −1.386E−02 | 4.862E−03 | −7.148E−04 | −4.685E−05 | 1.272E−05 |
| 3 | −1.943E+01 | −2.347E−02 | 2.420E−02 | −1.356E−02 | 4.915E−03 | −7.843E−04 | 1.268E−04 | −3.052E−05 |
| 4 | −1.212E+0I | 2.209E−02 | −1.379E−02 | 1.250E−02 | −5.433E−03 | 1.715E−03 | −2.907E−04 | 1.700E−04 |
| 5 | 0.000E+00 | −1.400E−02 | −8.467E−03 | 3.733E−06 | −4.217E−04 | 9.565E−05 | 1.763E−04 | 4.588E−05 |

TABLE 10-continued

Aspherical surface data

| i | k | A4 | A6 | A8 | A10 | A12 | A14 | A16 |
|---|---|---|---|---|---|---|---|---|
| 6 | 0.000E+00 | −4.071E−03 | −1.129E−02 | −1.150E−03 | 3.793E−04 | 2.161E−04 | 6.054E−05 | −6.621E−05 |
| 7 | 0.000E+00 | −1.904E−02 | −3.027E−03 | 1.562E−03 | 9.479E−05 | 1.581E−04 | 1.545E−05 | −3.790E−05 |
| 8 | 0.000E+00 | −4.528E−02 | 3.947E−04 | 1.086E−03 | 4.217E−04 | 6.668E−05 | −2.938E−05 | 7.817E−06 |
| 9 | 0.000E+00 | −3.655E−02 | 1.313E−04 | −2.608E−03 | −5.745E−03 | 2.974E−04 | 5.831E−05 | −1.876E−05 |
| 10 | 0.000E+00 | −5.103E−02 | 1.068E−02 | −2.255E−03 | −1.308E−03 | 1.133E−03 | −2.696E−04 | 2.180E−05 |
| 11 | 7.417E−01 | −1.830E−02 | 2.194E−02 | −1.222E−02 | 4.176E−03 | −6.799E−04 | 2.679E−05 | 2.026E−06 |
| 12 | −5.767E+00 | −2.084E−02 | 1.653E−02 | −8.511E−03 | 2.330E−03 | −3.049E−04 | 1.707E−05 | −4.772E−07 |
| 13 | 0.000E+00 | −1.264E−02 | −8.871E−04 | −1.218E−03 | 3.415E−04 | −5.751E−05 | 5.224E−06 | −2.641E−07 |
| 14 | 0.000E+00 | −7.812E−03 | −6.941E−04 | −6.117E−04 | 1.161E−04 | −7.738E−06 | 2.938E−08 | 3.541E−08 |
| 15 | 0.000E+00 | −1.154E−02 | −4.708E−04 | −1.175E−04 | 3.415E−04 | −5.732E−05 | 5.472E−06 | 1.782E−07 |
| 16 | 0.000E+00 | −4.664E−03 | −5.171E−04 | −5.966E−04 | 1.169E−04 | −7.911E−06 | −1.830E−08 | 2.495E−08 |
| 17 | 0.000E+00 | −7.019E−02 | 1.534E−02 | −1.779E−03 | 1.444E−04 | −8.501E−06 | 3.137E−07 | −5.051E−09 |
| 18 | −5.687E+00 | −4.532E−02 | 1.164E−02 | −2.097E−03 | 2.376E−04 | −1.595E−05 | 5.772E−07 | −8.675E−09 |

Figure 14:
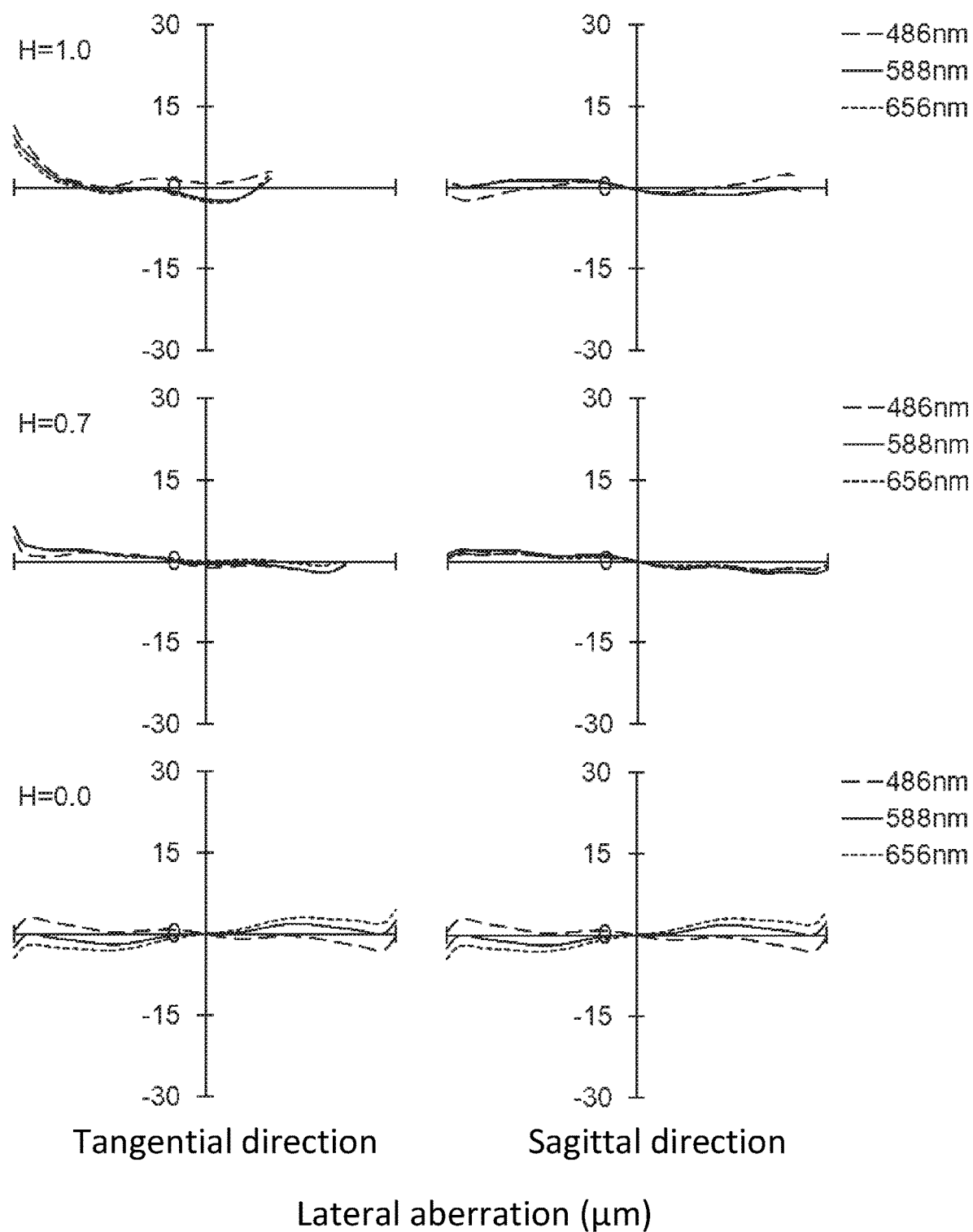
FIG. 14 is an aberration diagram showing a lateral aberration of the imaging lens of FIG. 13.
Figure 15:
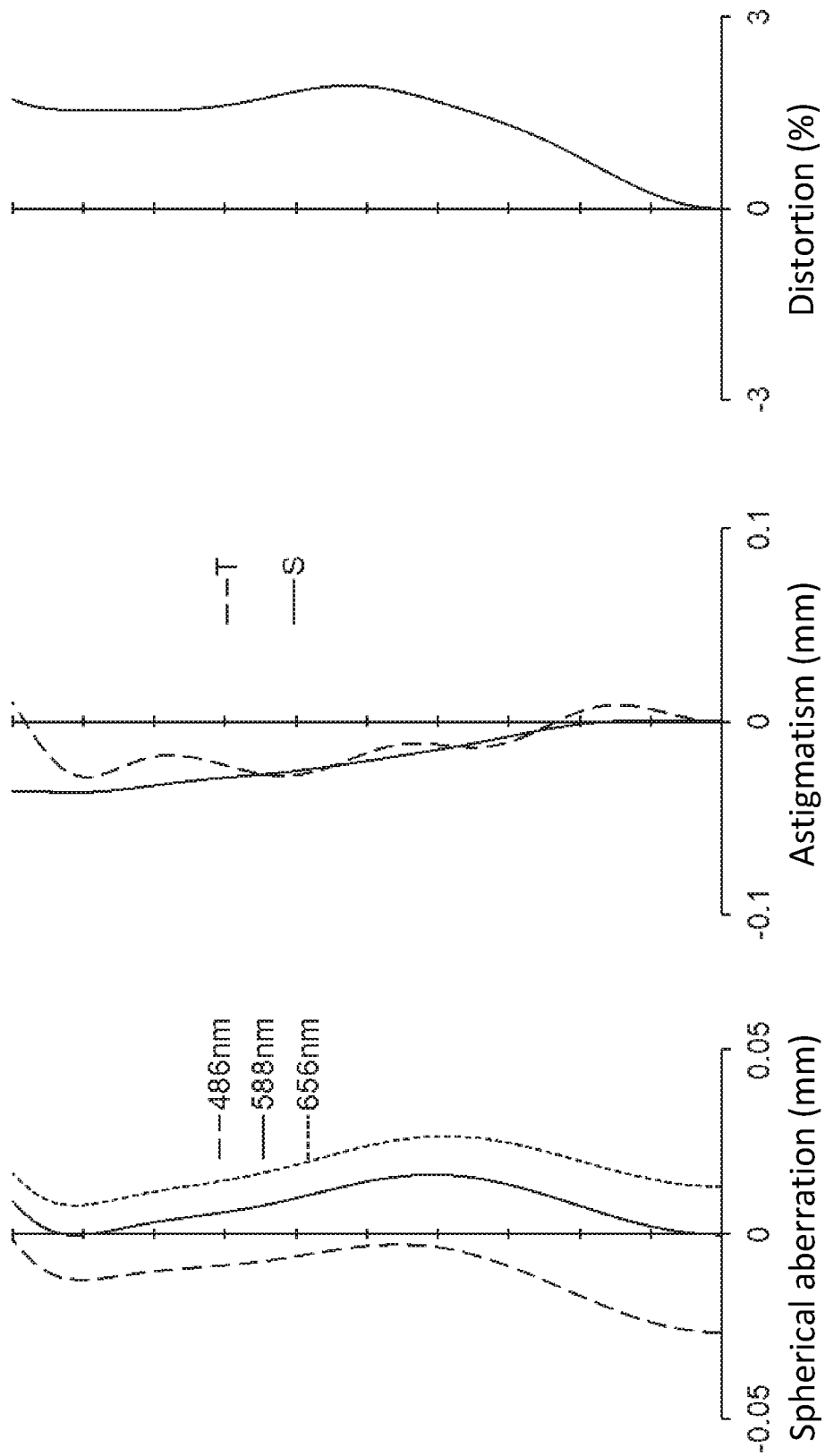
FIG. 15 is an aberration diagram showing a spherical aberration, astigmatism, and a distortion of the imaging lens of FIG. 13.
Figure 16:
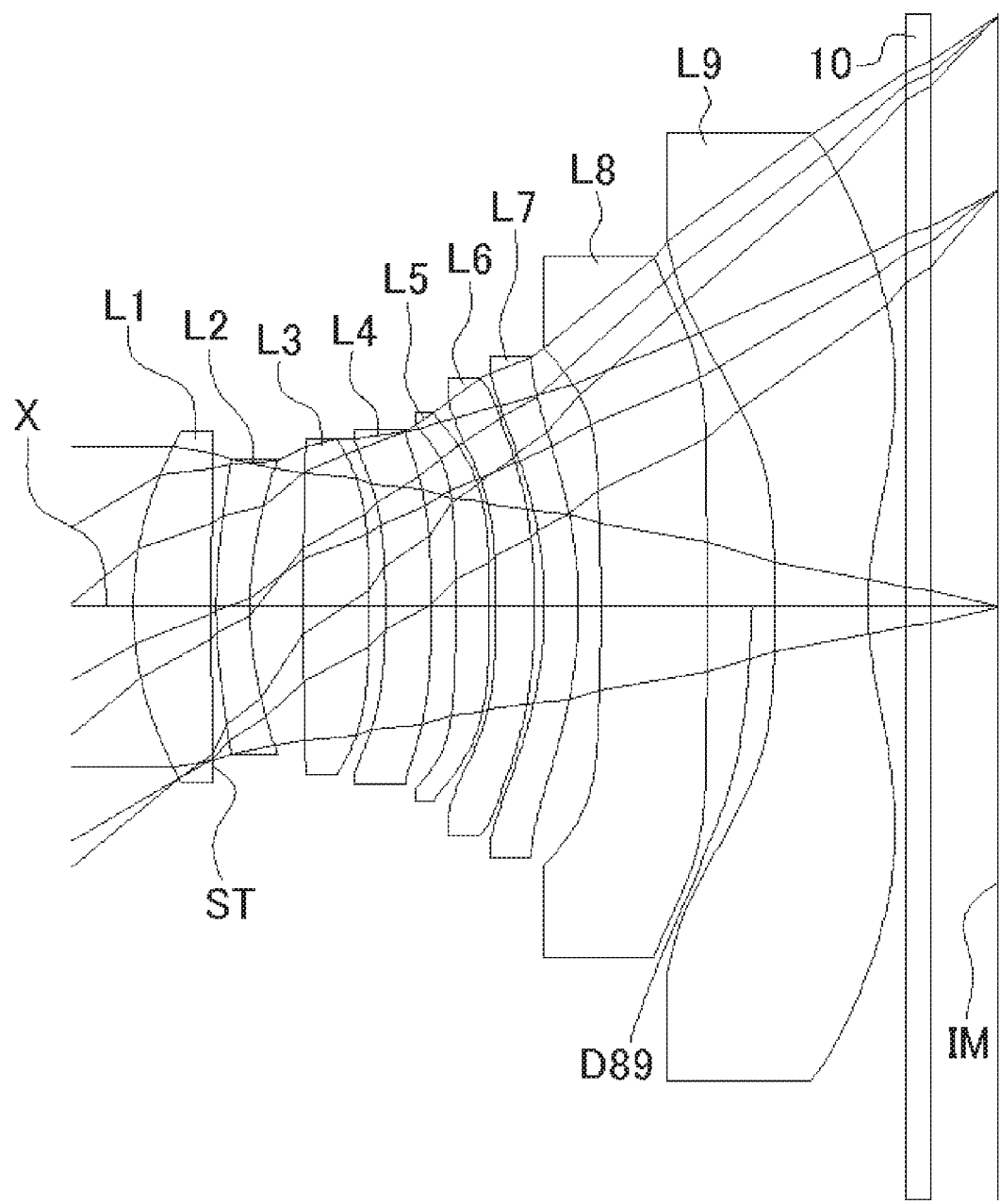
FIG. 16 shows a sectional view of a schematic configuration of an imaging lens in Numerical Data Example 6 of the present invention.

The values of the respective conditional expressions are as follows:

$f123/f=1.198$ $f3/f2=-3.148$ $D34/f=0.010$ $T8/T7=0.984$ $D89/f=0.103$ $R9r/f=0.449$ $f9/f=-0.798$ $|f4/f|=15.427$ $TL/f=1.235$ $TL/Hmax=1.509$ $f/Dep=1.98$ $f6/f=4.667$ FIG. 14 shows a lateral aberration that corresponds to an image height H and FIG. 15 shows a spherical aberration (mm), astigmatism (mm), and a distortion (%), respectively.

Numerical Data Example 6
Basic Lens Data

TABLE 11 f = 5.64 mm Fno = 2.2 ω = 39.5°

| | i | r | d | n d | ν d | [mm] |
|---|---|---|---|---|---|---|
| L1 | 1* | ∞ | ∞ | | | |
| | 2*(ST) | 2.640 | 0.626 | 1.5443 | 55.9 | f1 = 5.113 |
| | | 47.076 | 0.039 | | | |

TABLE 11-continued f = 5.64 mm Fno = 2.2 ω = 39.5°

| | i | r | d | n d | ν d | [mm] |
|---|---|---|---|---|---|---|
| L2 | 3* | 4.212 | 0.270 | 1.6707 | 19.2 | f2 = −12.407 |
| | 4* | 2.725 | 0.421 | | | |
| L3 | 5* | 14.525 | 0.535 | 1.5443 | 55.9 | f3 = 12.422 |
| | 6* | −12.484 | 0.129 | | | |
| L4 | 7* | −8.497 | 0.368 | 1.5443 | 55.9 | f4 = −72.892 |
| | 8* | −10.978 | 0.197 | | | |
| L5 | 9* | −15.452 | 0.270 | 1.5443 | 55.9 | f5 = 130.062 |
| | 10* | −12.761 | 0.047 | | | |
| L6 | 11* | −15.675 | 0.316 | 1.5443 | 55.9 | f6 = 13.787 |
| | 12* | −5.111 | 0.074 | | | |
| L7 | 13* | −3.937 | 0.275 | 1.6707 | 19.2 | f7 = 102.451 |
| | 14* | −3.828 | 0.181 | | | |
| L8 | 15* | −13.140 | 0.856 | 1.5443 | 55.9 | f8 = −61.091 |
| | 16* | −22.224 | 0.531 | | | |
| L9 | 17* | 65.407 | 0.751 | 1.5443 | 55.9 | f9 = −4.803 |
| | 18* | 2.503 | 0.300 | | | |
| | 19 | ∞ | 0.210 | 1.5168 | 64.2 | |
| | 20 | ∞ | 0.529 | | | |
| (IM) | | ∞ | | | | | f123=5.196 mm f789=−4.421 mm f34=15.116 mm f89=−4.294 mm

T7=0.275 mm

T8=0.856 mm

D34=0.129 mm

D89=0.531 mm

TL=6.854 mm

Hmax=4.65 mm

Dep=2.566 mm

TABLE 12

Aspherical surface data

| i | k | A4 | A6 | A8 | A10 | A12 | A14 | A16 |
|---|---|---|---|---|---|---|---|---|
| 1 | 2.946E−02 | −2.410E−03 | −1.468E−03 | 1.134E−03 | −1.045E−03 | 3.203E−04 | 5.570E−05 | −3.561E−05 |
| 2 | 0.000E+00 | −2.028E−02 | 2.758E−02 | −1.936E−02 | 6.609E−03 | −6.440E−04 | 3.255E−05 | −7.348E−05 |
| 3 | −5.840E+00 | −3.587E−02 | 3.150E−02 | −2.255E−02 | 6.900E−03 | 2.717E−03 | −2.120E−03 | 2.621E−04 |
| 4 | −9.739E+00 | 2.790E−02 | −2.740E−02 | 1.895E−02 | −8.737E−03 | 2.972E−03 | 8.378E−04 | −4.113E−04 |
| 5 | 0.000E+00 | −6.736E−03 | −1.260E−02 | 1.006E−02 | −9.961E−03 | 4.388E−03 | 5.351E−04 | −2.488E−04 |
| 6 | 0.000E+00 | −3.241E−02 | −2.264E−02 | −8.969E−04 | 2.503E−03 | 2.956E−04 | 2.801E−04 | −8.304E−05 |
| 7 | 0.000E+00 | −4.324E−02 | −1.937E−02 | 2.931E−03 | 1.009E−03 | 2.126E−03 | 9.604E−04 | −6.079E−04 |

TABLE 12-continued

Aspherical surface data

| i | k | A4 | A6 | A8 | A10 | A12 | A14 | A16 |
|---|---|---|---|---|---|---|---|---|
| 8 | 0.000E+00 | −2.953E−02 | −1.791E−02 | 2.112E−03 | 4.238E−03 | 5.359E−04 | −5.162E−04 | 3.062E−05 |
| 9 | 0.000E+00 | 9.606E−03 | −3.707E−02 | 2.055E−03 | −9.597E−04 | 1.556E−04 | 4.447E−04 | −1.164E−04 |
| 10 | 0.000E+00 | −4.588E−02 | −1.436E−02 | −1.003E−03 | 1.766E−03 | −8.685E−05 | −2.003E−04 | 1.125E−04 |
| 11 | 0.000E+00 | −7.859E−02 | −6.192E−03 | 7.995E−03 | 5.492E−04 | 1.418E−05 | 4.495E−05 | −5.409E−05 |
| 12 | 0.000E+00 | −1.452E−02 | 2.120E−03 | −1.715E−03 | 5.783E−04 | 1.562E−04 | 5.456E−06 | −1.826E−05 |
| 13 | 1.520E+00 | −2.849E−02 | 3.087E−02 | −1.572E−02 | 5.429E−03 | −1.068E−03 | 1.012E−04 | −1.948E−06 |
| 14 | −1.006E+01 | −3.255E−02 | 2.266E−02 | −1.104E−02 | 3.534E−03 | −5.364E−04 | 2.232E−05 | 1.483E−06 |
| 15 | 5.893E−01 | 2.651E−02 | −1.253E−02 | −5.131E−04 | 3.155E−04 | −8.403E−05 | 3.507E−05 | −4.310E−06 |
| 16 | 0.000E+00 | 1.452E−02 | −3.403E−03 | −6.780E−04 | 1.978E−04 | −1.327E−05 | −2.625E−09 | 2.034E−08 |
| 17 | 1.035E+01 | −7.737E−02 | 1.767E−02 | −2.254E−03 | 2.147E−04 | −1.490E−05 | 6.403E−07 | −1.353E−08 |
| 18 | −4.673E+00 | −5.080E−02 | 1.432E−02 | −2.859E−03 | 3.575E−04 | −2.619E−05 | 1.027E−06 | −1.664E−08 |

Figure 17:
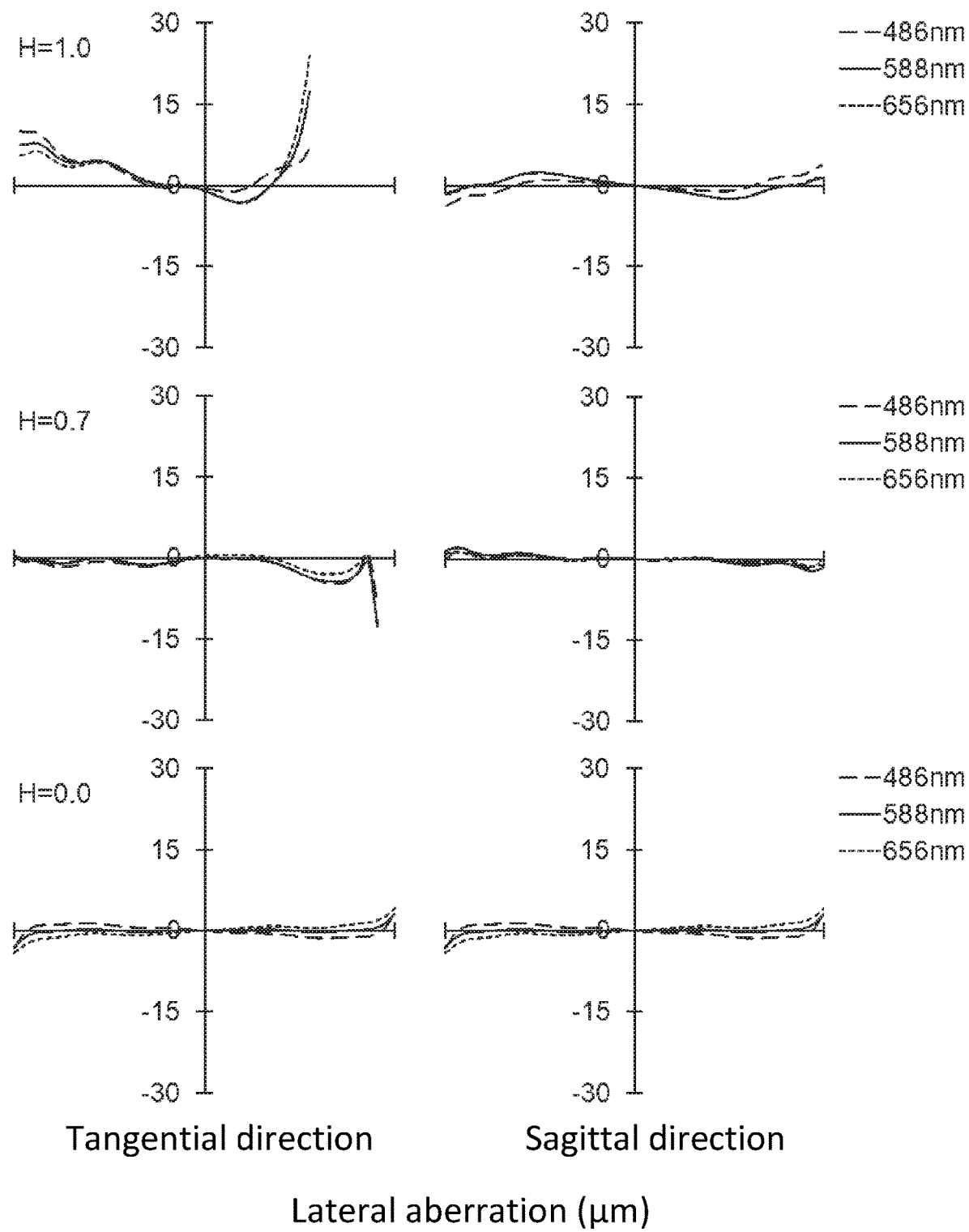
FIG. 17 is an aberration diagram showing a lateral aberration of the imaging lens of FIG. 16.
Figure 18:
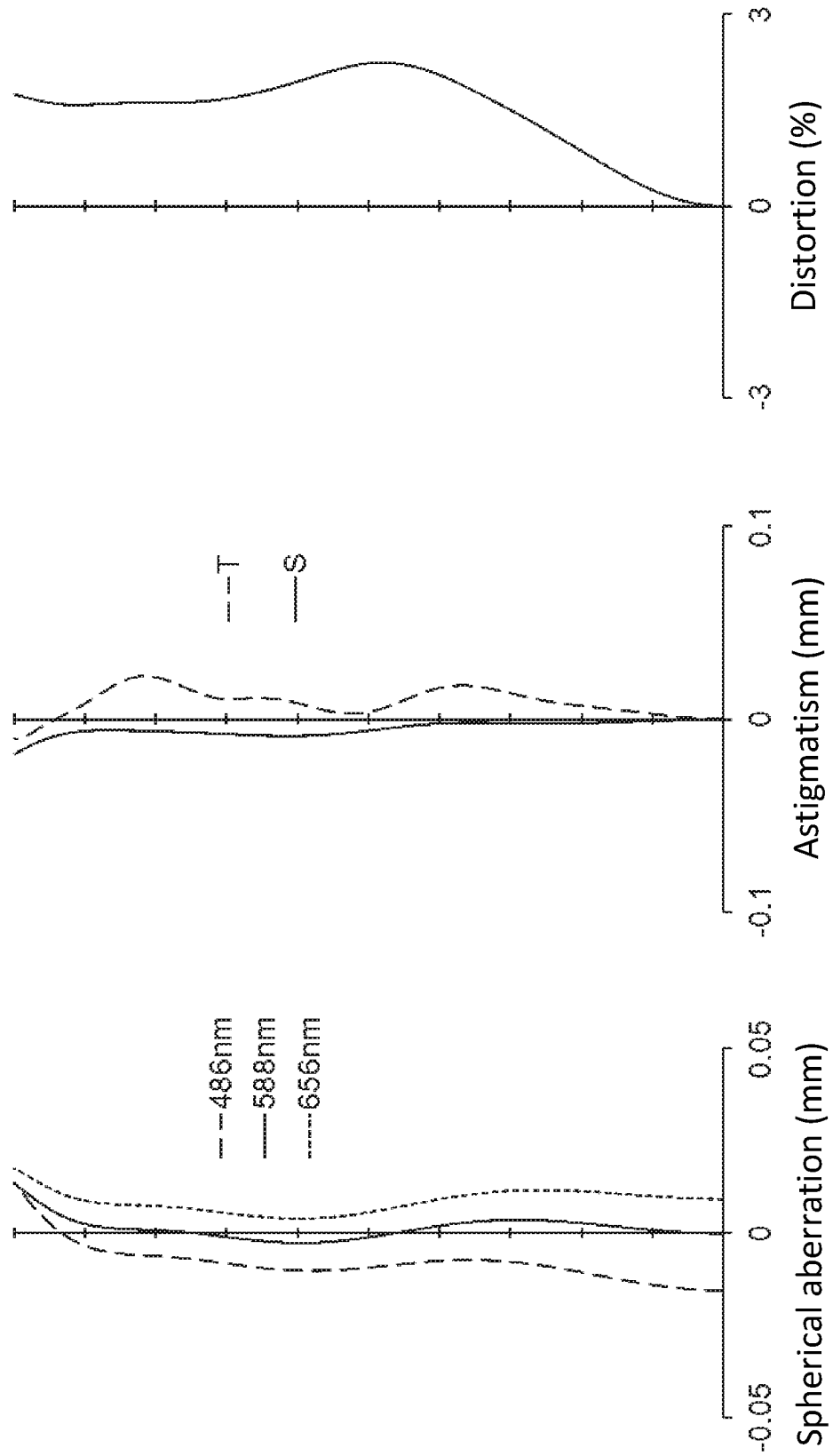
FIG. 18 is an aberration diagram showing a spherical aberration, astigmatism, and a distortion of the imaging lens of FIG. 16.
Figure 19:
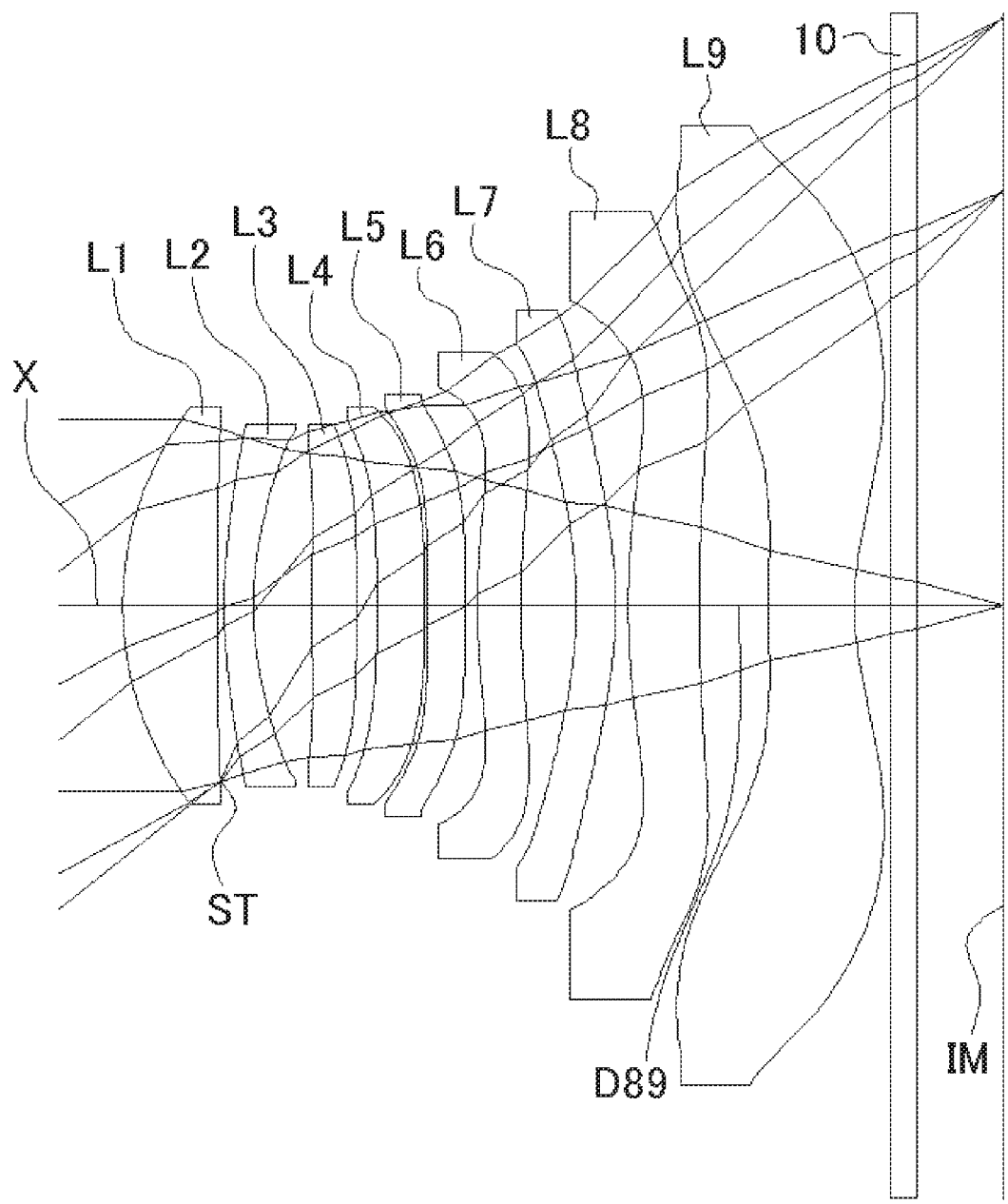
FIG. 19 shows a sectional view of a schematic configuration of an imaging lens in Numerical Data Example 7 of the present invention.

The values of the respective conditional expressions are as follows:

$f123/f=0.921$ $f3/f2=-1.001$ $D34/f=0.023$ $T8/T7=3.113$ $D89/f=0.094$ $R9r/f=0.444$ $f9/f=-0.852$ $|f4/f|=12.924$ $TL/f=1.215$ $TL/H\text{max}=1.474$ $f/Dep=2.20$ $f6/f=2.445$ FIG. 17 shows a lateral aberration that corresponds to an image height H and FIG. 18 shows a spherical aberration (mm), astigmatism (mm), and a distortion (%), respectively.

Numerical Data Example 7
Basic Lens Data

TABLE 13

$f = 5.66 \text{ mm } Fno = 2.0 \ \omega = 38.6°$

| | i | r | d | n d | v d | [mm] |
|---|---|---|---|---|---|---|
| L1 | 1*(ST) | ∞ 2.518 | ∞ 0.736 | 1.5443 | 55.9 | f1 = 4.990 |
| | 2* | 31.009 | 0.054 | | | |

TABLE 13-continued $f = 5.66 \text{ mm } Fno = 2.0 \ \omega = 38.6°$

| | i | r | d | n d | v d | [mm] |
|---|---|---|---|---|---|---|
| L2 | 3* | 3.925 | 0.229 | 1.6707 | 19.2 | f2 = −11.901 |
| | 4* | 2.570 | 0.457 | | | |
| L3 | 5* | 29.710 | 0.346 | 1.5443 | 55.9 | f3 = 42.563 |
| | 6* | −104.761 | 0.162 | | | |
| L4 | 7* | −13.488 | 0.371 | 1.5443 | 55.9 | f4 = −287.351 |
| | 8* | −14.904 | 0.023 | | | |
| L5 | 9* | −49.110 | 0.296 | 1.5443 | 55.9 | f5 = 44.981 |
| | 10* | −16.373 | 0.091 | | | |
| L6 | 11* | 5.355 | 0.341 | 1.5443 | 55.9 | f6 = 32.891 |
| | 12* | 7.468 | 0.431 | | | |
| L7 | 13* | −3.732 | 0.307 | 1.6707 | 19.2 | f7 = −168.336 |
| | 14* | −3.987 | 0.099 | | | |
| L8 | 15* | 6.046 | 0.558 | 1.5443 | 55.9 | f8 = 14.140 |
| | 16* | 27.284 | 0.538 | | | |
| L9 | 17* | 11.944 | 0.667 | 1.5443 | 55.9 | f9 = −5.182 |
| | 18* | 2.237 | 0.280 | | | |
| | 19 | ∞ | 0.210 | 1.5168 | 64.2 | |
| | 20 | ∞ | 0.674 | | | |
| (IM) | | ∞ | | | | |

$f123=6.614$ mm $f789=-8.907$ mm $f34=50.412$ mm $f89=-9.880$ mm $T7=0.307$ mm $T8=0.558$ mm $D34=0.162$ mm $D89=0.538$ mm $TL=6.798$ mm $H\text{max}=4.52$ mm $Dep=2.902$ mm

TABLE 14

Aspherical surface data

| i | k | A4 | A6 | A8 | A10 | A12 | A14 | A16 |
|---|---|---|---|---|---|---|---|---|
| 1 | 1.670E−01 | −1.252E−04 | −1.680E−03 | 1.484E−03 | −1.216E−03 | 3.543E−04 | 2.936E−05 | −2.223E−05 |
| 2 | 0.000E+00 | −2.111E−02 | 2.828E−02 | −1.893E−02 | 7.110E−03 | −1.096E−03 | −5.406E−05 | 1.615E−05 |
| 3 | −1.429E+01 | −3.713E−02 | 3.368E−02 | −1.531E−02 | 4.589E−03 | −1.151E−03 | 5.054E−05 | −1.429E−04 |
| 4 | −1.014E+01 | 2.140E−02 | −1.763E−02 | 1.865E−02 | −8.938E−03 | 2.384E−03 | −3.275E−04 | 1.327E−04 |
| 5 | −1.122E+03 | −1.142E−02 | −7.030E−03 | 3.938E−04 | −9.369E−04 | 7.493E−04 | 8.196E−05 | 5.612E−05 |
| 6 | 0.000E+00 | −3.084E−02 | −1.095E−02 | −1.957E−03 | 1.590E−03 | 6.156E−04 | 3.134E−05 | −5.512E−05 |
| 7 | 0.000E+00 | −1.961E−02 | −1.887E−02 | 4.343E−03 | 9.510E−04 | 1.857E−04 | −1.885E−05 | −5.994E−05 |
| 8 | 0.000E+00 | −3.074E−02 | −1.489E−02 | 1.204E−03 | 1.367E−03 | 1.339E−04 | −1.718E−04 | −2.919E−05 |
| 9 | 0.000E+00 | −3.488E−02 | −1.442E−02 | −9.967E−04 | 1.221E−04 | 5.809E−04 | 2.329E−04 | −9.013E−05 |

TABLE 14-continued

Aspherical surface data

| i | k | A4 | A6 | A8 | A10 | A12 | A14 | A16 |
|---|---|---|---|---|---|---|---|---|
| 10 | 0.000E+00 | −2.174E−02 | −1.753E−02 | 2.224E−04 | 1.377E−03 | 1.018E−04 | −1.744E−04 | 5.995E−05 |
| 11 | 0.000E+00 | −2.089E−02 | −8.684E−03 | −6.897E−04 | −1.150E−03 | 1.452E−04 | 1.984E−04 | −6.437E−05 |
| 12 | 0.000E+00 | −1.936E−02 | 9.337E−03 | −5.280E−03 | −1.809E−03 | 1.857E−03 | −4.946E−04 | 4.405E−05 |
| 13 | 7.111E−01 | 5.083E−03 | 1.989E−03 | −1.520E−03 | 5.753E−03 | −1.063E−03 | 6.943E−05 | 8.464E−07 |
| 14 | −9.805E+00 | −1.636E−02 | 2.116E−02 | −1.178E−02 | 3.440E−03 | −5.057E−04 | 3.082E−05 | −3.357E−07 |
| 15 | 3.723E−01 | −8.396E−03 | 9.039E−04 | −2.582E−03 | 6.439E−04 | −9.986E−05 | 9.790E−06 | −4.408E−07 |
| 16 | 0.000E+00 | 1.357E−02 | −3.519E−03 | −6.434E−04 | 1.743E−04 | −1.124E−05 | 1.673E−07 | 1.257E−09 |
| 17 | 5.022E+00 | −8.303E−02 | 1.865E−02 | −2.350E−03 | 2.139E−04 | −1.422E−05 | 5.836E−07 | −1.049E−08 |
| 18 | −4.796E+00 | −5.180E−02 | 1.410E−02 | −2.838E−03 | 3.581E−04 | −2.648E−05 | 1.029E−06 | −1.590E−08 |

Figure 20:
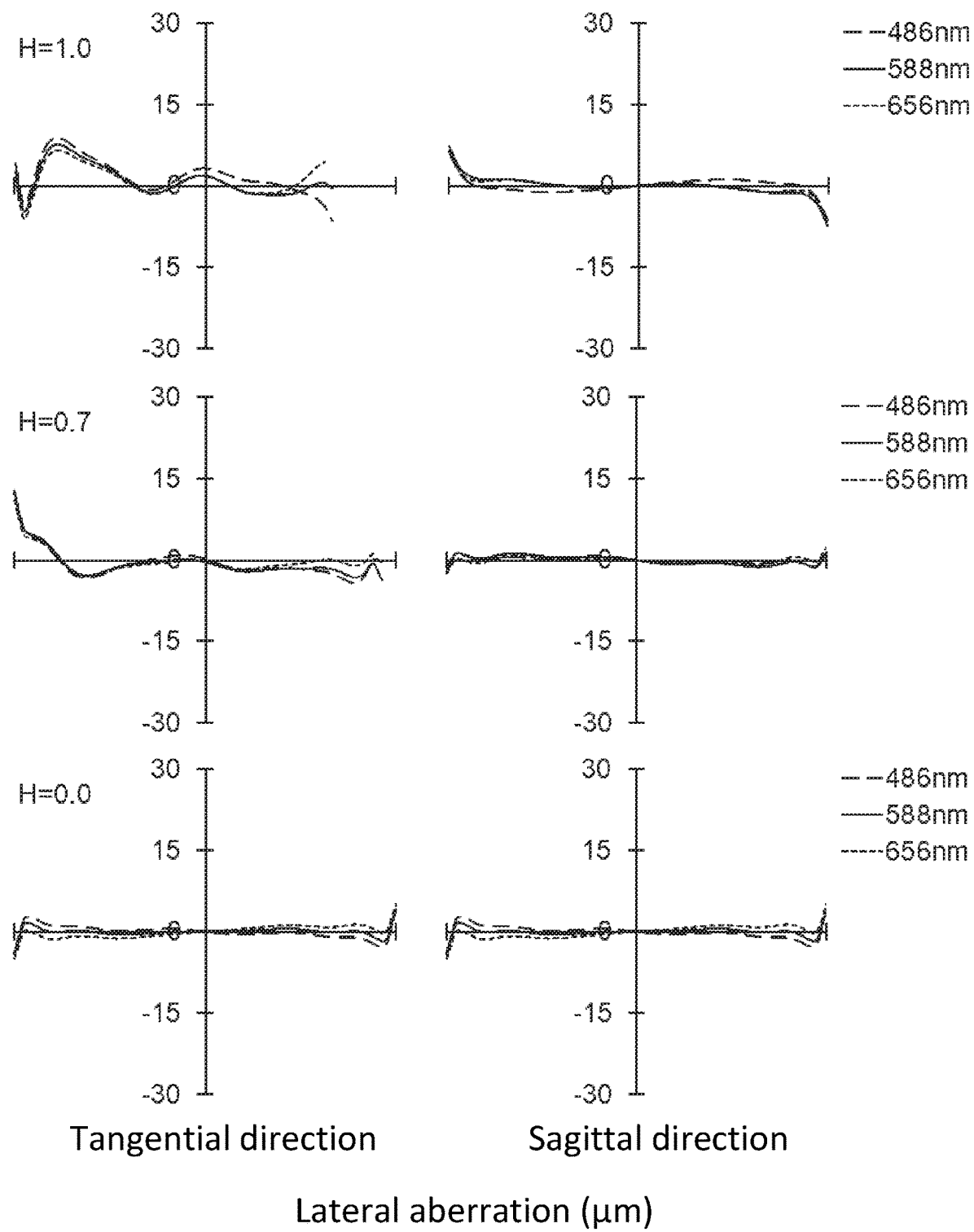
FIG. 20 is an aberration diagram showing a lateral aberration of the imaging lens of FIG. 19.
Figure 21:
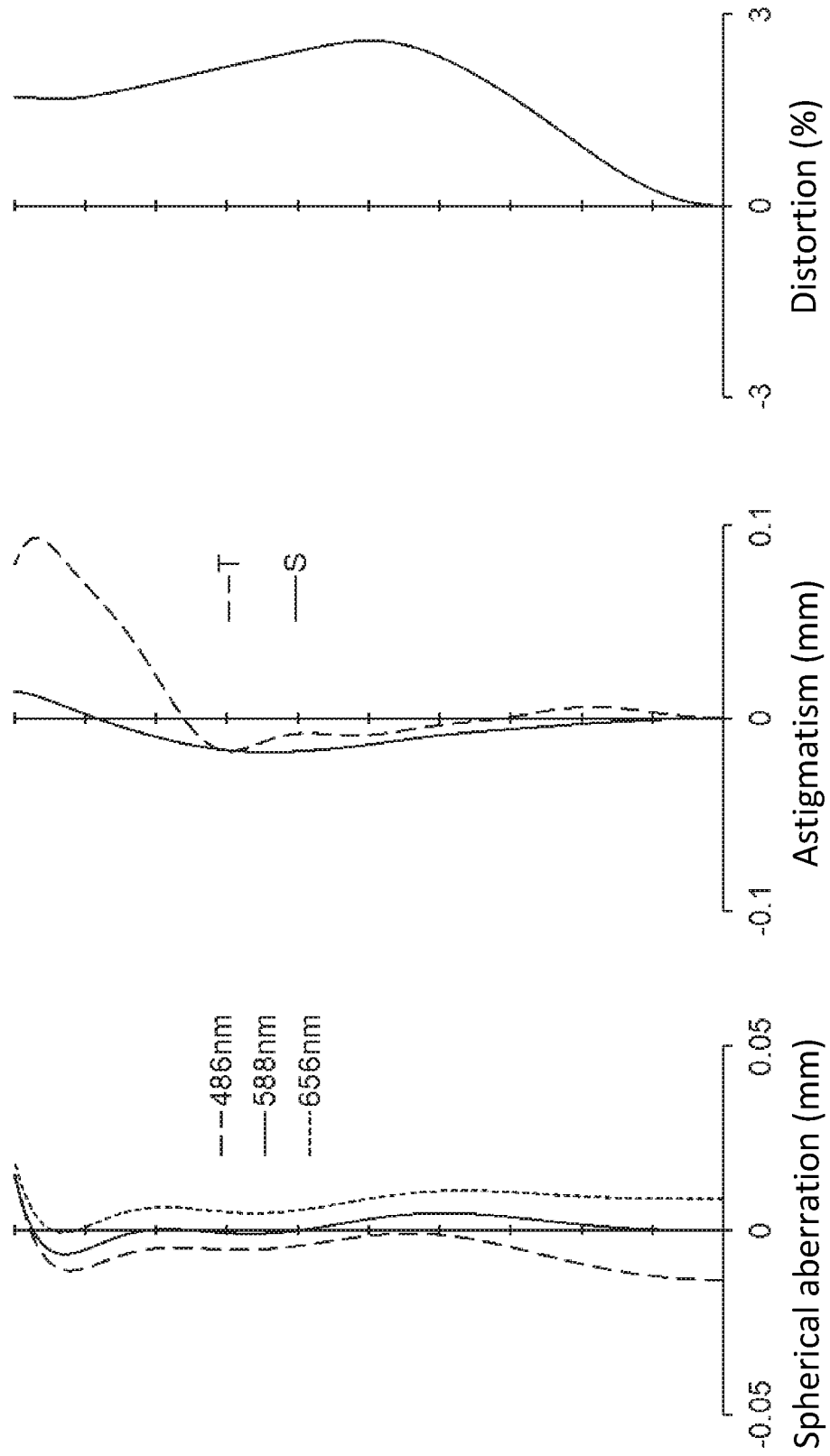
FIG. 21 is an aberration diagram showing a spherical aberration, astigmatism, and a distortion of the imaging lens of FIG. 19.
Figure 22:
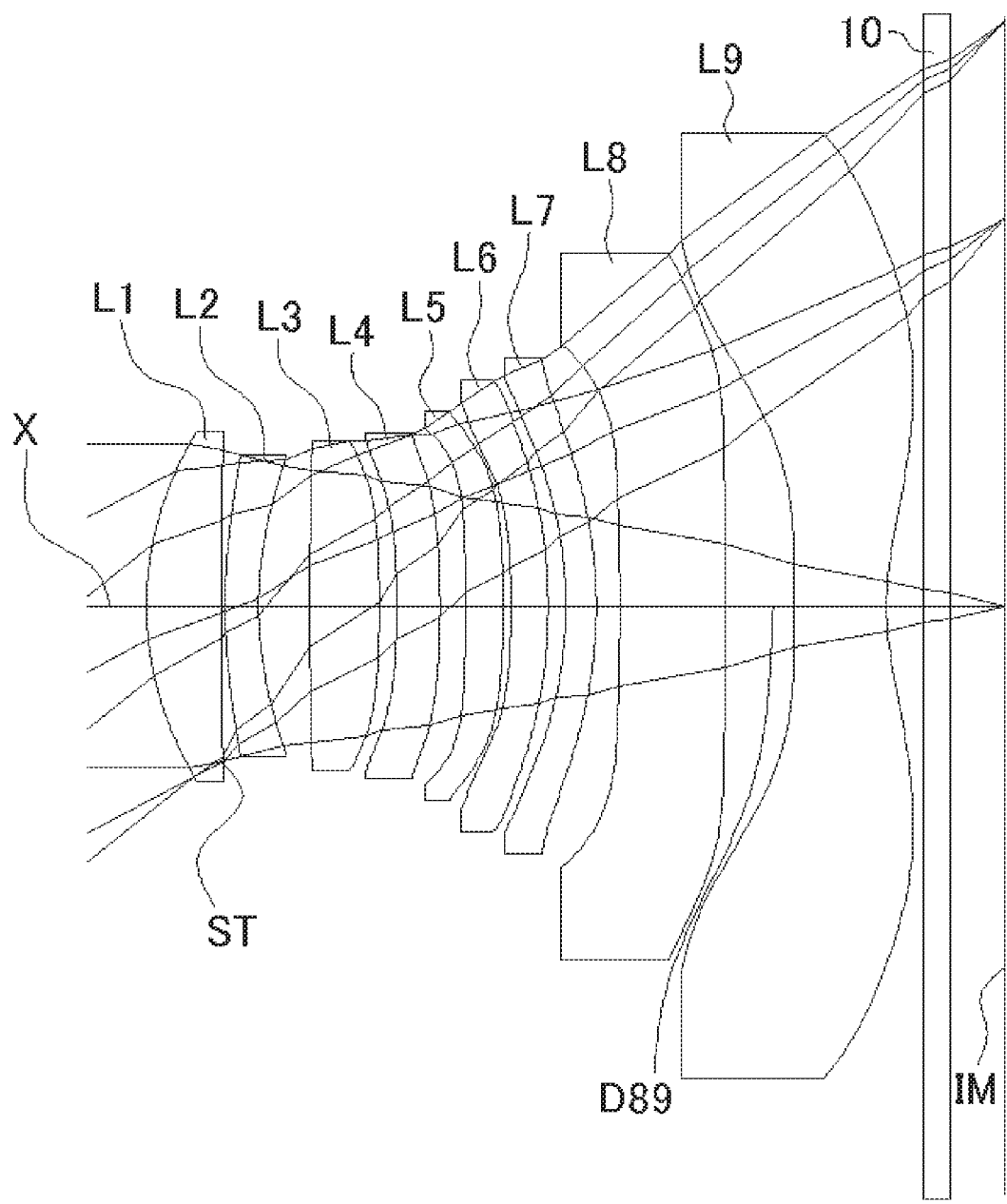
FIG. 22 shows a sectional view of a schematic configuration of an imaging lens in Numerical Data Example 8 of the present invention.

The values of the respective conditional expressions are as follows:

$f123/f=1.169$ $f3/f2=-3.576$ $D34/f=0.029$ $T8/T7=1.818$ $D89/f=0.095$ $R9r/f=0.395$ $f9/f=-0.916$ $|f4/f|=-50.769$ $TL/f=1.201$ $TL/Hmax=1.504$ $f/Dep=1.95$ $f8/f=2.498$ FIG. 20 shows a lateral aberration that corresponds to an image height H and FIG. 21 shows a spherical aberration (mm), astigmatism (mm), and a distortion (%), respectively.

Numerical Data Example 8
Basic Lens Data

TABLE 15 f = 5.76 mm Fno = 2.2 ω = 38.9°

| | i | r | d | n d | v d | [mm] |
|---|---|---|---|---|---|---|
| L1 | 1* | ∞ | ∞ | | | |
| | 2*(ST) | 2.570 | 0.604 | 1.5443 | 55.9 | f1 = 5.072 |
| | | 34.132 | 0.030 | | | |

TABLE 15-continued f = 5.76 mm Fno = 2.2 ω = 38.9°

| | i | r | d | n d | v d | [mm] |
|---|---|---|---|---|---|---|
| L2 | 3* | 4.288 | 0.270 | 1.6707 | 19.2 | f2 = −12.352 |
| | 4* | 2.754 | 0.411 | | | |
| L3 | 5* | 13.283 | 0.567 | 1.5443 | 55.9 | f3 = 12.450 |
| | 6* | −13.626 | 0.143 | | | |
| L4 | 7* | −7.805 | 0.349 | 1.5443 | 55.9 | f4 = −75.594 |
| | 8* | −9.784 | 0.208 | | | |
| L5 | 9* | −15.950 | 0.304 | 1.5443 | 55.9 | f5 = 100.536 |
| | 10* | −12.433 | 0.061 | | | |
| L6 | 11* | −12.759 | 0.302 | 1.5443 | 55.9 | f6 = 13.712 |
| | 12* | −4.748 | 0.145 | | | |
| L7 | 13* | −3.755 | 0.247 | 1.6707 | 19.2 | f7 = −100.973 |
| | 14* | −4.081 | 0.192 | | | |
| L8 | 15* | −13.581 | 0.857 | 1.5443 | 55.9 | f8 = −59.065 |
| | 16* | −24.038 | 0.553 | | | |
| L9 | 17* | 62.884 | 0.751 | 1.5443 | 55.9 | f9 = −4.811 |
| | 18* | 2.503 | 0.300 | | | |
| | 19 | ∞ | 0.210 | 1.5168 | 64.2 | |
| | 20 | ∞ | 0.446 | | | |
| (IM) | | ∞ | | | | | f123=5.163 mm f789=−3.955 mm f34=15.053 mm f89=−4.289 mm

T7=0.247 mm

T8=0.857 mm

D34=0.143 mm

D89=0.553 mm

TL=6.879 mm

Hmax=4.65 mm

Dep=2.619 mm

TABLE 16

Aspherical surface data

| i | k | A4 | A6 | A8 | A10 | A12 | A14 | A16 |
|---|---|---|---|---|---|---|---|---|
| 1 | 2.345E−02 | −2.469E−03 | −1.114E−03 | 1.081E−03 | −1.029E−03 | 2.733E−04 | 6.604E−05 | −4.446E−05 |
| 2 | 0.000E+00 | −2.047E−02 | 2.756E−02 | −1.926E−02 | 6.487E−03 | −6.908E−04 | 9.720E−05 | −1.022E−04 |
| 3 | −6.331E+00 | −3.619E−02 | 3.125E−02 | −2.205E−02 | 7.021E−03 | 2.619E−03 | −2.134E−03 | 2.965E−04 |
| 4 | −9.733E+00 | 2.549E−02 | 2.847E−02 | 1.978E−02 | −8.227E−03 | 2.792E−03 | 5.399E−04 | −1.722E−04 |
| 5 | 0.000E+00 | −9.788E−03 | −1.361E−02 | 9.418E−03 | −9.754E−03 | 4.761E−03 | 7.812E−04 | −3.292E−04 |
| 6 | 0.000E+00 | −3.298E−02 | −2.230E−02 | −7.718E−04 | 2.657E−03 | 4.025E−04 | 3.408E−04 | −8.520E−05 |
| 7 | 0.000E+00 | −4.255E−02 | −1.848E−02 | 2.937E−03 | 8.593E−04 | 2.199E−03 | 1.006E−03 | −6.225E−04 |
| 8 | 0.000E+00 | −2.959E−02 | −1.796E−02 | 1.831E−03 | 4.092E−03 | 4.581E−04 | −5.347E−04 | 4.443E−05 |
| 9 | 0.000E+00 | 1.152E−02 | −3.727E−02 | 2.164E−03 | −1.141E−03 | 7.159E−05 | 4.336E−04 | −1.538E−04 |
| 10 | 0.000E+00 | −4.007E−02 | −1.333E−02 | −8.947E−04 | 1.740E−03 | −1.220E−04 | −2.221E−04 | 1.042E−04 |
| 11 | 0.000E+00 | −7.978E−02 | −5.904E−03 | 8.050E−03 | 6.141E−04 | 1.161E−05 | 4.469E−05 | −5.654E−05 |

TABLE 16-continued

Aspherical surface data

| i | k | A4 | A6 | A8 | A10 | A12 | A14 | A16 |
|---|---|---|---|---|---|---|---|---|
| 12 | 0.000E+00 | −1.362E−02 | 2.519E−03 | −1.659E−03 | 5.879E−04 | 1.545E−04 | 3.625E−06 | −1.871E−05 |
| 13 | 1.661E+00 | −2.873E−02 | 3.092E−02 | −1.579E−02 | 5.393E−03 | −1.076E−03 | 9.937E−05 | −2.753E−07 |
| 14 | −8.880E+00 | −3.448E−02 | 2.220E−02 | −1.106E−02 | 3.522E−03 | −5.382E−04 | 2.289E−05 | 1.663E−06 |
| 15 | −7.436E+00 | 2.711E−02 | −1.236E−02 | −2.924E−04 | 2.935E−04 | −8.749E−05 | 3.535E−05 | −4.507E−06 |
| 16 | 0.000E+00 | 1.395E−02 | −3.214E−03 | −6.783E−04 | 1.963E−04 | −1.333E−05 | −5.058E−09 | 1.964E−08 |
| 17 | −4.048E+03 | −7.723E−02 | 1.753E−02 | −2.250E−03 | 2.156E−04 | −1.484E−05 | 6.410E−07 | −1.478E−08 |
| 18 | −4.680E+00 | −5.111E−02 | 1.436E−02 | −2.862E−03 | 3.575E−04 | −2.619E−05 | 1.026E−06 | −1.664E−08 |

Figure 23:
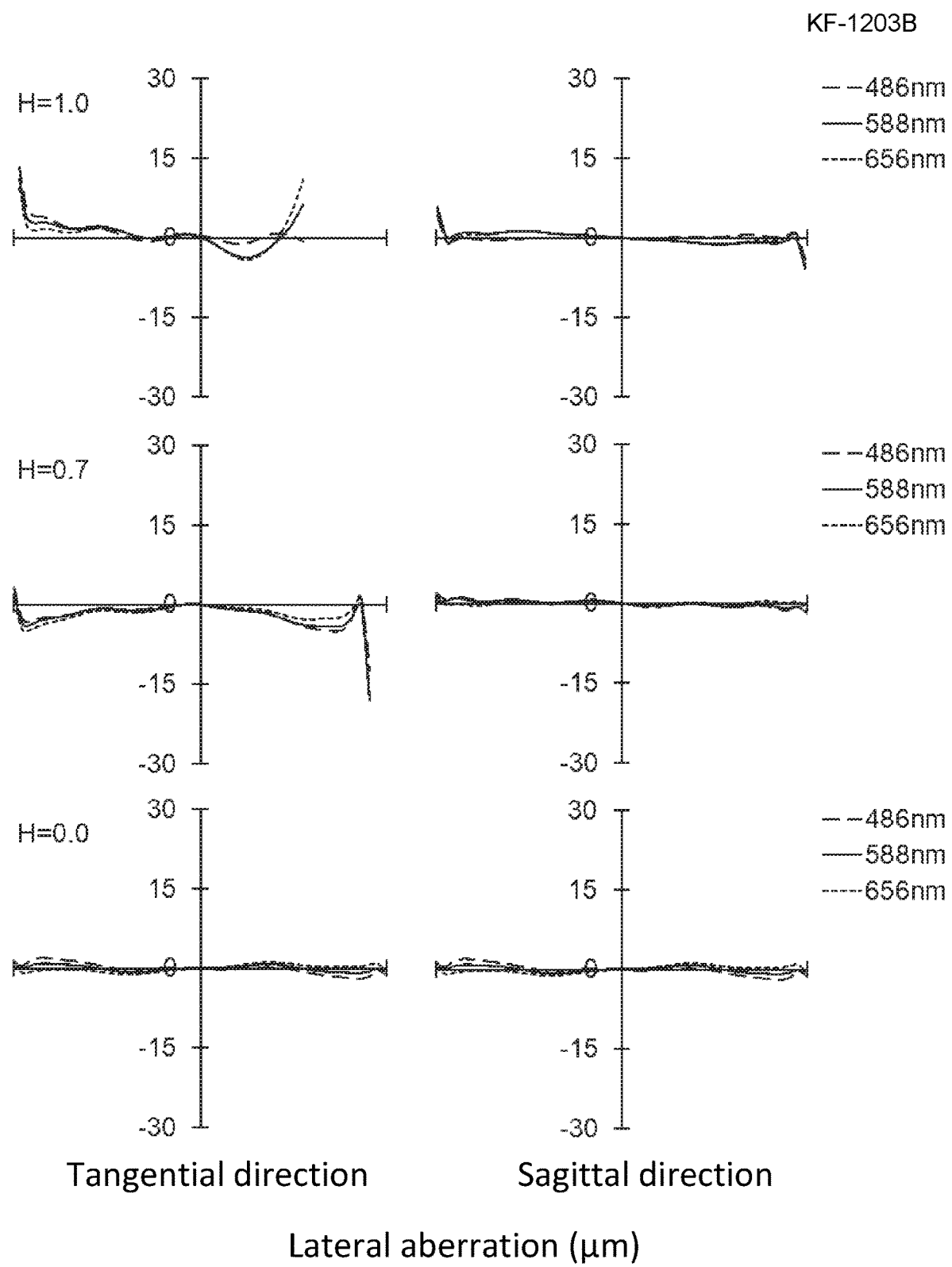
FIG. 23 is an aberration diagram showing a lateral aberration of the imaging lens of FIG. 22.
Figure 24:
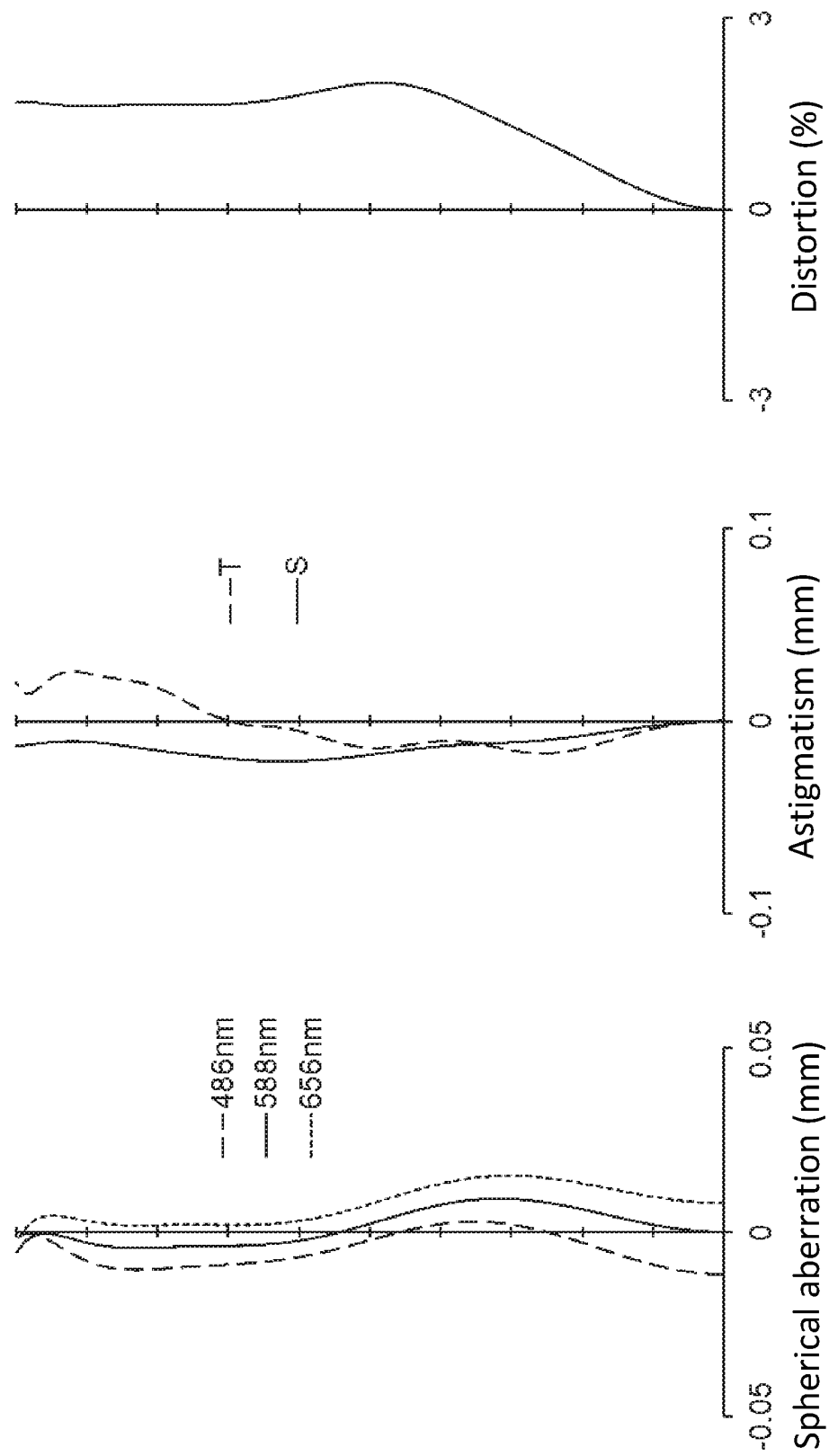
FIG. 24 is an aberration diagram showing a spherical aberration, astigmatism, and a distortion of the imaging lens of FIG. 22.
Figure 25:
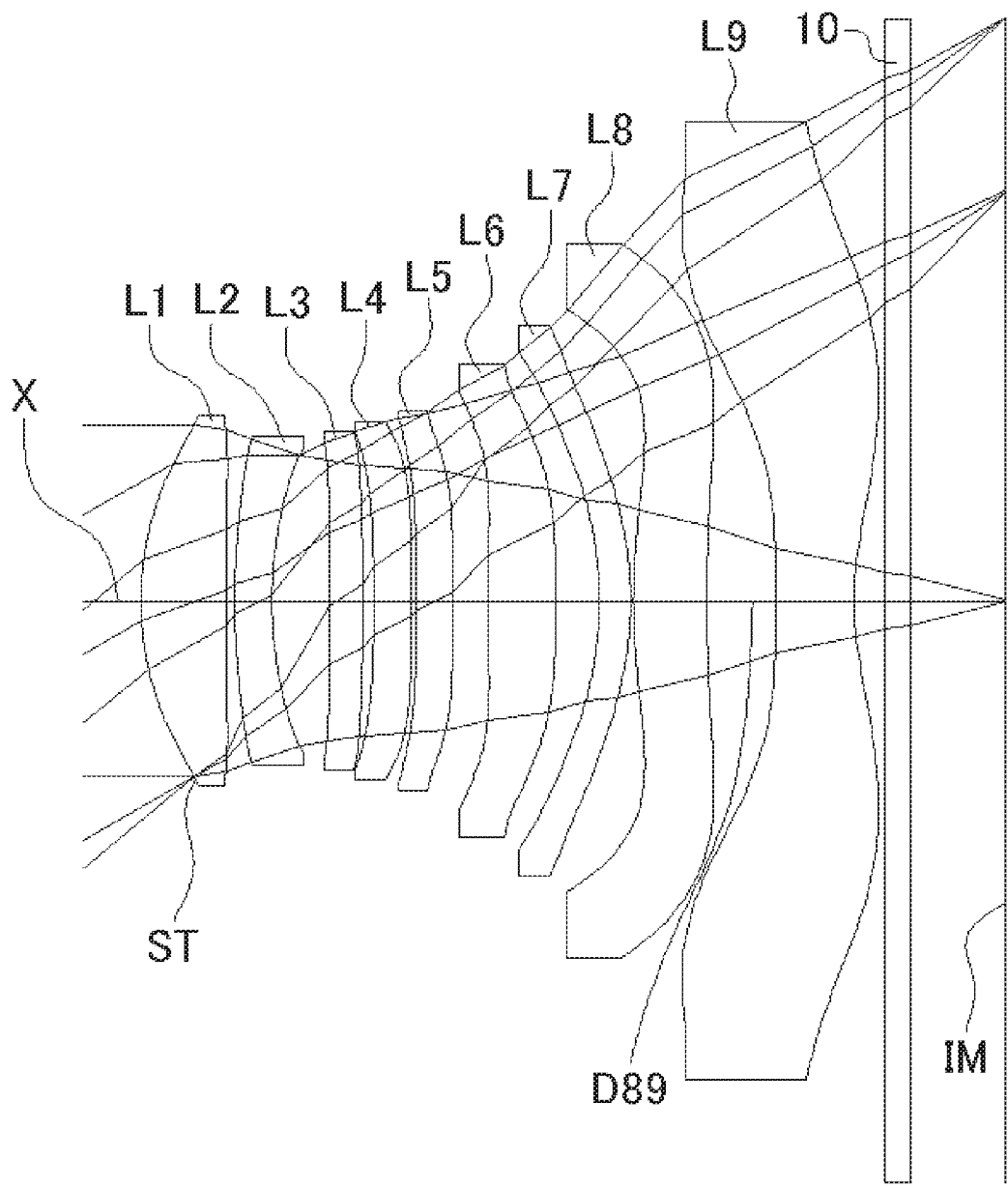
FIG. 25 shows a sectional view of a schematic configuration of an imaging lens in Numerical Data Example 9 of the present invention.

The values of the respective conditional expressions are as follows:

$f123/f=0.896$ $f3/f2=-1.008$ $D34/f=0.025$ $T8/T7=3.470$ $D89/f=0.096$ $R9r/f=0.435$ $f9/f=-0.835$ $|f4/f|=13.124$ $TL/f=1.194$ $TL/H\max=1.479$ $f/Dep=2.20$ FIG. 23 shows a lateral aberration that corresponds to an image height H and FIG. 24 shows a spherical aberration (mm), astigmatism (mm), and a distortion (%), respectively.

Numerical Data Example 9
Basic Lens Data

TABLE 17 f = 5.77 mm Fno = 2.0 ω = 39.1°

| | i | r | d | n d | v d | [mm] |
|---|---|---|---|---|---|---|
| L1 | 1*(ST) | 2.505 | 0.696 | 1.5443 | 55.9 | f4 = 5.086 |
| | 2* | 23.774 | 0.070 | | | |

TABLE 17-continued f = 5.77 mm Fno = 2.0 ω = 39.1°

| | i | r | d | n d | v d | [mm] |
|---|---|---|---|---|---|---|
| L2 | 3* | 5.233 | 0.306 | 1.6707 | 19.2 | f2 = −13.231 |
| | 4* | 3.214 | 0.472 | | | |
| L3 | 5* | −93.040 | 0.270 | 1.5443 | 55.9 | f3 = −74.266 |
| | 6* | −28.208 | 0.090 | | | |
| L4 | 7* | −21.820 | 0.309 | 1.5443 | 55.9 | f4 = −103.318 |
| | 8* | −35.832 | 0.036 | | | |
| L5 | 9* | −81.945 | 0.298 | 1.5443 | 55.9 | f5 = −63.854 |
| | 10* | 60.432 | 0.291 | | | |
| L6 | 11* | 13.902 | 0.555 | 1.5443 | 55.9 | f6 = 14.174 |
| | 12* | −17.092 | 0.354 | | | |
| L7 | 13* | −3.239 | 0.257 | 1.6707 | 19.2 | f7 = 29.89 |
| | 14* | −2.878 | 0.023 | | | |
| L8 | 15* | 5.335 | 0.599 | 1.5443 | 55.9 | f8 = 15.788 |
| | 16* | 13.513 | 0.561 | | | |
| L9 | 17* | −71.335 | 0.645 | 1.5443 | 55.9 | f9 = −4.551 |
| | 18* | 2.574 | 0.250 | | | |
| | 19 | ∞ | 0.210 | 1.5168 | 64.2 | |
| | 20 | ∞ | 0.780 | | | |
| (IM) | | ∞ | | | | | f123=6.809 mm
f789=−10.585 mm
f34=266.856 mm
f89=−7.445 mm
T7=0.257 mm
T8=0.599 mm
D34=0.090 mm
D89=0.561 mm
TL=7.000 mm
Hmax=4.70 mm
Dep=2.887 mm

TABLE 18

Aspherical surface data

| i | k | A4 | A6 | A8 | A10 | A12 | A14 | A16 |
|---|---|---|---|---|---|---|---|---|
| 1 | 2.269E−01 | 1.175E−03 | −2.972E−03 | 1.840E−03 | −1.177E−03 | 5.344E−05 | 1.169E−04 | −6.065E−05 |
| 2 | 0.000E+00 | −2.239E−02 | 2.201E−02 | −1.458E−02 | 4.922E−03 | −7.171E−04 | −1.052E−04 | 1.654E−05 |
| 3 | −1.845E+01 | −2.634E−42 | 2.474E−02 | −1.147E−02 | 5.071E−03 | −8.650E−04 | 6.725E−05 | −9.819E−06 |
| 4 | −1.306E+01 | 2.530E−02 | −1.268E−02 | 1.321E−02 | −3.473E−03 | 1.657E−03 | −6.763E−04 | 3.545E−04 |
| 5 | 0.000E+00 | −3.640E−03 | −4.713E−03 | −4.177E−04 | −1.846E−04 | 6.916E−04 | 3.120E−04 | −3.592E−04 |
| 6 | 0.000E+00 | −9.993E−04 | −7.308E−03 | 2.919E−03 | 1.196E−03 | −1.511E−04 | −1.617E−04 | −2.158E−04 |
| 7 | 0.000E+00 | −2.120E−02 | −1.062E−02 | 1.864E−03 | 8.581E−04 | 3.185E−04 | −9.253E−07 | −1.070E−04 |
| 8 | 0.000E+00 | −1.364E−02 | −1.360E−03 | −1.222E−03 | 6.609E−04 | 4.494E−04 | 1.256E−04 | −1.328E−04 |
| 9 | 0.000E+00 | −2.896E−02 | −3.881E−03 | 1.181E−03 | 3.844E−04 | 4.332E−04 | 8.629E−05 | −1.138E−04 |
| 10 | 0.000E+00 | −5.115E−02 | −2.863E−03 | 1.616E−03 | 6.573E−04 | −6.401E−05 | −4.676E−05 | 3.569E−05 |
| 11 | 0.000E+00 | −3.830E−02 | −8.986E−04 | −2.339E−03 | −1.182E−04 | 3.199E−04 | 7.008E−05 | −2.136E−05 |
| 12 | 0.000E+00 | −6.276E−02 | 1.572E−02 | −2.284E−03 | −1.343E−03 | 1.124E−03 | −2.706E−04 | 2.272E−05 |
| 13 | 1.098E+00 | −1.759E−02 | 2.442E−02 | −1.223E−02 | 4.088E−03 | −6.814E−04 | 3.036E−05 | 2.702E−06 |
| 14 | −4.674E+00 | −1.422E−02 | 1.463E−02 | −8.486E−03 | 2.374E−03 | −3.033E−04 | 1.668E−05 | −4.824E−07 |
| 15 | 0.000E+00 | −1.995E−02 | −1.424E−03 | −9.555E−04 | 2.868E−04 | −5.156E−05 | 6.500E−06 | −3.749E−07 |
| 16 | 0.000E+00 | −6.511E−04 | −1.407E−03 | −4.972E−04 | 1.236E−04 | −8.856E−06 | −1.166E−07 | 2.686E−08 |

TABLE 18-continued

Aspherical surface data

| i | k | A4 | A6 | A8 | A10 | A12 | A14 | A16 |
|---|---|---|---|---|---|---|---|---|
| 17 | 0.000E+00 | −6.589E−02 | 1.514E−02 | −1.788E−03 | 1.446E−04 | −8.436E−06 | 3.168E−07 | −5.579E−09 |
| 18 | −6.223E+00 | −4.332E−02 | 1.096E−02 | −2.042E−03 | 2.374E−04 | −1.599E−05 | 5.766E−07 | −8.660E−09 |

Figure 26:
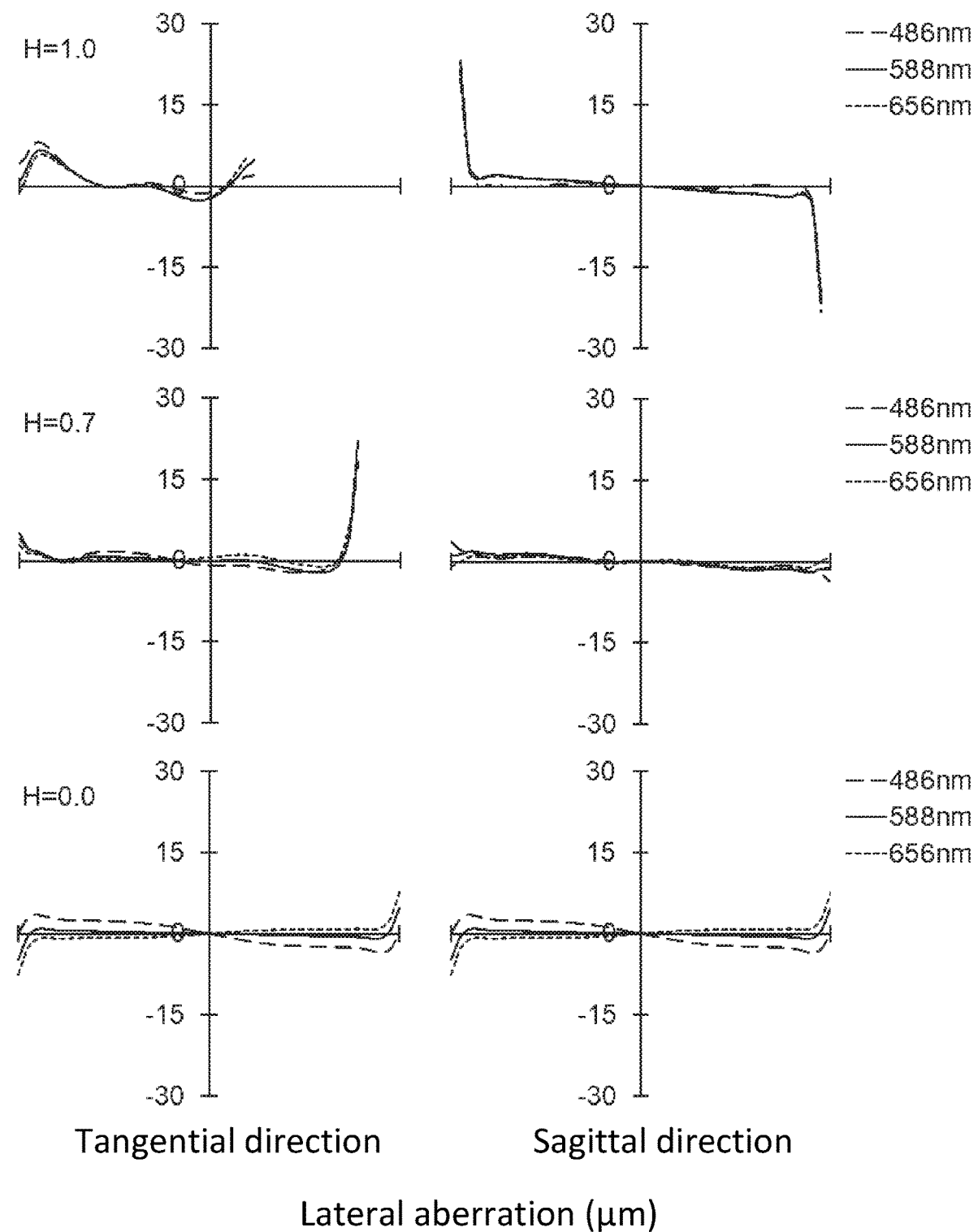
FIG. 26 is an aberration diagram showing a lateral aberration of the imaging lens of FIG. 25.
Figure 27:
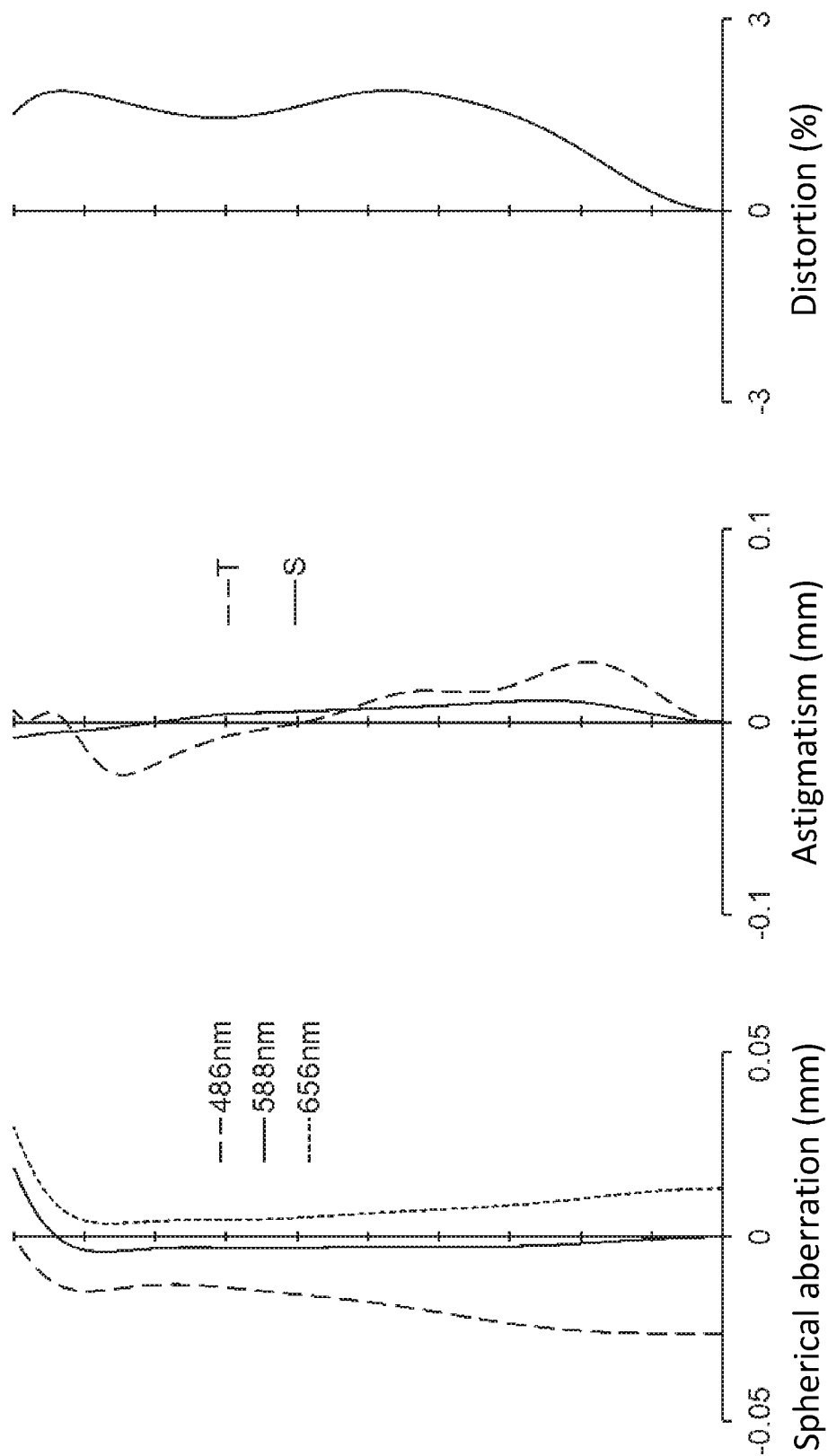
FIG. 27 is an aberration diagram showing a spherical aberration, astigmatism, and a distortion of the imaging lens of FIG. 25.
Figure 28:
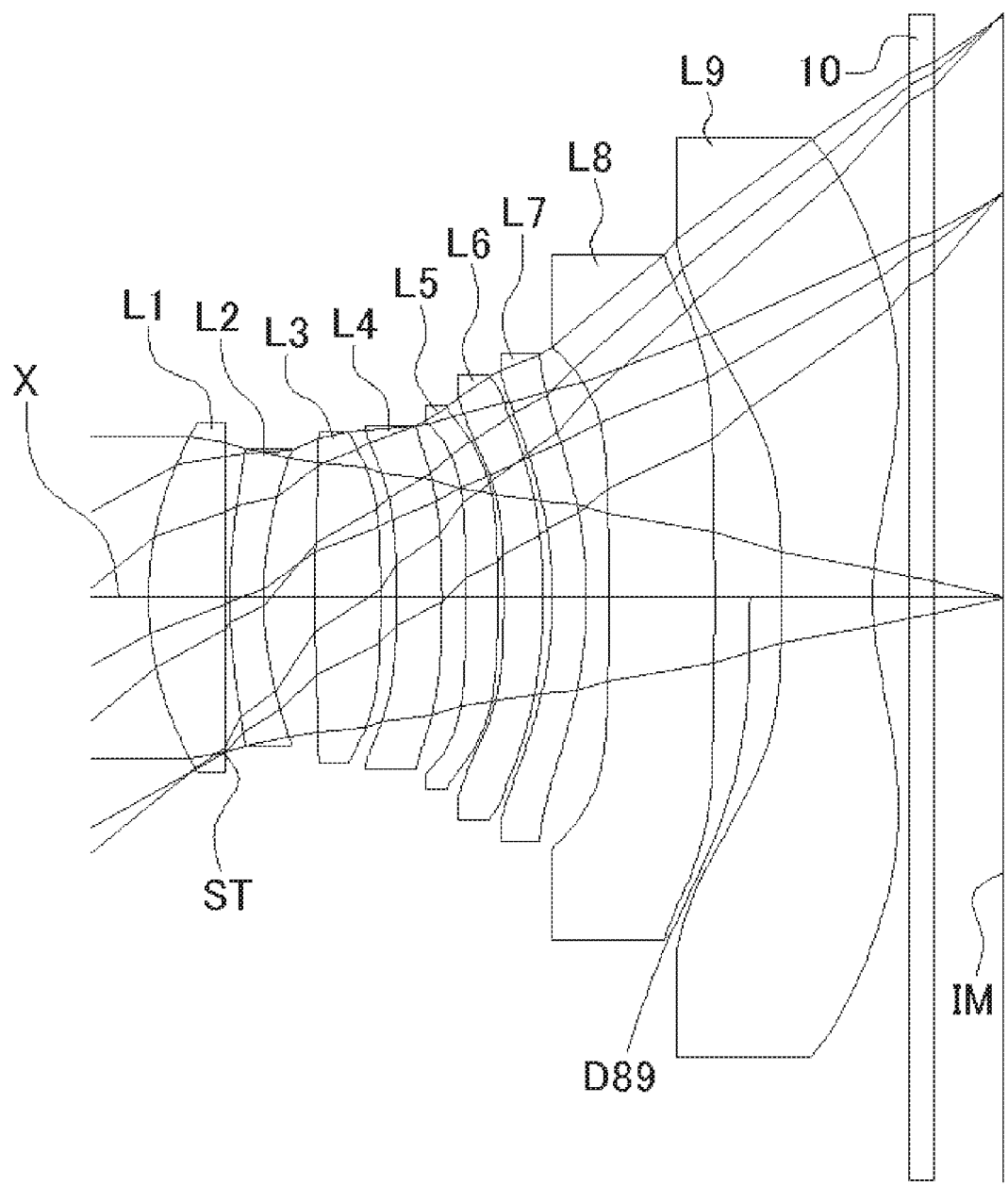
FIG. 28 shows a sectional view of a schematic configuration of an imaging lens in Numerical Data Example 10 of the present invention.

The values of the respective conditional expressions are as follows:

$f123/f=1.180$ $f3/f2=-5.613$ $D34/f=0.016$ $T8/T7=2.331$ $D89/f=0.097$ $R9r/f=0.446$ $f9/f=-0.789$ $|f4/f|=17.906$ $TL/f=1.213$ $TL/H\text{max}=1.489$ $f/Dep=2.00$ $f6/f=2.456$ FIG. 26 shows a lateral aberration that corresponds to an image height H and FIG. 27 shows a spherical aberration (mm), astigmatism (mm), and a distortion (%), respectively.

Numerical Data Example 10
Basic Lens Data

TABLE 19 f = 5.84 mm Fno = 2.2 ω = 38.8°

| | i | r | d | n d | v d | [mm] |
|---|---|---|---|---|---|---|
| | | ∞ | ∞ | | | |
| L1 | 1* | 2.642 | 0.629 | 1.5443 | 55.9 | f1 = 5.123 |
| | 2*(ST) | 46.039 | 0.041 | | | |
| L2 | 3* | 4.205 | 0.276 | 1.6707 | 19.2 | f2 = −12.510 |
| | 4* | 2.727 | 0.423 | | | |
| L3 | 5* | 14.331 | 0.541 | 1.5443 | 55.9 | f3 = 12.208 |
| | 6* | −12.225 | 0.133 | | | |
| L4 | 7* | −8.536 | 0.371 | 1.5443 | 55.9 | f4 = −86.726 |
| | 8* | −10.579 | 0.199 | | | |
| L5 | 9* | −13.959 | 0.261 | 1.5443 | 55.9 | f5 = −91.335 |
| | 10* | −19.537 | 0.048 | | | |
| L6 | 11* | −16.413 | 0.326 | 1.5443 | 55.9 | f6 = 13.019 |
| | 12* | −4.984 | 0.075 | | | |
| L7 | 13* | −3.940 | 0.282 | 1.6707 | 19.2 | f7 = 103.392 |
| | 14* | −3.835 | 0.188 | | | |
| L8 | 15* | −13.284 | 0.867 | 1.5443 | 55.9 | f8 = −65.837 |
| | 16* | −21.596 | 0.544 | | | |
| L9 | 17* | 58.904 | 0.756 | 1.5443 | 55.9 | f9 = −4.837 |
| | 18* | 2.509 | 0.300 | | | |
| | 19 | ∞ | 0.210 | 1.5168 | 64.2 | |
| | 20 | ∞ | 0.569 | | | |
| (IM) | | ∞ | | | | | f123=5.161 mm
f789=−4.476 mm
f34=14.358 mm
f89=−4.348 mm
T7=0.282 mm
T8=0.867 mm
D34=0.133 mm
D89=0.544 mm
TL=6.965 mm
Hmax=4.70 mm
Dep=2.653 mm

TABLE 20

Aspherical surface data

| i | k | A4 | A6 | A8 | A10 | A12 | A14 | A16 |
|---|---|---|---|---|---|---|---|---|
| 1 | 2.946E−02 | −2.414E−03 | −1.476E−03 | 1.147E−03 | −1.047E−03 | 3.172E−04 | 5.786E−05 | −3.563E−05 |
| 2 | 0.000E+00 | −2.029E−02 | 2.757E−02 | −1.936E−02 | 6.617E−03 | −6.415E−04 | 3.282E−05 | −7.095E−05 |
| 3 | −5.839E+00 | −3.575E−02 | 3.159E−02 | −2.252E−02 | 6.899E−03 | 2.712E−03 | −2.118E−03 | 2.724E−04 |
| 4 | −9.739E+00 | 2.775E−02 | −2.748E−02 | 1.895E−02 | −8.714E−03 | 2.993E−03 | 8.421E−04 | −4.242E−04 |
| 5 | 0.000E+00 | −6.497E−03 | −1.258E−02 | 1.002E−02 | −9.991E−03 | 4.375E−03 | 5.305E−04 | −2.520E−04 |
| 6 | 0.000E+00 | −3.237E−02 | −2.267E−02 | −9.052E−04 | 2.506E−03 | 2.994E−04 | 2.822E−04 | −8.216E−05 |
| 7 | 0.000E+00 | −4.339E−02 | −1.936E−02 | 2.954E−03 | 1.020E−03 | 2.133E−03 | 9.657E−04 | −6.030E−04 |
| 8 | 0.000E+00 | −2.931E−02 | −1.789E−02 | 2.110E−03 | 4.238E−03 | 5.366E−04 | −5.164E−04 | 2.962E−05 |
| 9 | 0.000E+00 | 9.378E−03 | −3.722E−02 | 1.990E−03 | −9.857E−04 | 1.461E−04 | 4.419E−04 | −1.167E−04 |
| 10 | 0.000E+00 | −4.611E−02 | −1.436E−02 | −9.862E−04 | 1.772E−03 | −8.630E−05 | −2.012E−04 | 1.116E−04 |
| 11 | 0.000E+00 | −7.857E−02 | −6.208E−03 | 7.987E−03 | 5.474E−04 | 1.420E−05 | 4.518E−05 | −5.395E−05 |
| 12 | 0.000E+00 | −1.451E−02 | 2.153E−03 | −1.708E−03 | 5.780E−04 | 1.555E−04 | 5.169E−06 | −1.834E−05 |
| 13 | 1.521E+00 | −2.842E−02 | 3.085E−02 | −1.573E−02 | 5.429E−03 | −1.068E−03 | 1.013E−04 | −1.891E−06 |
| 14 | −1.006E+01 | −3.274E−02 | 2.266E−02 | −1.104E−02 | 3.533E−03 | −5.366E−04 | 2.226E−05 | 1.472E−06 |
| 15 | 5.888E−01 | 2.704E−02 | −1.264E−02 | −5.524E−04 | 3.093E−04 | −8.448E−05 | 3.514E−05 | −4.269E−06 |
| 16 | 0.000E+00 | 1.472E−02 | −3.381E−03 | −6.772E−04 | 1.978E−04 | −1.328E−05 | −3.522E−09 | 2.025E−08 |

TABLE 20-continued

| | | | | Aspherical surface data | | | | |
|---|---|---|---|---|---|---|---|---|
| i | k | A4 | A6 | A8 | A10 | A12 | A14 | A16 |
| 17 | 9.633E+00 | −7.755E−02 | 1.766E−02 | −2.254E−03 | 2.147E−04 | −1.489E−05 | 6.408E−07 | −1.349E−08 |
| 18 | −4.676E+00 | −5.161E−02 | 1.437E−02 | −2.859E−03 | 3.574E−04 | −2.620E−05 | 1.027E−06 | −1.664E−08 |

Figure 29:
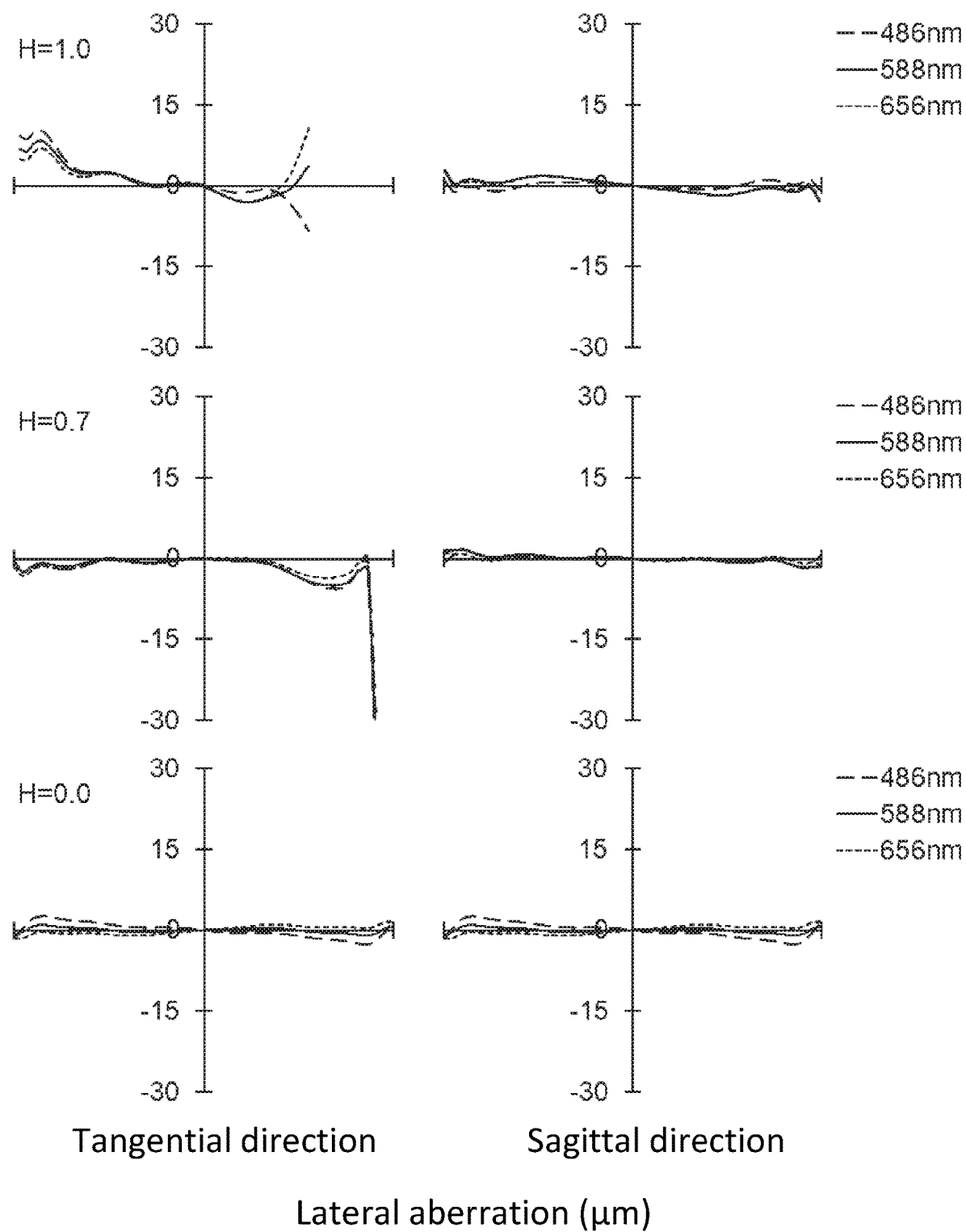
FIG. 29 is an aberration diagram showing a lateral aberration of the imaging lens of FIG. 28.
Figure 30:
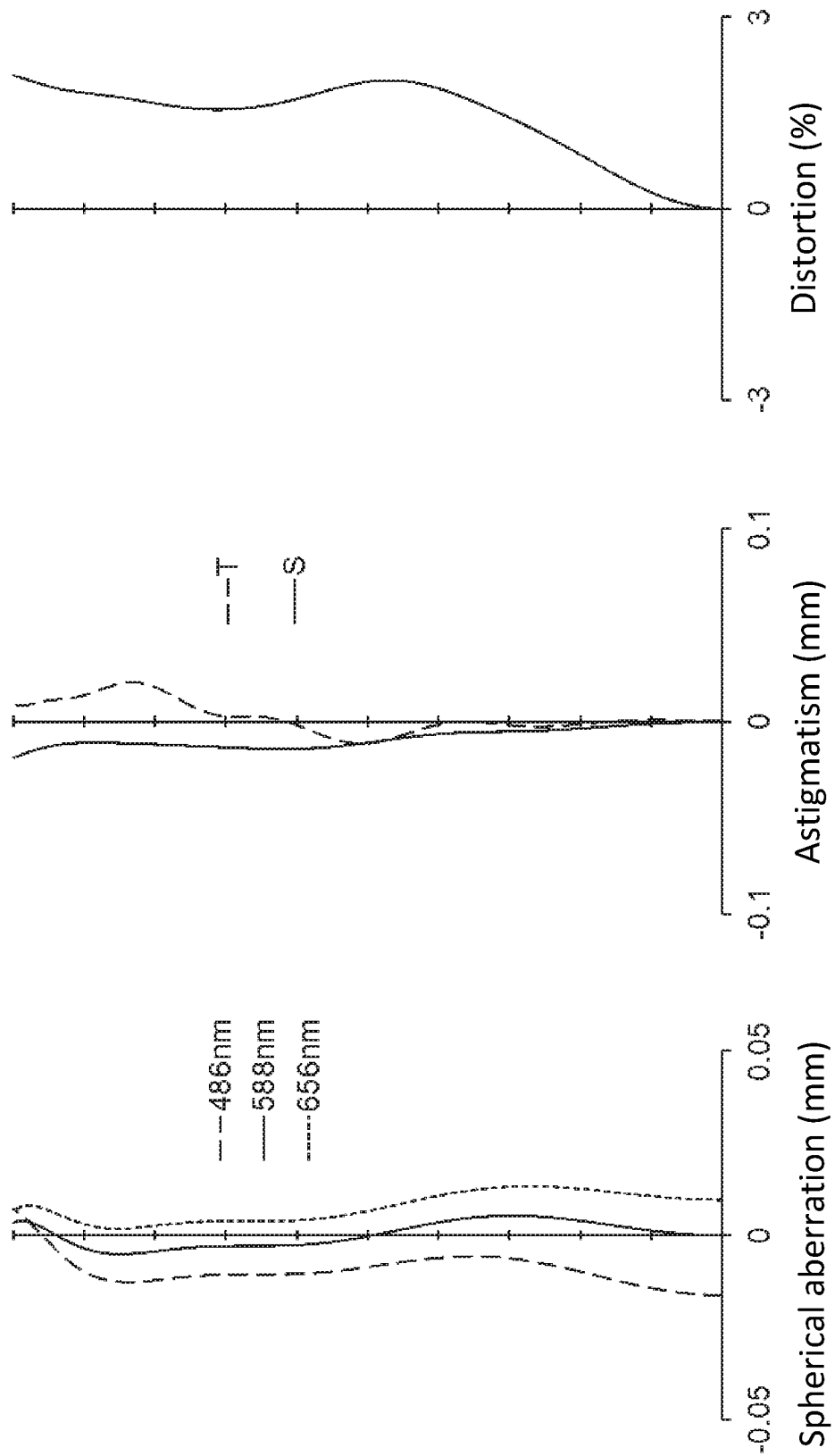
FIG. 30 is an aberration diagram showing a spherical aberration, astigmatism, and a distortion of the imaging lens of FIG. 28.
Figure 31:
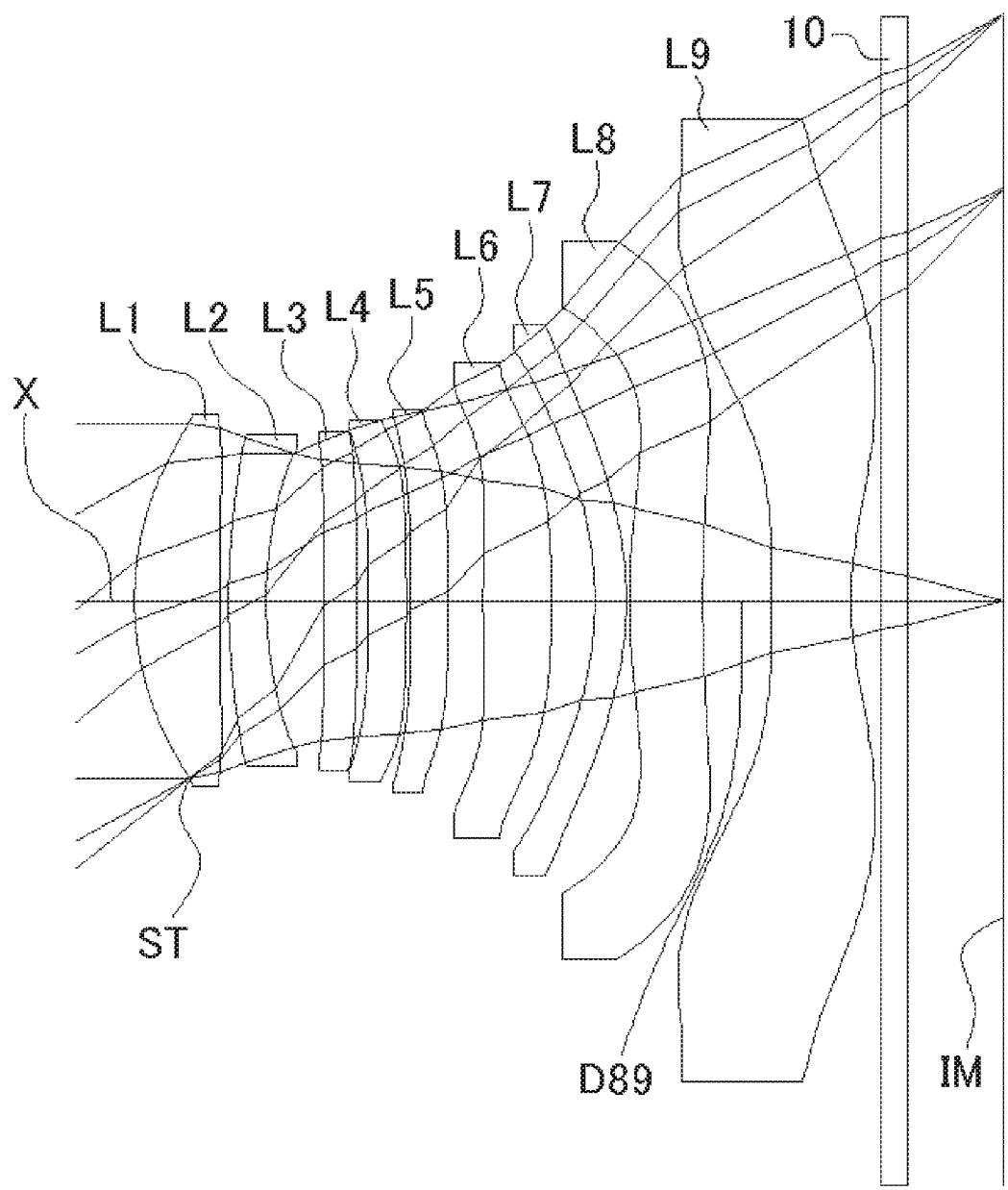
FIG. 31 shows a sectional view of a schematic configuration of an imaging lens in Numerical Data Example 11 of the present invention.

The values of the respective conditional expressions are as follows:

$f123/f=0.884$ $f3/f2=−0.976$ $D34/f=0.023$ $T8/T7=3.074$ $D89/f=0.093$ $R9r/f=0.430$ $f9/f=−0.828$ $|f4/f|=14.850$ $TL/f=1.193$ $TL/Hmax=1.482$ $f/Dep=2.20$ $f6/f=2.229$ FIG. 29 shows a lateral aberration that corresponds to an image height H and FIG. 30 shows a spherical aberration (mm), astigmatism (mm), and a distortion (%), respectively.

Numerical Data Example 11
Basic Lens Data

TABLE 21

| | | f = 5.88 mm Fno = 2.0 ω = 38.7° | | | | |
|---|---|---|---|---|---|---|
| | i | r | d | n d | ν d | [mm] |
| | | ∞ | ∞ | | | |
| L1 | 1*(ST) | 2.492 | 0.701 | 1.5443 | 55.9 | f1 = 5.034 |
| | 2* | 24.794 | 0.061 | | | |
| L2 | 3* | 5.037 | 0.325 | 1.6707 | 19.2 | f2 = −13.721 |
| | 4* | 3.171 | 0.473 | | | |
| L3 | 5* | −111.943 | 0.271 | 1.5443 | 55.9 | f3 = 68.410 |
| | 6* | −27.965 | 0.085 | | | |
| L4 | 7* | −23.829 | 0.315 | 1.5443 | 55.9 | f4 = −103.911 |
| | 8* | −41.369 | 0.034 | | | |
| L5 | 9* | −93.853 | 0.303 | 1.5443 | 55.9 | f5 = −72.785 |
| | 10* | 68.633 | 0.287 | | | |
| L6 | 11* | 13.344 | 0.556 | 1.5443 | 55.9 | f6 = 13.351 |
| | 12* | −15.723 | 0.381 | | | |
| L7 | 13* | −2.912 | 0.250 | 1.6707 | 19.2 | f7 = −108.649 |
| | 14* | −3.138 | 0.021 | | | |
| L8 | 15* | 5.153 | 0.609 | 1.5443 | 55.9 | f8 = 14.129 |
| | 16* | 14.966 | 0.565 | | | |
| L9 | 17* | −70.744 | 0.732 | 1.5443 | 55.9 | f9 = −4.933 |
| | 18* | 2.801 | 0.250 | | | |
| | 19 | ∞ | 0.210 | 1.5168 | 64.2 | |
| | 20 | ∞ | 0.673 | | | |
| (IM) | | ∞ | | | | | f123=6.549 mm
f789=−8.022 mm
f34=201.669 mm
f89=−9.185 mm
T7=0.250 mm
T8=0.609 mm
D34=0.085 mm
D89=0.565 mm
TL=7.032 mm
Hmax=4.71 mm
Dep=2.970 mm

TABLE 22

| | | | | Aspherical surface data | | | | |
|---|---|---|---|---|---|---|---|---|
| i | k | A4 | A6 | A8 | A10 | A12 | A14 | A16 |
| 1 | 1.508E−01 | −3.691E−04 | −2.979E−03 | 2.002E−03 | −1.430E−03 | −3.908E−05 | 1.525E−04 | −5.164E−05 |
| 2 | 0.000E+00 | −2.759E−02 | 2.354E−02 | −1.480E−02 | 4.792E−03 | −7.143E−04 | −6.256E−05 | 1.232E−05 |
| 3 | −1.478E+01 | −2.721E−02 | 2.435E−02 | −1.096E−02 | 5.107E−03 | −9.209E−04 | 5.236E−05 | 1.921E−06 |
| 4 | −1.119E+01 | 2.598E−02 | −1.300E−02 | 1.284E−02 | −3.271E−03 | 1.809E−03 | −7.903E−04 | 3.055E−04 |
| 5 | 0.000E+00 | −1.999E−03 | −5.816E−03 | 1.493E−03 | 4.374E−04 | 5.990E−04 | 1.795E−04 | −3.093E−04 |
| 6 | 0.000E+00 | −7.870E−04 | −7.415E−03 | 3.244E−03 | 1.674E−03 | −7.196E−05 | −2.341E−04 | −1.856E−04 |
| 7 | 0.000E+00 | −1.565E−02 | −1.040E−02 | 2.043E−03 | 4.245E−04 | −5.155E−07 | −6.692E−06 | 1.935E−05 |
| 8 | 0.000E+00 | −1.249E−02 | −1.230E−02 | −1.551E−03 | 3.683E−04 | 3.775E−04 | 1.653E−04 | −6.492E−05 |
| 9 | 0.000E+00 | −2.558E−02 | −4.394E−03 | 1.050E−03 | 4.240E−04 | 4.901E−04 | 1.185E−04 | −1.050E−04 |
| 10 | 0.000E+00 | −4.809E−02 | −1.915E−03 | 2.161E−03 | 6.546E−04 | −1.485E−04 | −6.937E−05 | 4.658E−05 |
| 11 | 0.000E+00 | −4.481E−02 | 2.015E−04 | −2.263E−03 | −2.380E−04 | 2.892E−04 | 7.178E−05 | −1.530E−05 |
| 12 | 0.000E+00 | −5.789E−02 | 1.562E−02 | −2.759E−03 | −1.411E−03 | 1.126E−03 | −2.663E−04 | 2.276E−05 |
| 13 | 5.987E−01 | −1.550E−02 | 2.482E−02 | −1.245E−02 | 4.086E−03 | −6.749E−04 | 3.034E−05 | 1.744E−06 |
| 14 | −2.295E+00 | −1.726E−02 | 1.550E−02 | −8.307E−03 | 2.359E−03 | −3.095E−04 | 1.608E−05 | −4.282E−07 |
| 15 | 0.000E+00 | −2.556E−02 | 4.458E−05 | −1.108E−03 | 2.125E−04 | −4.245E−05 | 8.526E−06 | −7.589E−07 |
| 16 | 0.000E+00 | 3.991E−03 | −2.689E−03 | −3.864E−04 | 1.291E−04 | −9.728E−06 | −1.999E−07 | 3.774E−08 |

TABLE 22-continued

Aspherical surface data

| i | k | A4 | A6 | A8 | A10 | A12 | A14 | A16 |
|---|---|----|----|----|-----|-----|-----|-----|
| 17 | 0.000E+00 | −6.475E−02 | 1.504E−02 | −1.792E−03 | 1.447E−04 | −8.411E−06 | 3.179E−07 | −5.712E−09 |
| 18 | −5.480E+00 | −4.350E−02 | 1.085E−02 | −2.033E−03 | 2.373E−04 | −1.600E−05 | 5.764E−07 | −8.639E−09 |

Figure 32:
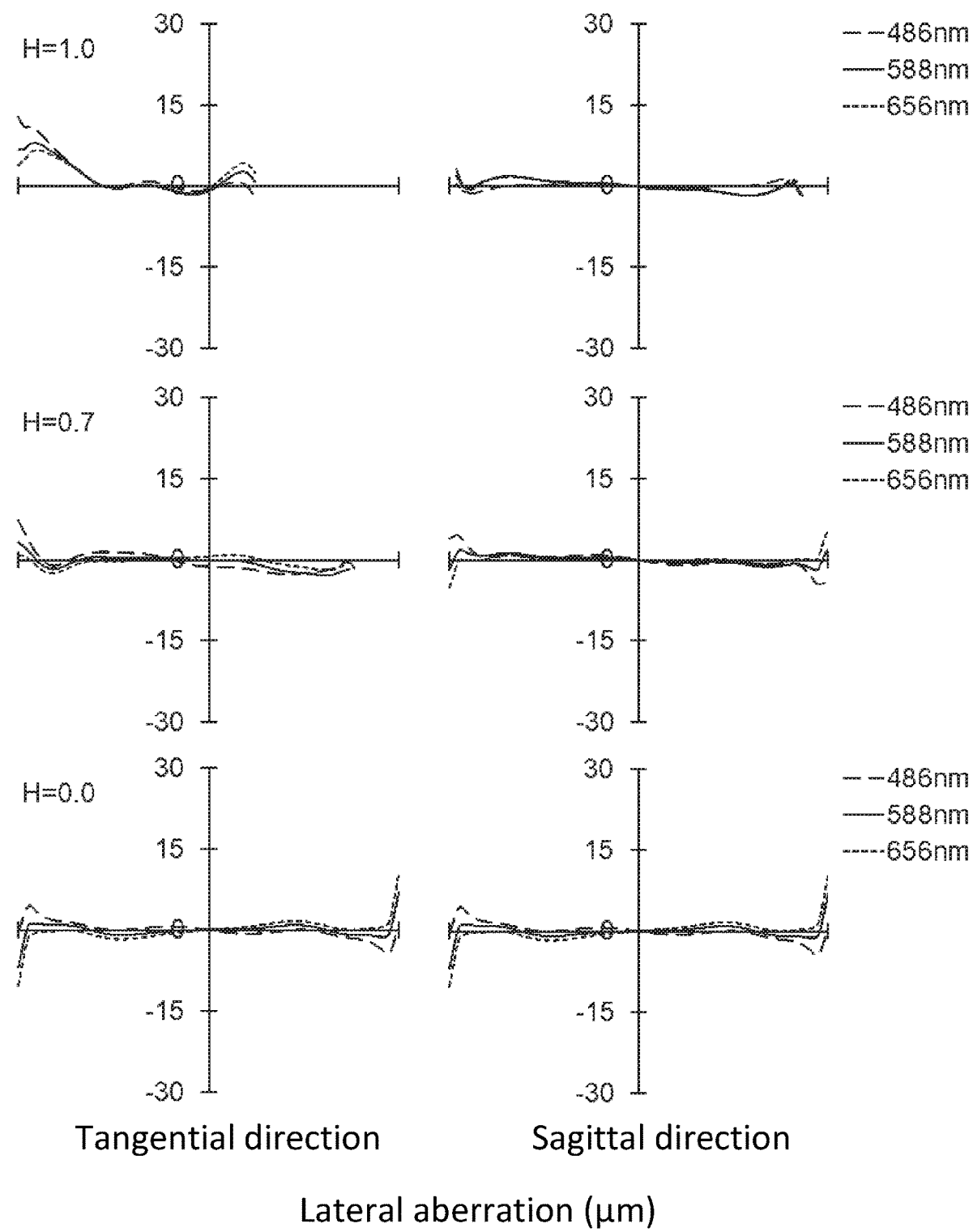
FIG. 32 is an aberration diagram showing a lateral aberration of the imaging lens of FIG. 31.
Figure 33:
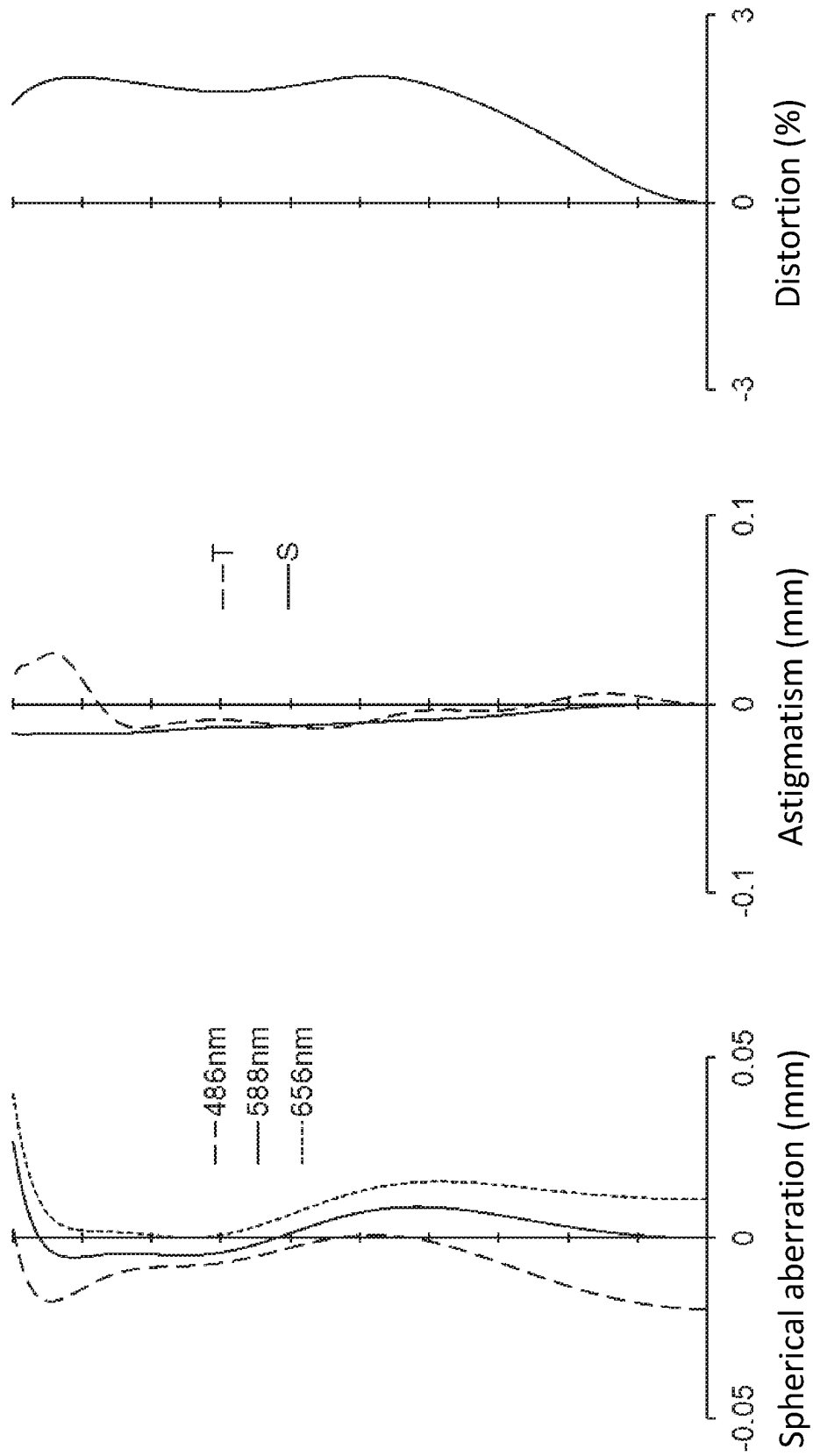
FIG. 33 is an aberration diagram showing a spherical aberration, astigmatism, and a distortion of the imaging lens of FIG. 31.
Figure 34:
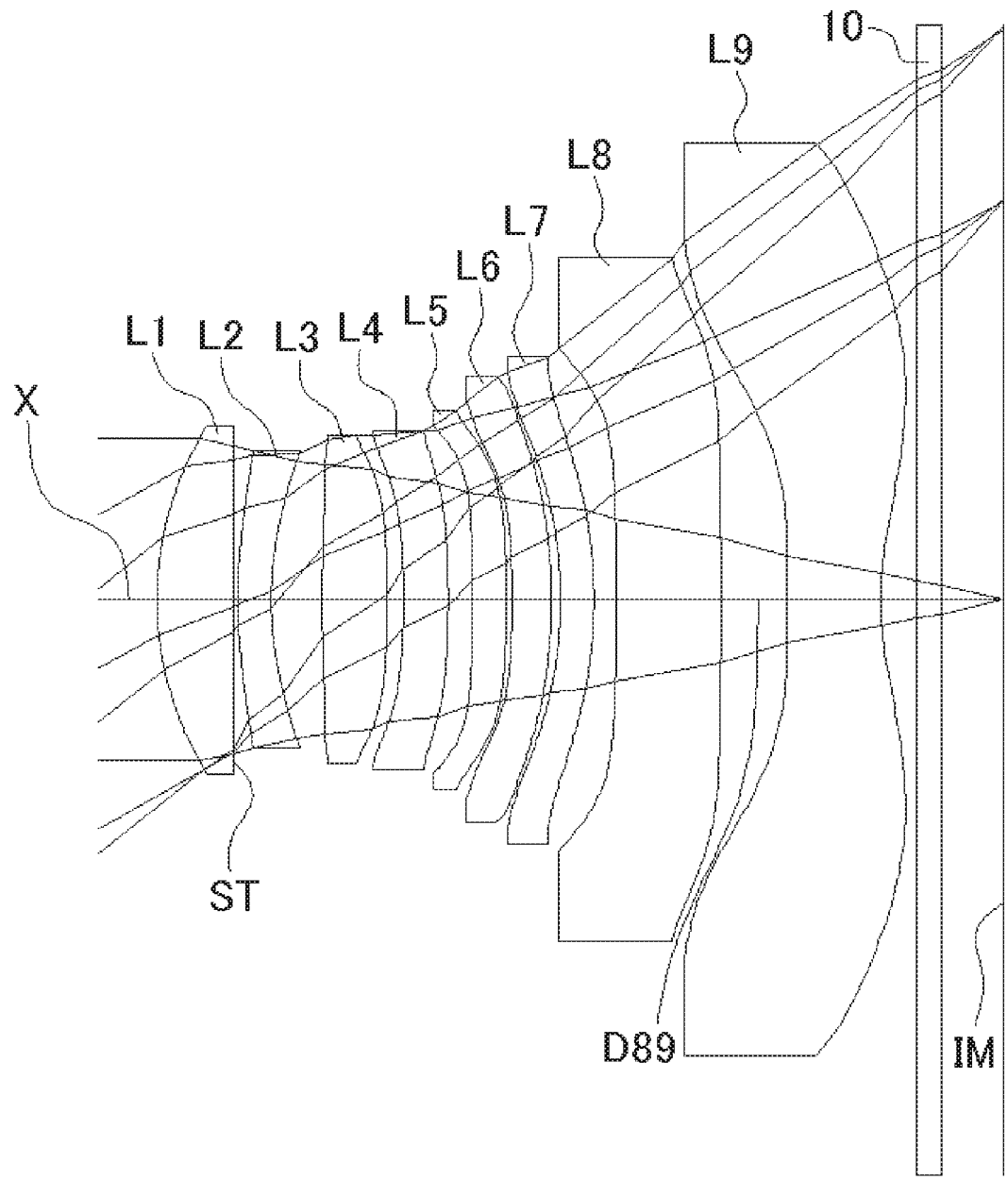
FIG. 34 shows a sectional view of a schematic configuration of an imaging lens in Numerical Data Example 12 of the present invention.

The values of the respective conditional expressions are as follows:

$f123/f=1.114$ $f3/f2=-4.986$ $D34/f=0.014$ $T8/T7=2.436$ $D89/f=0.096$ $R9r/f=0.476$ $f9/f=-0.839$ $|f4/f|=17.672$ $TL/f=1.196$ $TL/Hmax=1.493$ $f/Dep=1.98$ $f8/f=2.403$ FIG. 32 shows a lateral aberration that corresponds to an image height H and FIG. 33 shows a spherical aberration (mm), astigmatism (mm), and a distortion (%), respectively.

Numerical Data Example 12
Basic Lens Data

TABLE 23 f = 5.90 mm Fno = 2.2 ω = 38.5°

| | i | r | d | n d | ν d | [mm] |
|---|---|---|---|-----|-----|------|
| | | ∞ | ∞ | | | |
| L1 | 1* | 2.633 | 0.635 | 1.5443 | 55.9 | f1 = 5.118 |
| | 2*(ST) | 43.877 | 0.039 | | | |
| L2 | 3* | 4.164 | 0.279 | 1.6707 | 19.2 | f2 = −12.723 |
| | 4* | 2.723 | 0.426 | | | |
| L3 | 5* | 14.110 | 0.542 | 1.5443 | 55.9 | f3 = 11.883 |
| | 6* | −11.781 | 0.136 | | | |
| L4 | 7* | −8.613 | 0.372 | 1.5443 | 55.9 | f4 = −100.382 |
| | 8* | −10.381 | 0.205 | | | |
| L5 | 9* | −13.966 | 0.277 | 1.5443 | 55.9 | f5 = −96.919 |
| | 10* | −19.128 | 0.050 | | | |
| L6 | 11* | −16.929 | 0.329 | 1.5443 | 55.9 | f6 = 12.643 |
| | 12* | −4.926 | 0.077 | | | |
| L7 | 13* | −3.880 | 0.277 | 1.6707 | 19.2 | f7 = −101.752 |
| | 14* | −4.232 | 0.192 | | | |
| L8 | 15* | −13.516 | 0.872 | 1.5443 | 55.9 | f8 = −71.495 |
| | 16* | −21.178 | 0.550 | | | |
| L9 | 17* | 61.560 | 0.779 | 1.5443 | 55.9 | f9 = −4.896 |
| | 18* | 2.543 | 0.300 | | | |
| | 19 | ∞ | 0.210 | 1.5168 | 64.2 | |
| | 20 | ∞ | 0.516 | | | |
| (IM) | | ∞ | | | | | f123=5.082 mm
f789=−4.068 mm
f34=13.628 mm
f89=−4.425 mm
T7=0.277 mm
T8=0.872 mm
D34=0.136 mm
D89=0.550 mm
TL=6.991 mm
Hmax=4.70 mm
Dep=2.684 mm

TABLE 24

Aspherical surface data

| i | k | A4 | A6 | A8 | A10 | A12 | A14 | A16 |
|---|---|----|----|----|-----|-----|-----|-----|
| 1 | 2.946E−02 | −2.512E−03 | −1.617E−03 | 1.167E−03 | −1.041E−03 | 3.203E−04 | 6.004E−05 | −3.740E−05 |
| 2 | 0.000E+00 | −2.028E−02 | 2.757E−02 | −1.937E−02 | 6.622E−03 | −6.392E−04 | 3.253E−05 | −7.166E−05 |
| 3 | −5.839E+00 | −3.568E−02 | 3.169E−02 | −2.265E−02 | 6.799E−03 | 2.730E−03 | −2.128E−03 | 2.832E−04 |
| 4 | −9.739E+00 | 2.795E−02 | −2.780E−02 | 1.884E−02 | −8.646E−03 | 3.044E−03 | 8.304E−04 | −4.739E−04 |
| 5 | 0.000E+00 | −4.957E−03 | −1.202E−02 | 1.036E−02 | −1.004E−02 | 4.629E−03 | 5.184E−04 | −3.287E−04 |
| 6 | 0.000E+00 | −3.245E−02 | −2.180E−02 | −7.173E−04 | 2.595E−03 | 3.077E−04 | 2.804E−04 | −8.170E−05 |
| 7 | 0.000E+00 | −4.344E−02 | −1.943E−02 | 2.783E−03 | 1.116E−03 | 2.248E−03 | 9.655E−04 | −6.220E−04 |
| 8 | 0.000E+00 | −2.862E−02 | −1.761E−02 | 2.154E−03 | 4.278E−03 | 5.276E−04 | −5.089E−04 | 3.735E−05 |
| 9 | 0.000E+00 | 8.762E−03 | −3.728E−02 | 2.242E−03 | −9.532E−04 | 1.160E−04 | 4.221E−04 | −1.121E−04 |
| 10 | 0.000E+00 | −4.407E−02 | −1.475E−02 | −1.008E−02 | 1.805E−03 | −7.965E−05 | −1.997E−04 | 1.102E−04 |
| 11 | 0.000E+00 | −8.003E−02 | −6.024E−03 | 8.002E−03 | 5.829E−04 | 2.441E−05 | 4.513E−05 | −5.420E−05 |
| 12 | 0.000E+00 | −1.199E−02 | 2.157E−03 | −1.756E−03 | 5.635E−04 | 1.567E−04 | 5.519E−06 | −1.799E−05 |
| 13 | 1.521E+00 | −2.787E−02 | 3.081E−02 | −1.581E−02 | 5.280E−03 | −1.003E−03 | 9.864E−05 | −2.560E−06 |
| 14 | −1.006E+01 | −3.543E−02 | 2.248E−02 | −1.104E−02 | 3.566E−03 | −5.368E−04 | 2.225E−05 | 1.494E−06 |
| 15 | 5.888E−01 | 2.452E−02 | −1.207E−02 | −5.697E−04 | 2.752E−04 | −8.000E−05 | 3.771E−05 | −4.495E−06 |
| 16 | 0.000E+00 | 1.452E−02 | −3.450E−03 | −6.445E−04 | 1.962E−04 | −1.335E−05 | −6.364E−09 | 2.063E−08 |

TABLE 24-continued

Aspherical surface data

| i | k | A4 | A6 | A8 | A10 | A12 | A14 | A16 |
|---|---|---|---|---|---|---|---|---|
| 17 | 9.633E+00 | −7.812E−02 | 1.773E−02 | −2.245E−03 | 2.145E−04 | −1.501E−05 | 6.390E−07 | −1.272E−08 |
| 18 | −4.676E+00 | −5.174E−02 | 1.439E−02 | −2.864E−03 | 3.578E−04 | −2.619E−05 | 1.026E−06 | −1.664E−08 |

Figure 35:
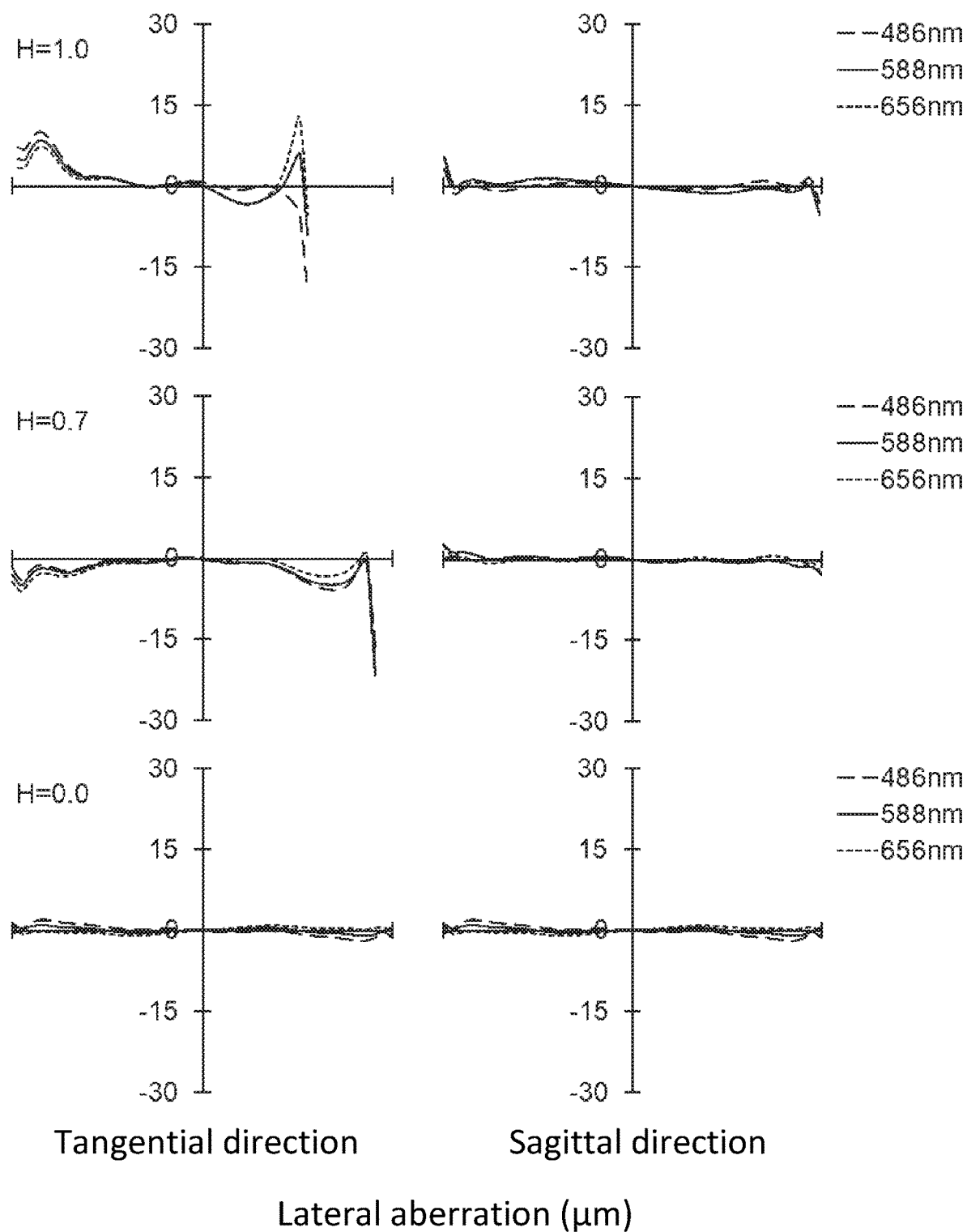
FIG. 35 is an aberration diagram showing a lateral aberration of the imaging lens of FIG. 34.
Figure 36:
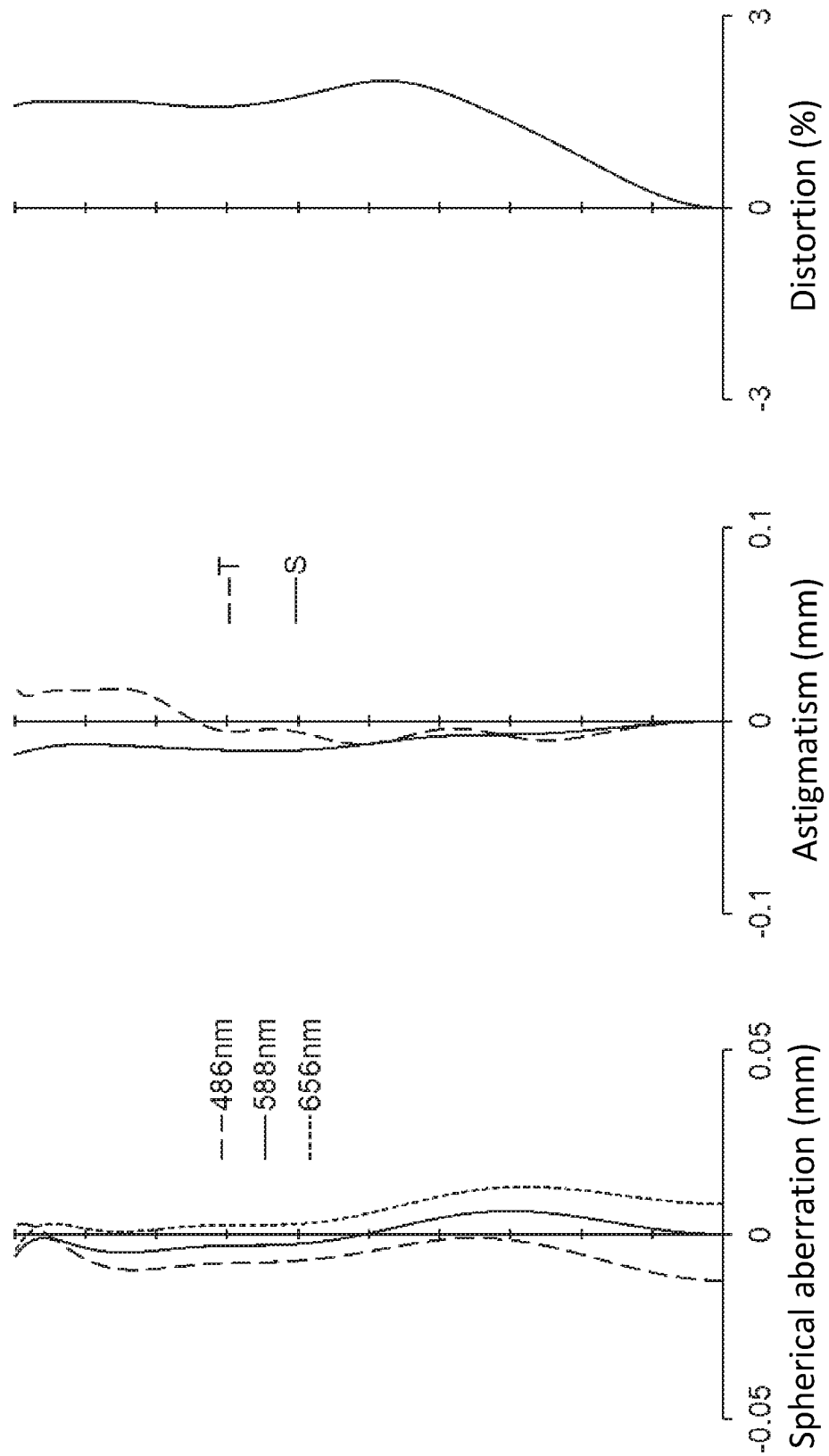
FIG. 36 is an aberration diagram showing a spherical aberration, astigmatism, and a distortion of the imaging lens of FIG. 34.
Figure 37:
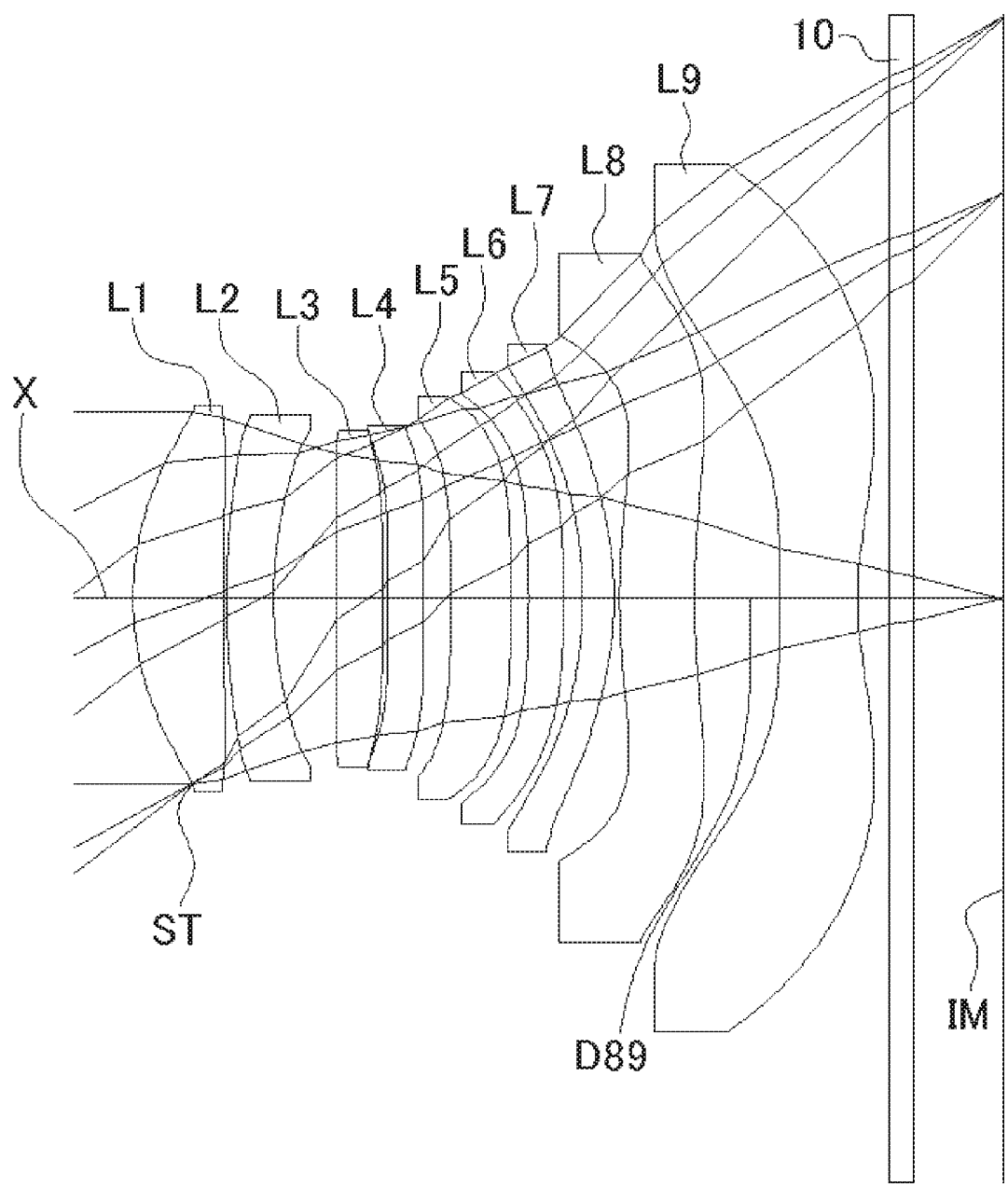
FIG. 37 shows a sectional view of a schematic configuration of an imaging lens in Numerical Data Example 13 of the present invention.

The values of the respective conditional expressions are as follows:

$f123/f=0.861$ $f3/f2=-0.934$ $D34/f=0.023$ $T8/T7=3.148$ $D89/f=0.093$ $R9r/f=0.431$ $f9/f=-0.830$ $|f4/f|=17.014$ $TL/f=1.185$ $TL/Hmax=1.487$ $f/Dep=2.20$ FIG. 35 shows a lateral aberration that corresponds to an image height H and FIG. 36 shows a spherical aberration (mm), astigmatism (mm), and a distortion (%), respectively.

Numerical Data Example 13

Basic Lens Data

TABLE 25

| | i | r | d | nd | νd | [mm] |
|---|---|---|---|---|---|---|
| | | f = 6.10 mm Fno = 20 ω = 37.6° | | | | |
| L1 | 1* | ∞ | 0.740 | 1.5443 | 55.9 | f1 = 4.981 |
| | 2*(ST) | 2.439 | 0.024 | | | |
| | | 21.695 | | | | |

TABLE 25-continued

| | i | r | d | nd | νd | [mm] |
|---|---|---|---|---|---|---|
| | | f = 6.10 mm Fno = 20 ω = 37.6° | | | | |
| L2 | 3* | 6.046 | 0.386 | 1.6707 | 19.2 | f2 = −13.572 |
| | 4* | 3.540 | 0.513 | | | |
| L3 | 5* | 32.718 | 0.383 | 1.5443 | 55.9 | f3 = 33.686 |
| | 6* | −41.537 | 0.041 | | | |
| L4 | 7* | 58.810 | 0.292 | 1.5443 | 55.9 | f4 = −121.484 |
| | 8* | 34.089 | 0.222 | | | |
| L5 | 9* | −37.384 | 0.493 | 1.5443 | 55.9 | f5 = −264.647 |
| | 10* | −50.722 | 0.146 | | | |
| L6 | 11* | −12.738 | 0.286 | 1.6707 | 19.2 | f6 = −100.981 |
| | 12* | −16.712 | 0.155 | | | |
| L7 | 13* | −4.172 | 0.259 | 1.5443 | 55.9 | f7 = 12.337 |
| | 14* | −2.843 | 0.045 | | | |
| L8 | 15* | 6.355 | 0.614 | 1.5443 | 55.9 | f8 = 94.418 |
| | 16* | 7.005 | 0.696 | | | |
| L9 | 17* | −1441.119 | 0.642 | 1.5443 | 55.9 | f9 = −5.335 |
| | 18* | 2.910 | 0.250 | | | |
| | 19 | ∞ | 0.210 | 1.5168 | 64.2 | |
| | 20 | ∞ | 0.731 | | | |
| (IM) | | ∞ | | | | | f123=6.033 mm f789=−15.424 mm f34=46.296 mm f89=−5.944 mm

T7=0.259 mm

T8=0.614 mm

D34=0.041 mm

D89=0.696 mm

TL=7.057 mm

Hmax=4.70 mm

Dep=3.051 mm

TABLE 26

Aspherical surface data

| i | k | A4 | A6 | A8 | A10 | A12 | A14 | A16 |
|---|---|---|---|---|---|---|---|---|
| 1 | 1.339E−01 | −1.187E−03 | −2.950E−03 | 1.352E−03 | −8.315E−04 | 5.478E−05 | −1.700E−05 | −7.317E−06 |
| 2 | 0.000E+00 | −2.172E−02 | 2.147E−02 | −1.447E−02 | 4.720E−03 | −7.641E−04 | 4.398E−05 | −1.022E−05 |
| 3 | −1.165E+01 | −1.692E−02 | 1.911E−02 | −1.078E−02 | 3.656E−03 | −2.477E−04 | 9.040E−05 | −4.365E−05 |
| 4 | −9.423E+00 | 2.227E−02 | −1.163E−02 | 1.034E−02 | −5.928E−03 | 2.197E−03 | 1.141E−04 | −5.567E−05 |
| 5 | 0.000E+00 | −1.232E−03 | −3.487E−03 | −3.532E−03 | −5.274E−04 | 8.531E−04 | 9.922E−04 | −2.952E−04 |
| 6 | 0.000E+00 | −1.571E−02 | −9.284E−03 | −1.221E−03 | 9.429E−05 | 2.310E−04 | 1.313E−04 | 1.168E−04 |
| 7 | 0.000E+00 | −4.770E−02 | −8.481E−03 | 1.473E−03 | 7.531E−04 | −3.084E−04 | −1.593E−04 | 2.402E−04 |
| 8 | 0.000E+00 | −4.393E−02 | −3.853E−03 | −1.537E−04 | 2.750E−04 | 1.367E−04 | −1.110E−06 | 8.536E−05 |
| 9 | 0.000E+00 | −4.550E−02 | 9.971E−03 | −4.993E−03 | −1.809E−03 | 5.596E−04 | 2.521E−04 | −7.344E−05 |
| 10 | 0.000E+00 | −5.068E−02 | 3.898E−03 | −2.866E−03 | −1.314E−03 | 1.003E−03 | −2.895E−04 | 2.745E−05 |
| 11 | 0.000E+00 | −2.606E−02 | −5.511E−03 | −3.460E−03 | −3.732E−04 | 2.914E−04 | 7.860E−05 | −1.725E−05 |
| 12 | 0.000E+00 | −6.798E−02 | 1.652E−02 | −2.760E−03 | −1.431E−03 | 1.085E−03 | −2.733E−04 | 2.612E−05 |
| 13 | 3.170E+00 | −3.631E−02 | 2.444E−02 | −1.149E−02 | 3.998E−03 | −7.150E−04 | 3.215E−05 | 6.088E−06 |
| 14 | −5.409E+00 | −2.875E−03 | 6.144E−03 | −7.512E−03 | 2.542E−03 | −2.954E−04 | 1.432E−05 | −1.262E−06 |
| 15 | 0.000E+00 | −3.232E−02 | −1.390E−02 | 2.736E−03 | −2.549E−04 | −7.830E−05 | 2.000E−05 | −1.263E−06 |
| 16 | 0.000E+00 | −1.530E−02 | 4.163E−04 | −5.930E−04 | 1.167E−04 | −7.906E−06 | −8.410E−09 | 2.532E−08 |
| 17 | 0.000E+00 | −7.412E−02 | 1.542E−02 | −1.774E−03 | 1.455E−04 | −8.350E−06 | 3.193E−07 | −6.939E−09 |
| 18 | −8.791E+00 | −4.542E−02 | 1.087E−02 | −2.009E−03 | 2.348E−04 | −1.608E−05 | 5.809E−07 | −8.451E−09 |

Figure 38:
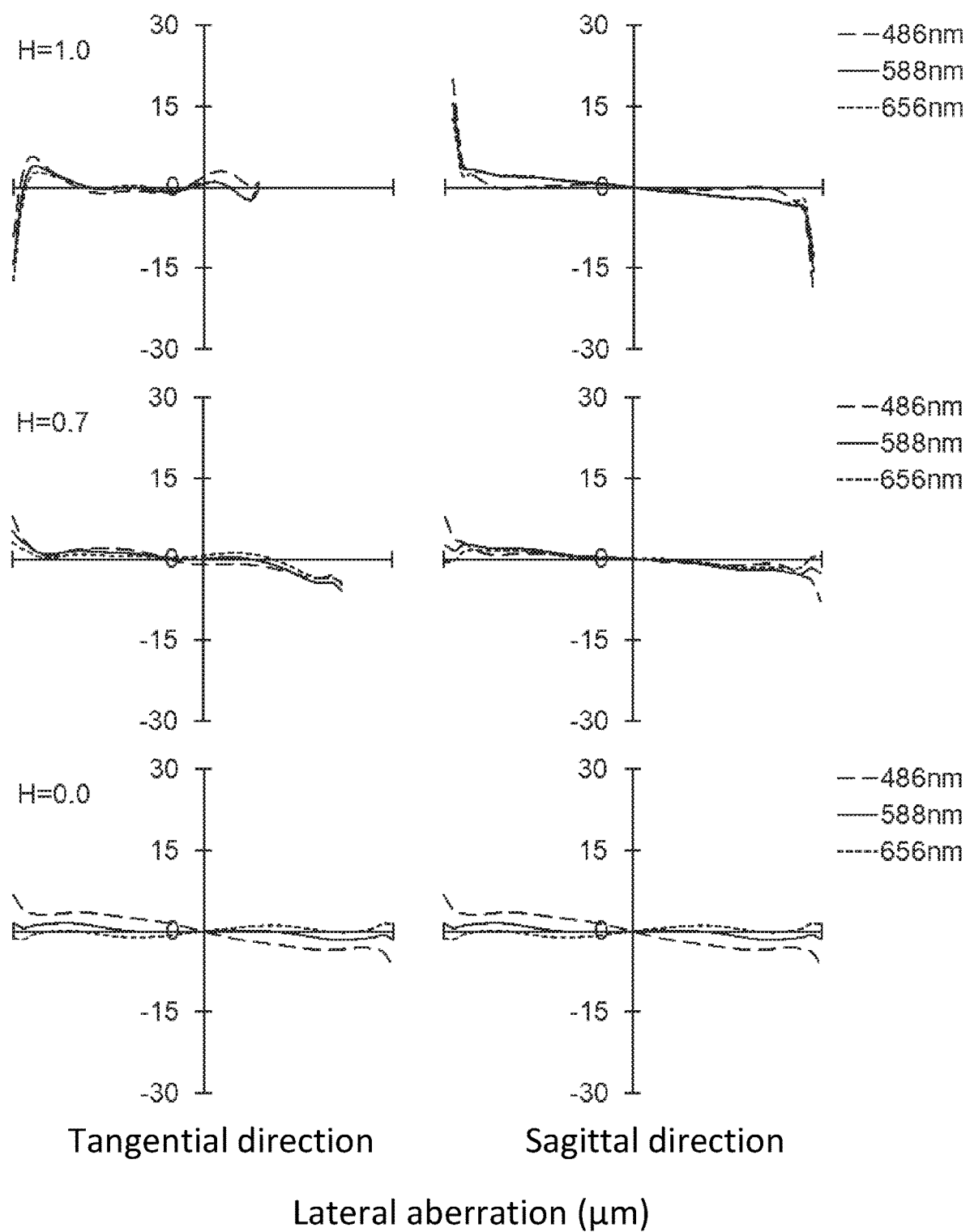
FIG. 38 is an aberration diagram showing a lateral aberration of the imaging lens of FIG. 37.
Figure 39:
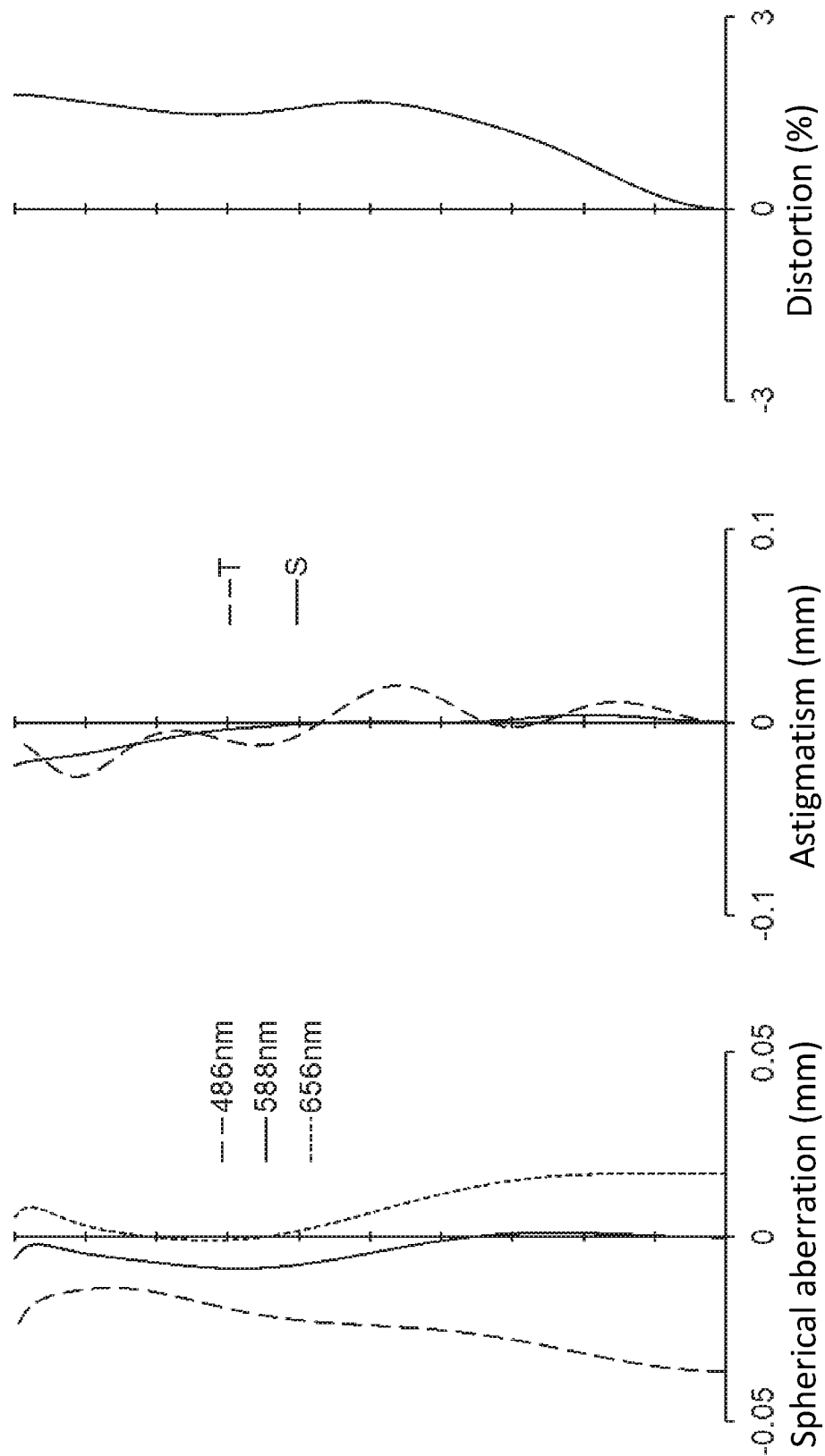
FIG. 39 is an aberration diagram showing a spherical aberration, astigmatism, and a distortion of the imaging lens of FIG. 37.
Figure 40:
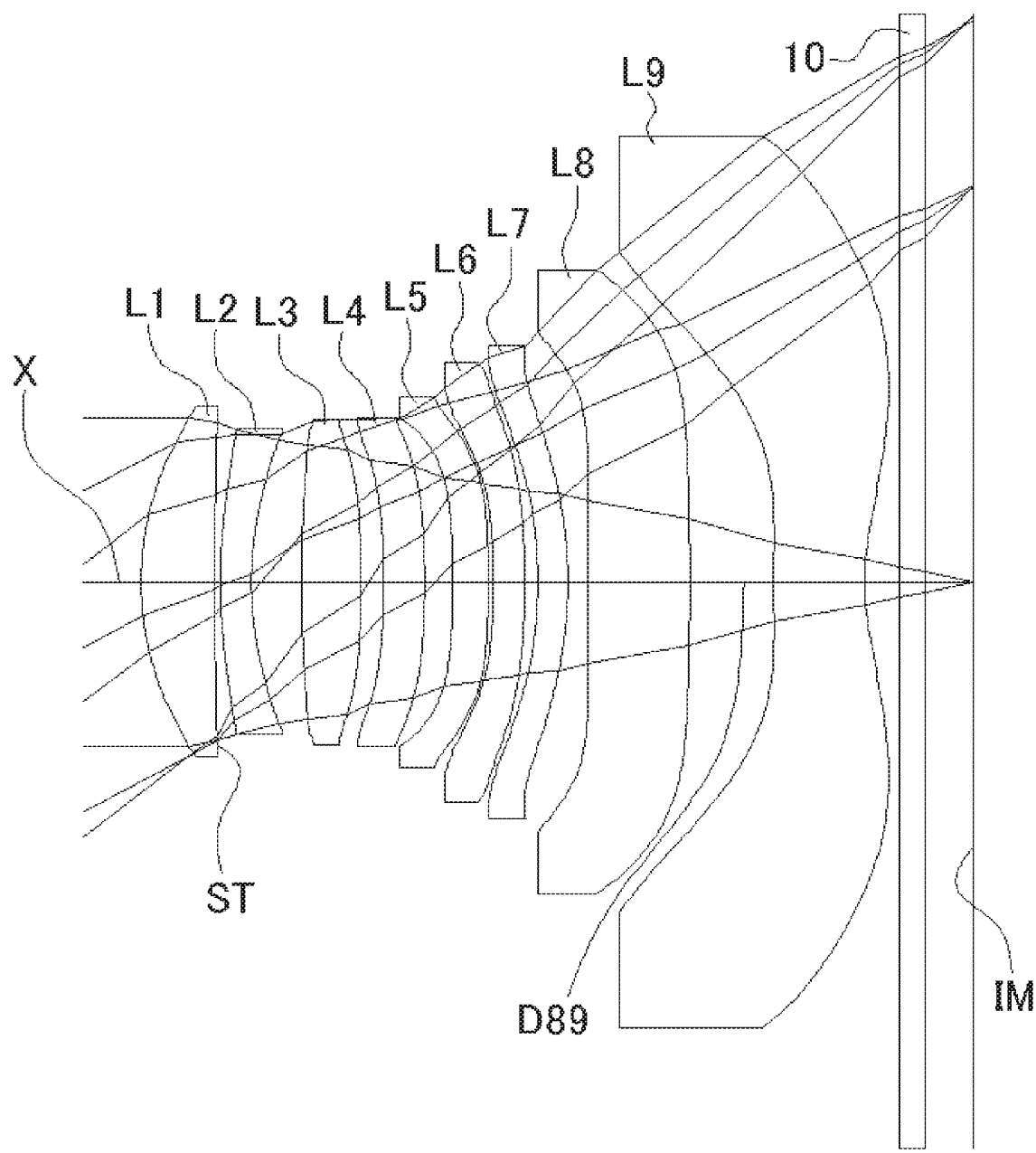
FIG. 40 shows a sectional view of a schematic configuration of an imaging lens in Numerical Data Example 14 of the present invention.

The values of the respective conditional expressions are as follows:

$f123/f=0.989$ $f3/f2=-2.482$ $D34/f=0.007$ $T8/T7=2.371$ $D89/f=0.114$ $R9r/f=0.477$ $f9/f=-0.875$ $|f4/f|=19.915$ $TL/f=1.157$ $TL/Hmax=1.501$ $f/Dep=2.00$ FIG. 38 shows a lateral aberration that corresponds to an image height H and FIG. 39 shows a spherical aberration (mm), astigmatism (mm), and a distortion (%), respectively.

Numerical Data Example 14
Basic Lens Data

TABLE 27

| | i | r | d | n d | v d | [mm] |
|---|---|---|---|---|---|---|
| | | f = 6.12 mm Fno = 2.2 ω = 37.6° | | | | |
| L1 | 1* | ∞ | ∞ | | | |
| | 2*(ST) | 2.464 | 0.621 | 1.5443 | 55.9 | f1 = 4.960 |
| | | 25.719 | 0.048 | | | |

TABLE 27-continued

| | i | r | d | n d | v d | [mm] |
|---|---|---|---|---|---|---|
| | | f = 6.12 mm Fno = 2.2 ω = 37.6° | | | | |
| L2 | 3* | 4.254 | 0.263 | 1.6707 | 19.2 | f2 = −12.231 |
| | 4* | 2.732 | 0.425 | | | |
| L3 | 5* | 10.941 | 0.503 | 1.5443 | 55.9 | f3 = 10.335 |
| | 6* | −11.391 | 0.193 | | | |
| L4 | 7* | −7.728 | 0.347 | 1.5443 | 55.9 | f4 = −103.656 |
| | 8* | −9.097 | 0.237 | | | |
| L5 | 9* | −10.579 | 0.302 | 1.5443 | 55.9 | f5 = −109.217 |
| | 10* | −12.999 | 0.044 | | | |
| L6 | 11* | −7.659 | 0.264 | 1.6707 | 19.2 | f6 = −104.932 |
| | 12* | −8.952 | 0.111 | | | |
| L7 | 13* | −4.263 | 0.255 | 1.5443 | 55.9 | f7 = 34.828 |
| | 14* | −3.692 | 0.169 | | | |
| L8 | 15* | −15.930 | 0.863 | 1.5443 | 55.9 | f8 = −100.601 |
| | 16* | −22.895 | 0.709 | | | |
| L9 | 17* | 14.317 | 0.771 | 1.5443 | 559 | f9 = −4.935 |
| | 18* | 2.219 | 0.300 | | | |
| | 19 | ∞ | 0.210 | 1.5168 | 64.2 | |
| | 20 | ∞ | 0.409 | | | |
| (IM) | | ∞ | | | | | f123=4.762 mm
f789=−5.430 mm
f34=11.608 mm
f89=−4.564 mm
T7=0.255 mm
T8=0.863 mm
D34=0.193 mm
D89=0.709 mm
TL=6.973 mm
Hmax=4.70 mm
Dep=2.781 mm

TABLE 28

| | Aspherical surface data | | | | | | | |
|---|---|---|---|---|---|---|---|---|
| i | k | A4 | A6 | A8 | A10 | A12 | A14 | A16 |
| 1 | 1.900E−02 | −2.365E−03 | −1.394E−03 | 1.067E−03 | −1.127E−03 | 2.615E−04 | 9.680E−05 | −4.919E−05 |
| 2 | 0.000E+00 | −2.055E−02 | 2.720E−02 | −1.930E−02 | 6.521E−03 | −7.306E−04 | 1.159E−04 | −8.473E−05 |
| 3 | −7.369E+00 | −3.344E−02 | 3.157E−02 | −2.407E−02 | 7.603E−03 | 3.018E−03 | −2.432E−03 | 3.733E−04 |
| 4 | −8.386E+00 | 2.464E−02 | −2.498E−02 | 1.990E−02 | −1.232E−02 | 4.774E−03 | 1.107E−03 | −7.532E−04 |
| 5 | 0.000E+00 | −7.312E−04 | −6.946E−03 | 5.923E−03 | −1.035E−02 | 5.628E−03 | 1.144E−03 | −6.435E−04 |
| 6 | 0.000E+00 | −1.814E−02 | −2.032E−02 | 1.672E−03 | 1.259E−03 | −4.190E−04 | 5.092E−04 | 1.527E−04 |
| 7 | 0.000E+00 | −3.421E−02 | −1.216E−02 | 2.911E−04 | 2.360E−05 | 1.908E−03 | 7.042E−04 | −2.707E−04 |
| 8 | 0.000E+00 | −3.037E−02 | −1.990E−02 | 4.222E−03 | 3.752E−03 | −1.495E−04 | −6.475E−04 | 1.488E−04 |
| 9 | 0.000E+00 | −3.3811E−02 | −3.059E−02 | −2.343E−03 | −1.340E−03 | 1.317E−03 | 1.166E−03 | −6.568E−04 |
| 10 | 0.000E+00 | −6.154E−02 | −1.820E−02 | 2.619E−03 | 2.489E−03 | −9.277E−05 | −3.480E−04 | 1.330E−04 |
| 11 | 0.000E+00 | −7.480E−02 | −4.716E−03 | 7.530E−03 | 5.895E−04 | 2.461E−05 | 5.599E−05 | −5.324E−05 |
| 12 | 0.000E+00 | −3.275E−02 | 2.437E−03 | −1.225E−03 | 7.817E−04 | 1.514E−04 | −4.407E−06 | −1.743E−05 |
| 13 | 1.615E+00 | −4.067E−02 | 3.398E−02 | −1.590E−02 | 5.381E−03 | −1.060E−03 | 1.062E−04 | −2.912E−06 |
| 14 | −2.049E+01 | −4.199E−02 | 2.159E−02 | −1.040E−07 | 3.568E−03 | −5.481E−04 | 2.340E−05 | 1.599E−06 |
| 15 | −4.748E+03 | 2.763E−02 | −1.886E−02 | 8.287E−04 | 6.399E−04 | −1.962E−04 | 3.556E−05 | −2.773E−06 |
| 16 | 0.000E+00 | 5.919E−03 | −2.328E−03 | −8.377E−04 | 1.978E−04 | −1.243E−05 | −8.093E−08 | 1.387E−08 |
| 17 | −9.011E+02 | −8.645E−02 | 1.752E−02 | −2.323E−03 | 2.266E−04 | −1.393E−05 | 5.974E−07 | −2.098E−08 |
| 18 | −7.839E+00 | −4.530E−02 | 1.290E−02 | −2.718E−03 | 3.489E−04 | −2.583E−05 | 1.018E−06 | −1.664E−08 |

Figure 41:
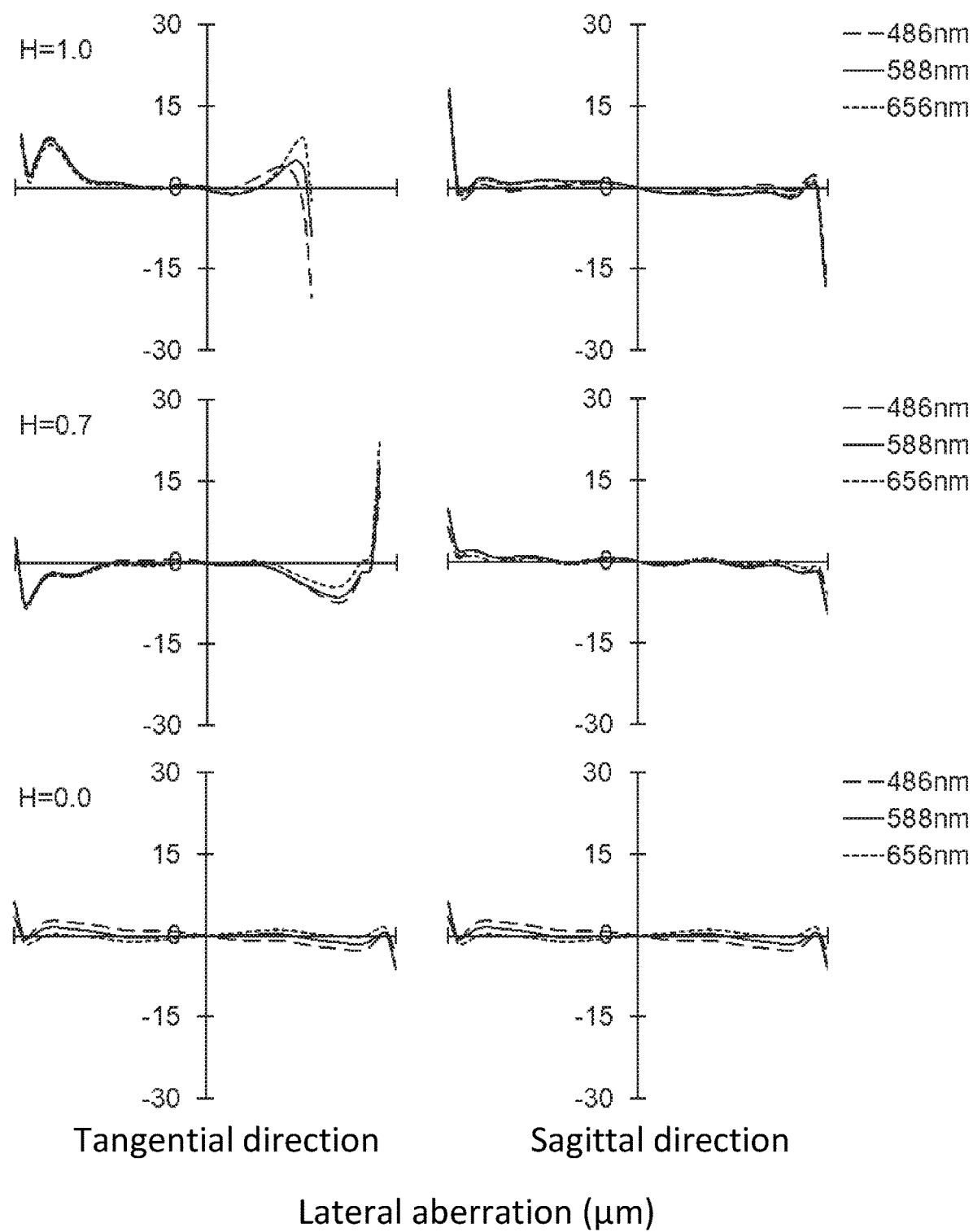
FIG. 41 is an aberration diagram showing a lateral aberration of the imaging lens of FIG. 40.
Figure 42:
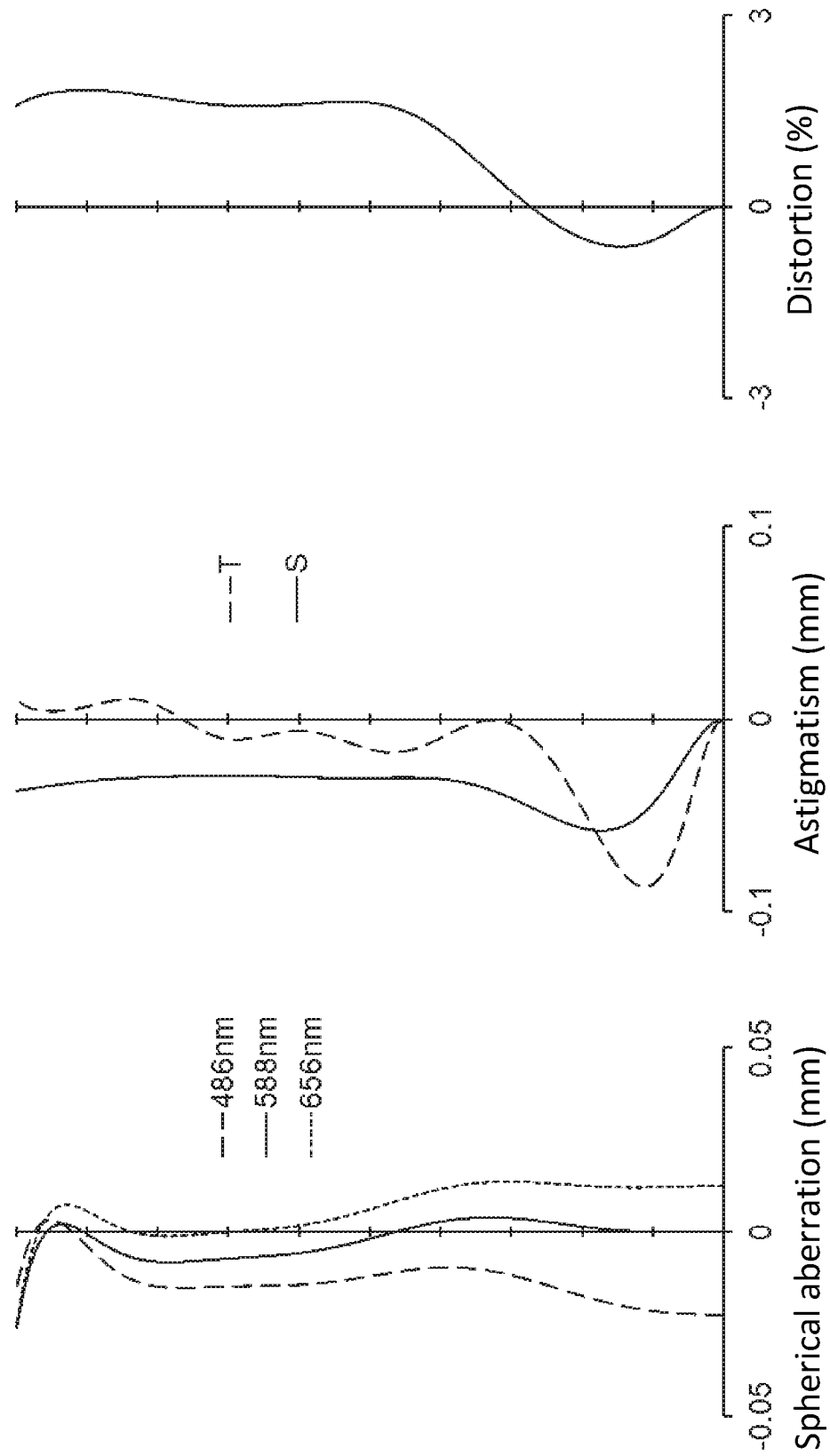
FIG. 42 is an aberration diagram showing a spherical aberration, astigmatism, and a distortion of the imaging lens of FIG. 40.
Figure 43:
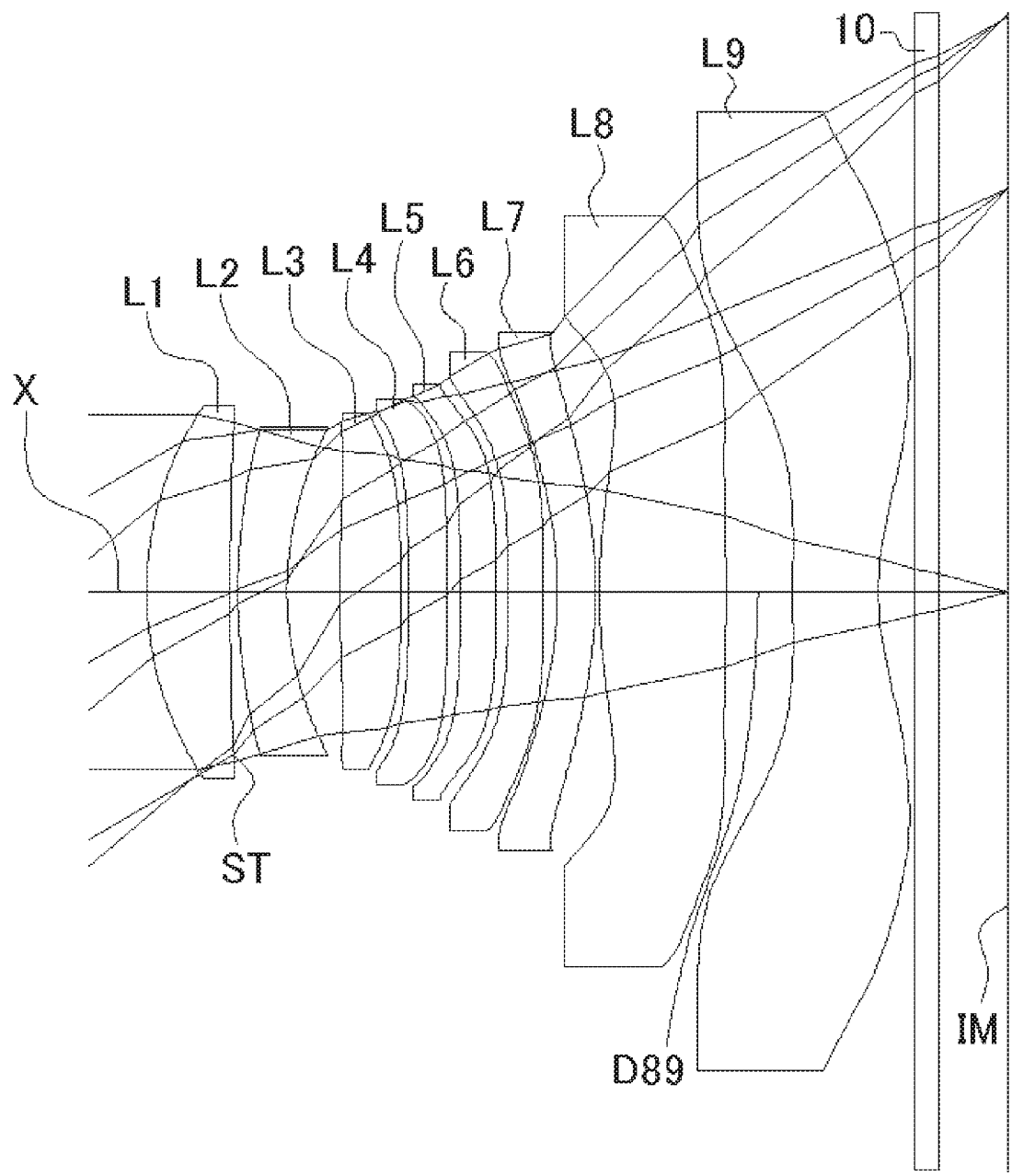
FIG. 43 shows a sectional view of a schematic configuration of an imaging lens in Numerical Data Example 15 of the present invention.

The values of the respective conditional expressions are as follows:

$f123/f=0.778$ $f3/f2=-0.845$ $D34/f=0.032$ $T8/T7=3.384$ $D89/f=0.116$ $R9r/f=0.363$ $f9/f=-0.806$ $|f4/f|=16.937$ $TL/f=1.139$ $TL/Hmax=1.484$ $f/Dep=2.20$ FIG. 41 shows a lateral aberration that corresponds to an image height H and FIG. 42 shows a spherical aberration (mm), astigmatism (mm), and a distortion (%), respectively.

Numerical Data Example 15
Basic Lens Data

TABLE 29

| | | | | | | |
|---|---|---|---|---|---|---|
| f = 5.55 mm Fno = 1.9 ω = 40.3° | | | | | | |
| | i | r | d | n d | ν d | [mm] |
| L1 | 1* | ∞ | ∞ | | | |
| | 2*(ST) | 2.696 | 0.693 | 1.5443 | 55.9 | f1 = 5.336 |
| | | 34.244 | 0.063 | | | |

TABLE 29-continued

| | | | | | | |
|---|---|---|---|---|---|---|
| f = 5.55 mm Fno = 1.9 ω = 40.3° | | | | | | |
| | i | r | d | n d | ν d | [mm] |
| L2 | 3* | 4.416 | 0.407 | 1.6707 | 19.2 | f2 = -10.801 |
| | 4* | 2.642 | 0.437 | | | |
| L3 | 5* | 10.981 | 0.508 | 1.5443 | 55.9 | f3 = 11.479 |
| | 6* | -14.259 | 0.063 | | | |
| L4 | 7* | -21.599 | 0.318 | 1.5443 | 55.9 | f4 = -116.032 |
| | 8* | -32.995 | 0.113 | | | |
| L5 | 9* | -20.954 | 0.294 | 1.5443 | 55.9 | f5 = -104.888 |
| | 10* | -33.268 | 0.100 | | | |
| L6 | 11* | -20.155 | 0.297 | 1.5443 | 55.9 | f6 = -140.532 |
| | 12* | -27.507 | 0.113 | | | |
| L7 | 13* | -3.617 | 0.316 | 1.6707 | 19.2 | f7 = -46.776 |
| | 14* | -4.231 | 0.033 | | | |
| L8 | 15* | 5.273 | 1.049 | 1.5443 | 55.9 | f8 = 7.209 |
| | 16* | -14.265 | 0.553 | | | |
| L9 | 17* | 18.188 | 0.707 | 1.5443 | 55.9 | f9 = -4.541 |
| | 18* | 2.146 | 0.300 | | | |
| | 19 | ∞ | 0.210 | 1.5168 | 64.2 | |
| | 20 | ∞ | 0.567 | | | |
| (IM) | | ∞ | | | | | f123=5.514 mm
f789=-15.820 mm
f34=12.756 mm
f89=-30.253 mm
T7=0.316 mm
T8=1.049 mm
D34=0.063 mm
D89=0.553 mm
TL=7.069 mm
Hmax=4.70 mm
Dep=2.937 mm

TABLE 30

| | | | | | | | | |
|---|---|---|---|---|---|---|---|---|
| Aspherical surface data | | | | | | | | |
| i | k | A4 | A6 | A8 | A10 | A12 | A14 | A16 |
| 1 | 2.946E-02 | -1.081E-04 | -2.089E-03 | 1.633E-03 | -1.140E-03 | 3.687E-04 | 2.653E-05 | -3.181E-05 |
| 2 | 0.000E+00 | -1.836E-02 | 2.889E-02 | -1.867E-02 | 6.893E-03 | -1.153E-03 | -8.042E-05 | 2.386E-05 |
| 3 | -5.839E+00 | -2.944E-02 | 3.656E-02 | -1.963E-02 | 6.907E-03 | -1.037E-03 | -3.149E-04 | 8.781E-05 |
| 4 | -9.739E+00 | 3.776E-02 | -2.022E-02 | 1.706E-02 | -7.333E-03 | 2.363E-03 | -8.803E-04 | 2.138E-04 |
| 5 | -8.379E+01 | -6.595E-03 | -6.251E-03 | 2.105E-04 | -1.275E-03 | 4.054E-04 | 4.298E-04 | -6.797E-05 |
| 6 | 0.000E+00 | -1.850E-02 | -1.491E-02 | -2.563E-03 | 6.286E-04 | 6.402E-04 | 1.196E-04 | -4.522E-05 |
| 7 | 0.000E+00 | -1.581E-02 | -1.349E-02 | -2.195E-04 | 1.597E-04 | 9.358E-05 | 7.877E-05 | -3.446E-05 |
| 8 | 0.000E+00 | -7.613E-03 | -1.132E-02 | -1.150E-03 | 5.636E-04 | 2.709E-05 | -1.227E-04 | -6.620E-06 |
| 9 | 0.000E+00 | -8.291E-03 | -1.842E-02 | -4.842E-05 | 2.475E-04 | 1.030E-04 | 6.220E-05 | -2.555E-05 |
| 10 | 0.000E+00 | -3.222E-02 | -1.219E-02 | -1.586E-03 | 7.817E-04 | -4.095E-05 | -9.300E-06 | 2.920E-05 |
| 11 | 0.000E+00 | -4.148E-02 | -7.122E-03 | 6.936E-04 | 2.490E-04 | 6.521E-05 | 2.794E-05 | -6.148E-06 |
| 12 | 1.811E+02 | -4.095E-02 | 1.348E-04 | 6.360E-04 | 4.000E-04 | 2.425E-05 | -7.898E-06 | -4.076E-06 |
| 13 | 1.521E+00 | -2.979E-03 | 2.355E-02 | -1.607E-02 | 5.783E-03 | -1.044E-03 | 7.129E-05 | 1.695E-06 |
| 14 | -1.006E+01 | -2.331E-02 | 2.268E-02 | -1.176E-02 | 3.389E-03 | -5.138E-04 | 3.122E-05 | 5.201E-07 |
| 15 | 5.888E-01 | -9.226E-03 | -1.858E-03 | -1.961E-03 | 5.764E-04 | -1.141E-04 | 1.245E-05 | -1.825E-07 |
| 16 | -1.472E+02 | 1.806E-02 | -3.094E-03 | -8.190E-04 | 1.967E-04 | -1.182E-05 | 9.223E-08 | 2.937E-09 |
| 17 | 9.633E+00 | -8.385E-02 | 1.875E-02 | -2.317E-03 | 2.128E-04 | -1.438E-05 | 5.819E-07 | -1.003E-08 |
| 18 | -4.676E+00 | -5.101E-02 | 1.431E-02 | -2.861E-03 | 3.590E-04 | -2.633E-05 | 1.025E-06 | -1.628E-08 |

Figure 44:
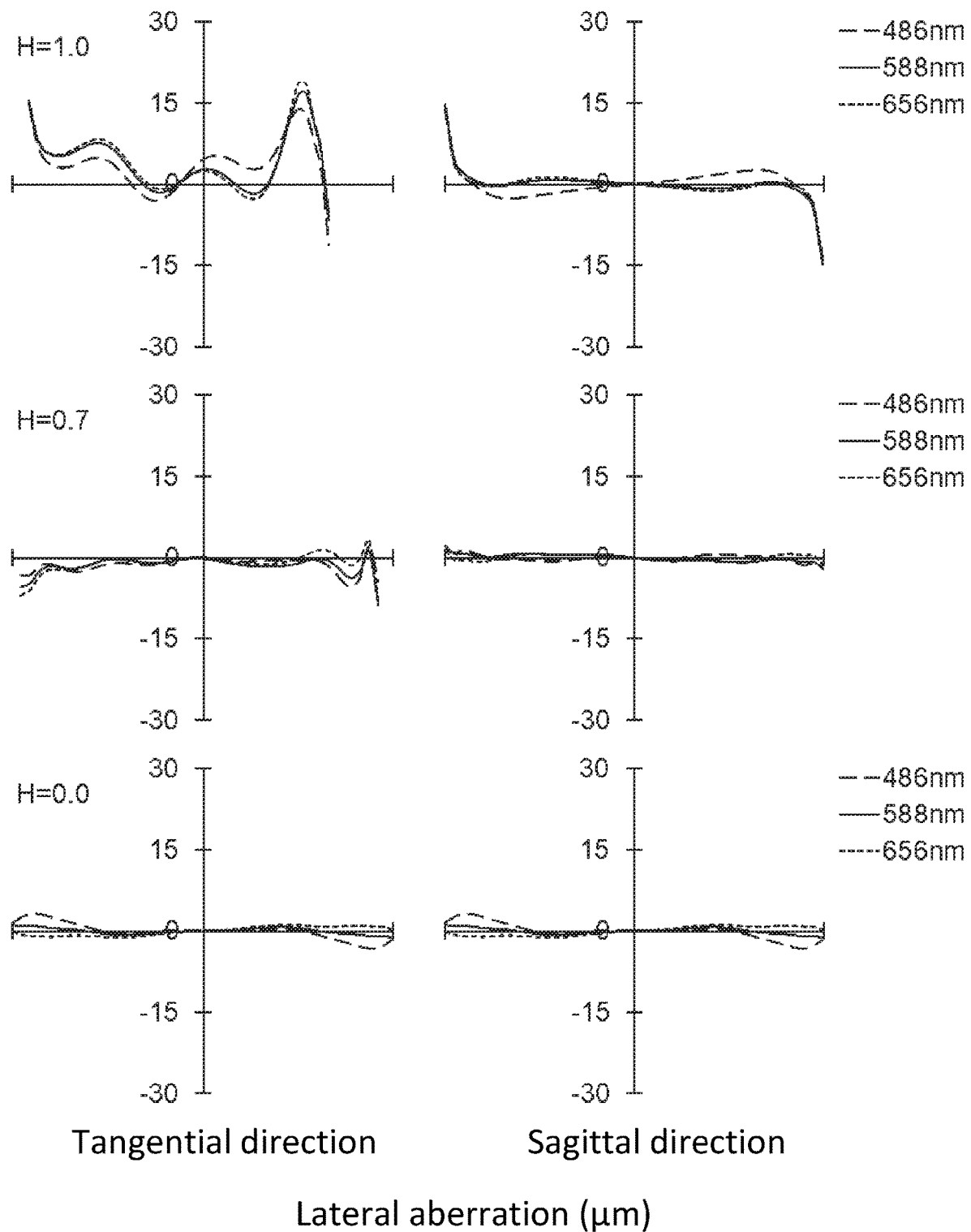
FIG. 44 is an aberration diagram showing a lateral aberration of the imaging lens of FIG. 43.
Figure 45:
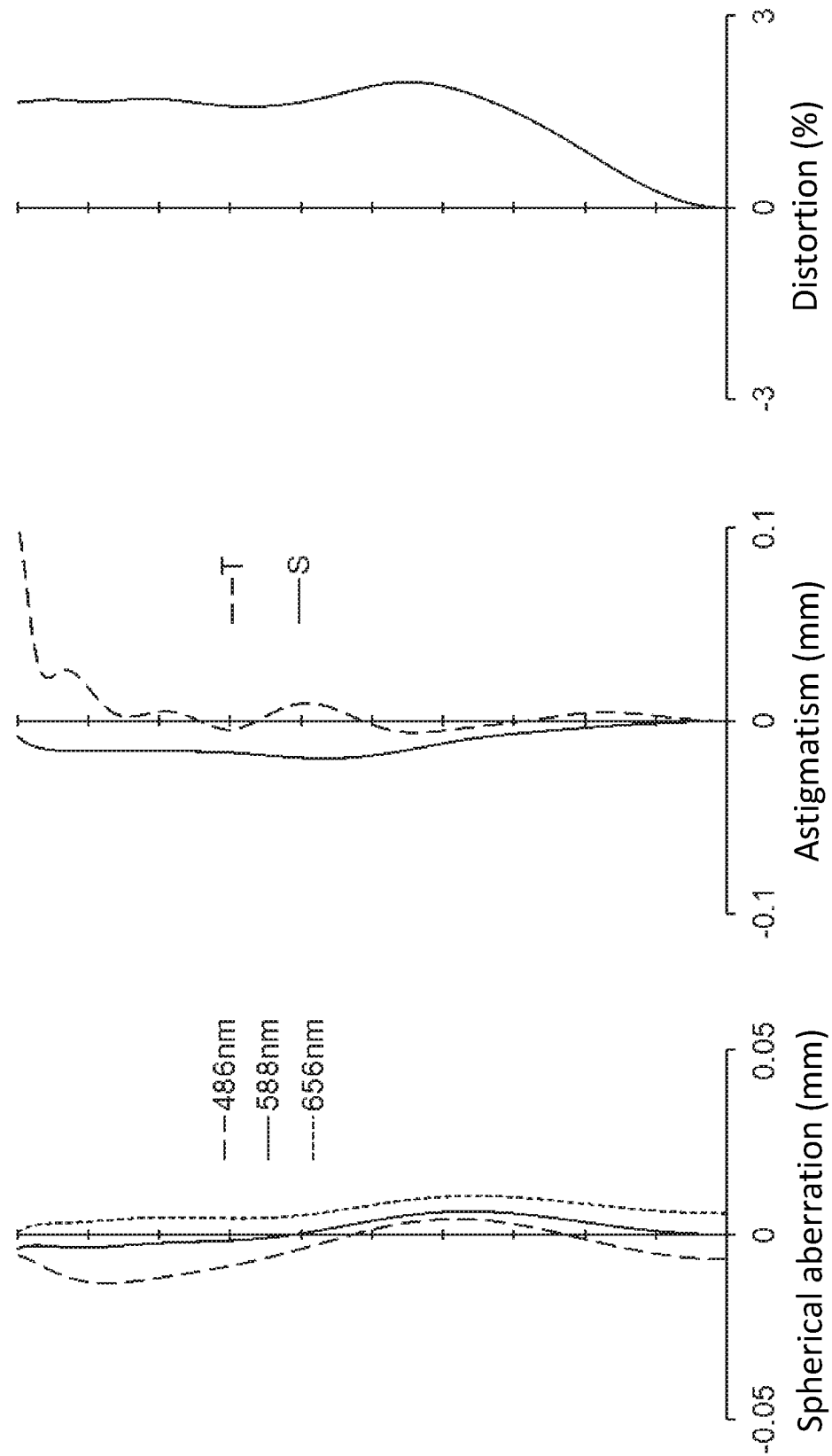
FIG. 45 is an aberration diagram showing a spherical aberration, astigmatism, and a distortion of the imaging lens of FIG. 43.

The values of the respective conditional expressions are as follows:

$f123/f = 0.994$ $f3/f2 = -1.063$ $D34/f = 0.011$ $T8/T7 = 3.320$ $D89/f = 0.100$ $R9r/f = 0.387$ $f9/f = -0.818$ $|f4/f1| = 20.907$ $TL/f = 1.274$ $TL/H\mathrm{max} = 1.504$ $f/Dep = 1.89$ $f8/f = 1.299$ FIG. 44 shows a lateral aberration that corresponds to an image height H and FIG. 45 shows a spherical aberration (mm), astigmatism (mm), and a distortion (%), respectively.

Accordingly, when the imaging lens of the above-described embodiment is applied in an imaging optical system such as cameras built in mobile devices (e.g., cellular phones, smartphones, and mobile information terminals), digital still cameras, security cameras, onboard cameras, and network cameras, it is possible to attain both high performance and downsizing of the cameras.

The present invention is applicable in an imaging lens that is mounted in a relatively small-sized camera, such as cameras built in mobile devices, digital still cameras, security cameras, onboard cameras, and network cameras.

The disclosure of Japanese Patent Application No. 2018-248774, filed on Dec. 29, 2018, is incorporated in the application by reference.

While the present invention has been explained with reference to the specific embodiment of the present invention, the explanation is illustrative and the present invention is limited only by the appended claims.

What is claimed is:

1. An imaging lens comprising:
   a first lens having positive refractive power;
   a second lens having negative refractive power;
   a third lens having positive refractive power;
   a fourth lens having negative refractive power;
   a fifth lens;
   a sixth lens;
   a seventh lens;
   an eighth lens; and
   a ninth lens having negative refractive power, arranged in this order from an object side to an image plane side,
   wherein said ninth lens is formed in a shape so that a surface thereof on the image plane side has an aspherical shape having an inflection point.

2. The imaging lens according to claim 1, wherein said seventh lens has a thickness T7 near an optical axis thereof, and said eighth lens has a thickness T8 near an optical axis thereof so that the following conditional expression is satisfied:

$0.5 < T8/T7 < 4$.

3. The imaging lens according to claim 1, wherein said eighth lens is disposed away from the ninth lens by a distance D89 so that the following conditional expression is satisfied:

$0.05 < D89/f < 0.15$, where f is a focal length of a whole lens system.

4. The imaging lens according to claim 1, wherein said ninth lens is formed in the shape so that the surface thereof on the image plane side has a paraxial curvature radius R9r so that the following conditional expression is satisfied:

$0.2 < R9r/f < 0.6$, where f is a focal length of a whole lens system.

5. The imaging lens according to claim 1, wherein said ninth lens has a focal length f9 so that the following conditional expression is satisfied:

$-2 < f9/f < -0.2$, where f is a focal length of a whole lens system.

* * * * *